(12) United States Patent
Maltchev et al.

(10) Patent No.: US 12,552,048 B2
(45) Date of Patent: Feb. 17, 2026

(54) COMPONENT HANDLING SYSTEMS AND METHODS

(71) Applicant: Magswitch Automation Company, Superior, CO (US)

(72) Inventors: Rossen Maltchev, Schaumburg, IL (US); David H. Morton, Boulder, CO (US); Cengiz Kizilkan, Ingolstadt (DE); Paul J. Karp, Thornton, CO (US)

(73) Assignee: Magswitch Automation Company, Superior, CO (US)

( * ) Notice: Subject to any disclaimer, the term of this patent is extended or adjusted under 35 U.S.C. 154(b) by 0 days.

(21) Appl. No.: 18/947,728

(22) Filed: Nov. 14, 2024

(65) Prior Publication Data

US 2025/0065514 A1    Feb. 27, 2025

Related U.S. Application Data

(63) Continuation-in-part of application No. 18/568,736, filed as application No. PCT/US2022/033154 on Jun. 11, 2022.

(60) Provisional application No. 63/548,468, filed on Nov. 14, 2023, provisional application No. 63/209,878, filed on Jun. 11, 2021.

(51) Int. Cl.
*B25J 15/00* (2006.01)
*B25J 9/10* (2006.01)
*B25J 15/06* (2006.01)

(52) U.S. Cl.
CPC ........... *B25J 15/0066* (2013.01); *B25J 9/106* (2013.01); *B25J 15/0608* (2013.01)

(58) Field of Classification Search
CPC ..... B25J 15/0066; B25J 15/0608; B25J 9/106
See application file for complete search history.

(56) References Cited

U.S. PATENT DOCUMENTS

| | | | |
|---|---|---|---|
| 3,273,931 A * | 9/1966 | Caldwell | B66F 9/184 294/81.2 |
| 4,399,718 A | 8/1983 | Zimmer | |
| 4,563,031 A * | 1/1986 | Kishimoto | B66C 1/62 294/907 |
| 4,636,138 A | 1/1987 | Gorman | |
| 4,685,861 A | 8/1987 | Huetsch | |
| 5,100,284 A | 3/1992 | Boisseau | |

(Continued)

FOREIGN PATENT DOCUMENTS

| | | |
|---|---|---|
| AT | 510494 A1 | 4/2012 |
| CN | 101559597 B | 4/2011 |

(Continued)

OTHER PUBLICATIONS

Destaco; Bodybuilder End Effector; destaco.com; Sep. 19, 2020.

(Continued)

*Primary Examiner* — Stephen A Vu
(74) *Attorney, Agent, or Firm* — Faegre Drinker Biddle & Reath LLP

(57) ABSTRACT

Rotational drives may have at least two degrees of freedom. End-of-arm-tools may incorporate rotational drives. The end-of-arm-tools may include one or more linear adjustable assemblies and one or more rotational adjustable assemblies. The end-of-arm-tools may include various tools, such as magnetic grippers.

63 Claims, 46 Drawing Sheets

(56) References Cited

U.S. PATENT DOCUMENTS

| | | | |
|---|---|---|---|
| 5,338,150 A * | 8/1994 | Focke | B65G 47/90 |
| | | | 414/792.9 |
| 6,644,637 B1 | 11/2003 | Agapiou et al. | |
| 7,001,130 B2 | 2/2006 | Ransom | |
| 7,012,495 B2 | 3/2006 | Underwood et al. | |
| 7,860,610 B2 | 12/2010 | Waldmann et al. | |
| 8,083,277 B1 * | 12/2011 | Benjamin | B66D 3/18 |
| | | | 294/86.41 |
| 8,371,631 B2 | 2/2013 | Lin | |
| 8,878,639 B2 | 11/2014 | Kocijan | |
| 9,174,317 B1 | 11/2015 | Lessway | |
| 9,579,770 B2 | 2/2017 | Pierednik et al. | |
| 10,011,023 B1 | 7/2018 | Lin et al. | |
| 10,464,218 B2 | 11/2019 | Golan et al. | |
| 10,625,953 B2 | 4/2020 | Hasegawa et al. | |
| 10,668,628 B2 | 6/2020 | Guo et al. | |
| 10,688,611 B2 | 6/2020 | Youngwerth et al. | |
| 10,836,046 B2 | 11/2020 | Brudniok et al. | |
| 10,903,030 B2 | 1/2021 | Morton et al. | |
| 10,953,552 B1 | 3/2021 | Dulla et al. | |
| 11,202,409 B1 | 12/2021 | Schroll et al. | |
| 12,202,132 B2 | 1/2025 | Junker | |
| 2003/0180135 A1 | 9/2003 | Sawdon et al. | |
| 2003/0220058 A1 | 11/2003 | Pollak et al. | |
| 2004/0130085 A1 | 7/2004 | Lim | |
| 2008/0145195 A1 | 6/2008 | Sacerdoti et al. | |
| 2008/0168639 A1 | 7/2008 | Otake et al. | |
| 2008/0174296 A1 | 7/2008 | Georgeson et al. | |
| 2009/0194922 A1 | 8/2009 | Lin et al. | |
| 2010/0156126 A1 | 6/2010 | Trachet et al. | |
| 2012/0263519 A1 | 10/2012 | Kotula et al. | |
| 2012/0290134 A1 | 11/2012 | Zhao et al. | |
| 2015/0035632 A1 | 2/2015 | Sarh et al. | |
| 2015/0239092 A1 | 8/2015 | Pierednik et al. | |
| 2016/0237993 A1 | 8/2016 | Bosch et al. | |
| 2017/0334075 A1 | 11/2017 | Eidelberg et al. | |
| 2018/0311795 A1 | 11/2018 | Morton et al. | |
| 2019/0001485 A1 | 1/2019 | Maruno | |
| 2019/0039838 A1 | 2/2019 | Curhan et al. | |
| 2019/0255700 A1 | 8/2019 | Nose et al. | |
| 2019/0255713 A1 | 8/2019 | Churchill | |
| 2019/0261565 A1 | 8/2019 | Robertson et al. | |
| 2020/0047333 A1 | 2/2020 | Wiktor | |
| 2020/0156246 A1 | 5/2020 | Srivastav | |
| 2020/0171650 A1 | 6/2020 | Hallock et al. | |
| 2020/0315738 A1 | 10/2020 | Dewaele et al. | |
| 2021/0031317 A1 | 2/2021 | Morton et al. | |
| 2021/0068909 A1 | 3/2021 | Eyre et al. | |
| 2021/0107137 A1 | 4/2021 | Ohige et al. | |
| 2021/0162610 A1 | 6/2021 | Kieffer et al. | |
| 2021/0213629 A1 | 7/2021 | Frey et al. | |
| 2024/0087784 A1 | 3/2024 | Morton | |
| 2024/0269804 A1 | 8/2024 | Kizilkan et al. | |
| 2024/0269861 A1 | 8/2024 | Morton et al. | |

FOREIGN PATENT DOCUMENTS

| | | |
|---|---|---|
| CN | 110171015 A | 8/2019 |
| DE | 102004014850 A1 | 11/2005 |
| EP | 1110680 A1 | 6/2001 |
| EP | 3733108 A1 | 11/2020 |
| FR | 2668084 A1 | 4/1992 |
| GB | 2143498 A | 2/1985 |
| GB | 2146406 A | 4/1985 |
| GB | 2566994 A | 4/2019 |
| JP | 07-206211 A | 8/1995 |
| JP | 2000-218675 A | 8/2000 |
| JP | 2001-205678 A | 7/2001 |
| JP | 2004-195637 A | 7/2004 |
| JP | 3111190 U | 7/2005 |
| JP | 4101789 B2 | 6/2008 |
| JP | 2008-535670 A | 9/2008 |
| JP | 2010-158739 A | 7/2010 |
| JP | 2014-511282 A | 5/2014 |
| JP | 2018-176313 | 11/2018 |
| JP | 2019-005869 | 1/2019 |
| JP | 2020-089932 A | 6/2020 |
| KR | 10-2015-0049224 A | 5/2015 |
| WO | 2012/098347 A1 | 7/2012 |
| WO | 2016/148321 A1 | 9/2016 |
| WO | 2016/185927 A1 | 11/2016 |
| WO | 2016/198867 A1 | 12/2016 |
| WO | 2019/128494 A1 | 7/2019 |
| WO | 2020/086791 A1 | 4/2020 |
| WO | 2020/198857 A1 | 10/2020 |
| WO | 2021/046479 A1 | 3/2021 |
| WO | 2021/115736 A1 | 6/2021 |
| WO | 2021/116990 A1 | 6/2021 |
| WO | 2022/023131 A1 | 2/2022 |
| WO | 2022/261520 A1 | 12/2022 |
| WO | 2022/266255 A1 | 12/2022 |
| WO | 2025/106673 A1 | 5/2025 |

OTHER PUBLICATIONS

European Search Report for EP Patent Application No. 22821172.8, Issued on Feb. 10, 2025, 11 pages.

Gimatic USA; Gimatic Cobot KIT-UR-V for Universal Robots; gimaticusa.com; Apr. 1, 2019.

PISCO; Vacuum EOAT Kit; pisco.com; Aug. 7, 2020.

U.S. Appl. No. 63/194,692, filed May 28, 2021 (47 pages).

European Patent Office; International Search Report and Written Opinion; International Application No. PCT/US2024/055926; 23 pages; dated Apr. 17, 2025.

* cited by examiner

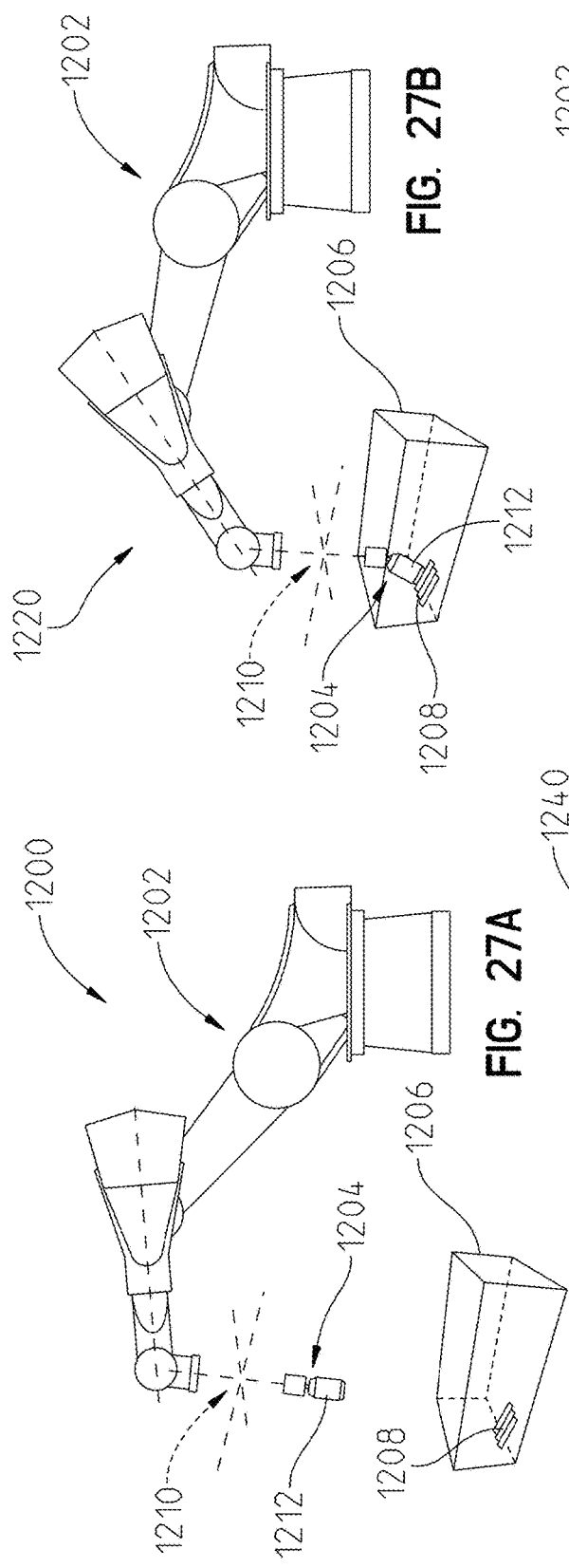
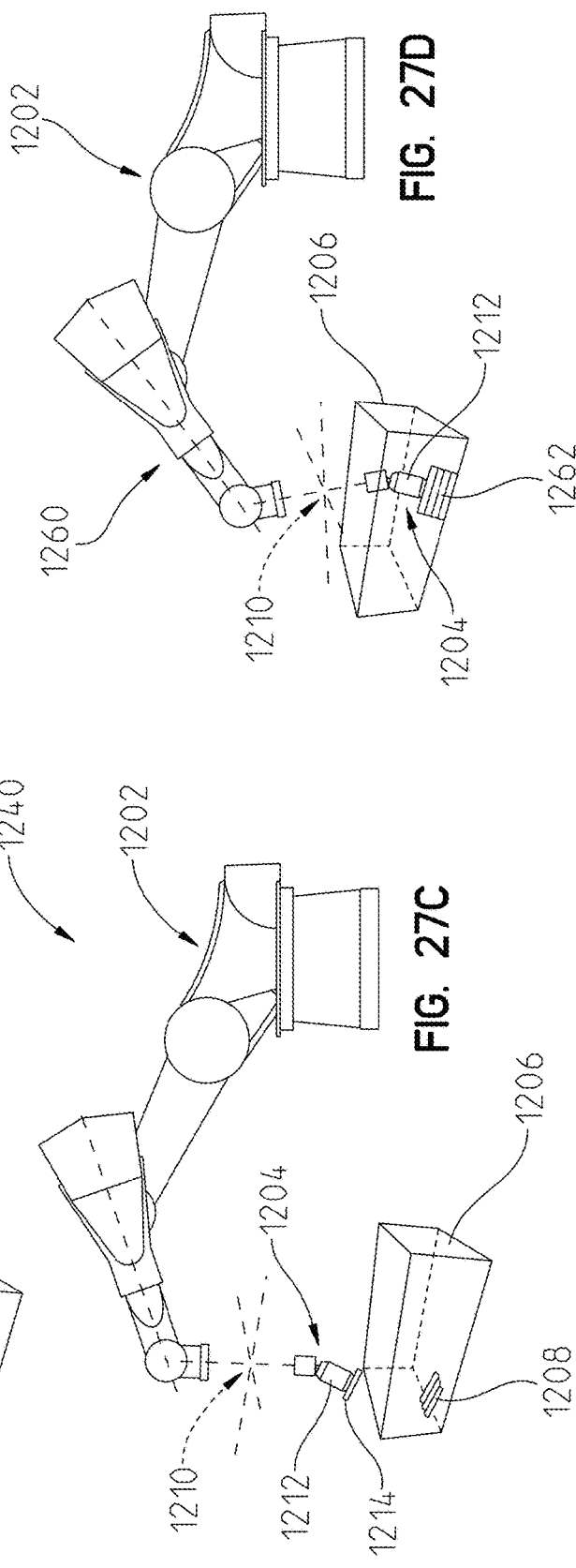
FIG. 27A
FIG. 27B
FIG. 27C
FIG. 27D

COMPONENT HANDLING SYSTEMS AND METHODS

RELATED APPLICATIONS

This application claims the benefit of U.S. Provisional Patent Application No. 63/548,468 and is a continuation-in-part of U.S. patent application Ser. No. 18/568,736, filed Dec. 8, 2023, which is a national stage application of PCT Patent Application No. PCT/US2022/033154 which claims the benefit of U.S. Provisional Patent Application No. 63/209,878, the entire disclosures of which are expressly incorporated by reference herein.

TECHNICAL FIELD

The present disclosure is related to systems for handling one or more parts and in particular to end-of-arm tools, robot systems, and rotational drives.

BACKGROUND

A rotational drive alters a pose of an output relative to a base. Preferably, rotational drives permit rotation of the output relative to the base in multiple rotational axes.

An end-of-arm tool may be used to manipulate an object or a fixture may be used to support an object. However, such devices and fixtures are typically designed for a specific object, such that manipulating or supporting different objects entails substituting an end-of-arm tool or fixture with another specialized device or fixture. Such specialization may introduce manufacturing delays (e.g., as a result of the time required to switch devices and fixtures), lead to additional complexity (e.g., to plan and program changes), and require additional space (e.g., to store multiple devices and use multiple fixtures).

It is with respect to these and other general considerations that embodiments have been described. Also, although relatively specific problems have been discussed, it should be understood that the embodiments should not be limited to solving the specific problems identified in the background.

SUMMARY

In an exemplary embodiment of the present disclosure, a rotational drive may comprise a base, an output mount rotatable relative to the base, and an intermediate base positioned between the base and the output mount. The output mount may be movably coupled to the intermediate base and movably coupled to the base independent of the intermediate base. The rotational drive may further comprise a first drive system coupled to the base and the intermediate base to rotate the intermediate base relative to the base about a first axis and a second drive system coupled to the base and the output mount to rotate the output mount relative to the base about a second axis. The second axis may be angled relative to the first axis.

In another exemplary embodiment of the present disclosure, a rotational drive is provided. The rotational drive may comprise a base; an output mount rotatable relative to the base; an intermediate base positioned between the base and the output mount. The output mount may be movably coupled to the intermediate base and movably coupled to the base through the intermediate base. The rotational drive may further comprise a first drive system coupled to the base and the intermediate base to rotate the intermediate base relative to the base about a first axis. The rotational drive may further comprise a second drive system coupled to the intermediate base and the output mount to rotate the output mount relative to the base about a second axis. The second axis may be angled relative to the first axis. The first drive system and the second drive system may be supported by the intermediate base.

In a further exemplary embodiment of the present disclosure, a robotic system for lifting a ferromagnetic workpiece is provided. The robotic system may comprising a robotic arm including a base and a plurality of moveable arm segments, and a rotational drive operatively coupled to the robotic arm at a first end opposite the base.

In still another exemplary embodiment a robotic system for lifting at least one ferromagnetic workpiece is provided. The robotic system may comprise a robotic arm including a base and a plurality of moveable arm segments and an end-of-arm tool coupled to an end of the robotic arm. The end-of-arm-tool may include a rotational drive operatively coupled to the robotic arm at a first end opposite the base of the robotic arm. The rotational drive may have a plurality of tools coupled to the output mount. The rotational drive may be in a first pose to couple a first ferromagnetic workpiece to a first tool of the plurality of tools and may be in a second pose to couple a second ferromagnetic workpiece to a second tool of the plurality of tools.

In a further still exemplary embodiment of the present disclosure, a robotic system for lifting at least one ferromagnetic workpiece is provided. The robotic system may comprise a robotic arm including a base and a plurality of moveable arm segments and an end-of-arm tool coupled to an end of the robotic arm. The end-of-arm tool may include a rotational drive operatively coupled to the robotic arm at a first end opposite the base of the robotic arm. The rotational drive may have at least one tool coupled to the output mount. The rotational drive may be in a first pose to couple a first ferromagnetic workpiece to a first interface of a first tool of the at least one tool and may be in a second pose to couple a second ferromagnetic workpiece to a second interface of the tool of the first tool of the at least one tool. The second interface may be spaced apart from the first interface.

In yet another exemplary embodiment of the present disclosure, an adjustable end-of-arm tool for a robot is provided. The adjustable end-of-arm tool may comprise a base adapted to be coupled to the robot, a first adjustable assembly coupled to the base, and a second adjustable assembly coupled to the base adapted to be coupled to the robot. The first adjustable assembly may comprise a first plurality of links, a first plurality of couplers coupling the plurality of links and the base. The first plurality of couplers may provide at least two degrees of the freedom. A first subset of the first plurality of links and the first plurality of couplers may be a first rotational drive including a base and an output mount. The output mount may be rotatable relative to the base about two rotational degrees of freedom which intersect at a point. The first adjustable assembly may further comprise a first tool coupled to the base adapted to be coupled to the robot through the first plurality of links and the first plurality of couplers. The first tool may include a first interface which is positionable relative to the base adapted to be coupled to the robot in multiple positions based on the first plurality of links and the first plurality of couplers. The second adjustable assembly may comprise a second plurality of links and a second plurality of couplers coupling the plurality of links and the base. The first plurality of couplers may provide at least two degrees of the freedom. The second adjustable assembly may further comprise a second tool coupled to base adapted to be coupled to the robot through the second plurality of links and the second plurality of couplers. The second tool may include a second interface which is positionable relative to the base adapted to be coupled to the robot in multiple positions based on the second plurality of links and the second plurality of couplers.

Other aspects and optional and/or preferred embodiments will become apparent from the following description provided below with reference to the accompanying drawings.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIGS. 27A-27D illustrate example views of a robotic device having an adjustable end-of-arm tool manipulating multiple objects according to aspects described herein;

DETAILED DESCRIPTION OF THE DRAWINGS

Figure 1:
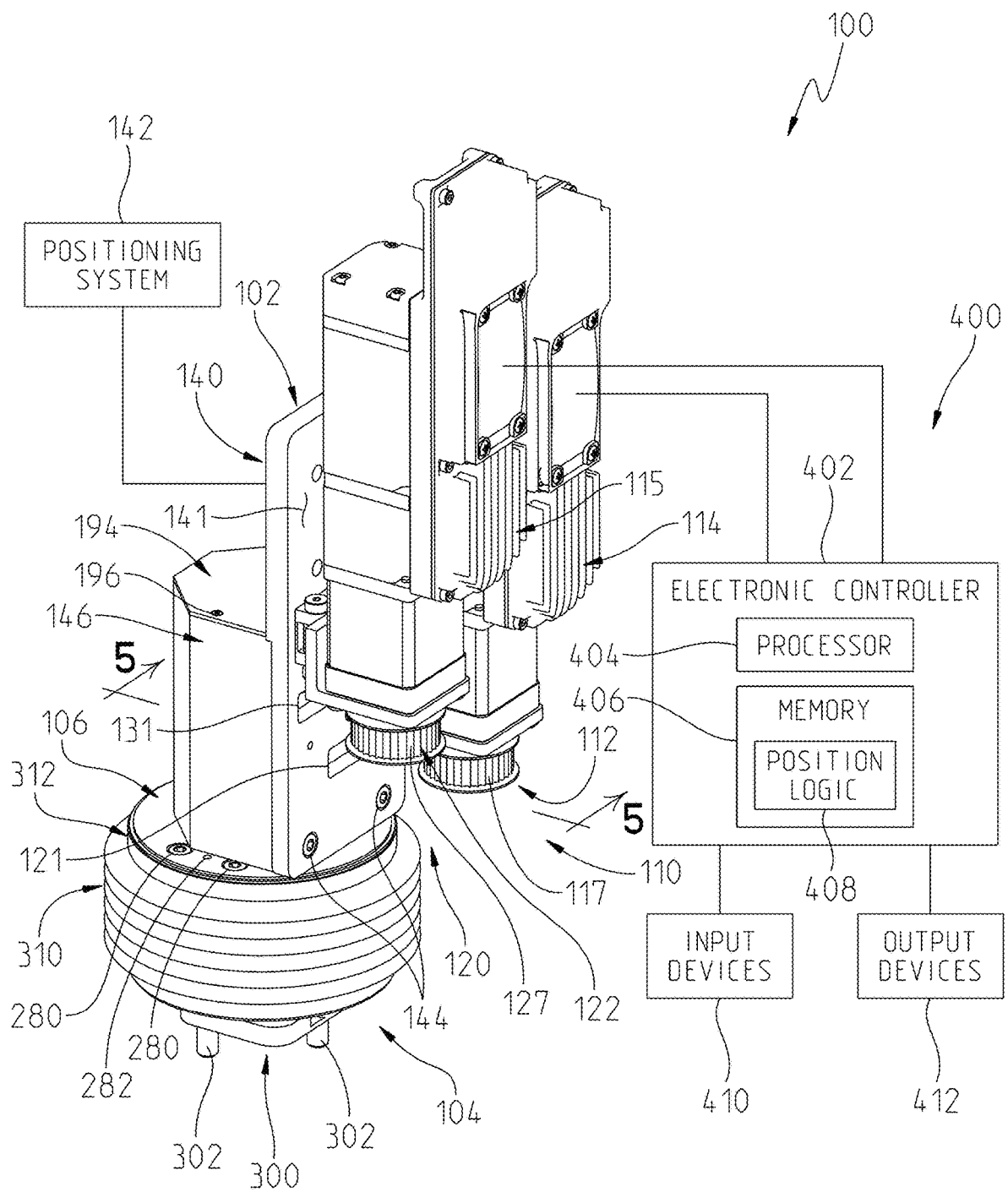
FIG. 1 illustrates a rear perspective view of an exemplary rotational drive of the present disclosure.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an exemplary rotational drive 100 is shown. Rotational drive 100 includes a base 102, an output mount 104 rotatable relative to base 102, and an intermediate base 106 positioned between base 102 and output mount 104. As explained herein, in embodiments, output mount 104 is movably coupled to intermediate base 106 and movably coupled to base 102 independent of intermediate base 106.

Figure 5:
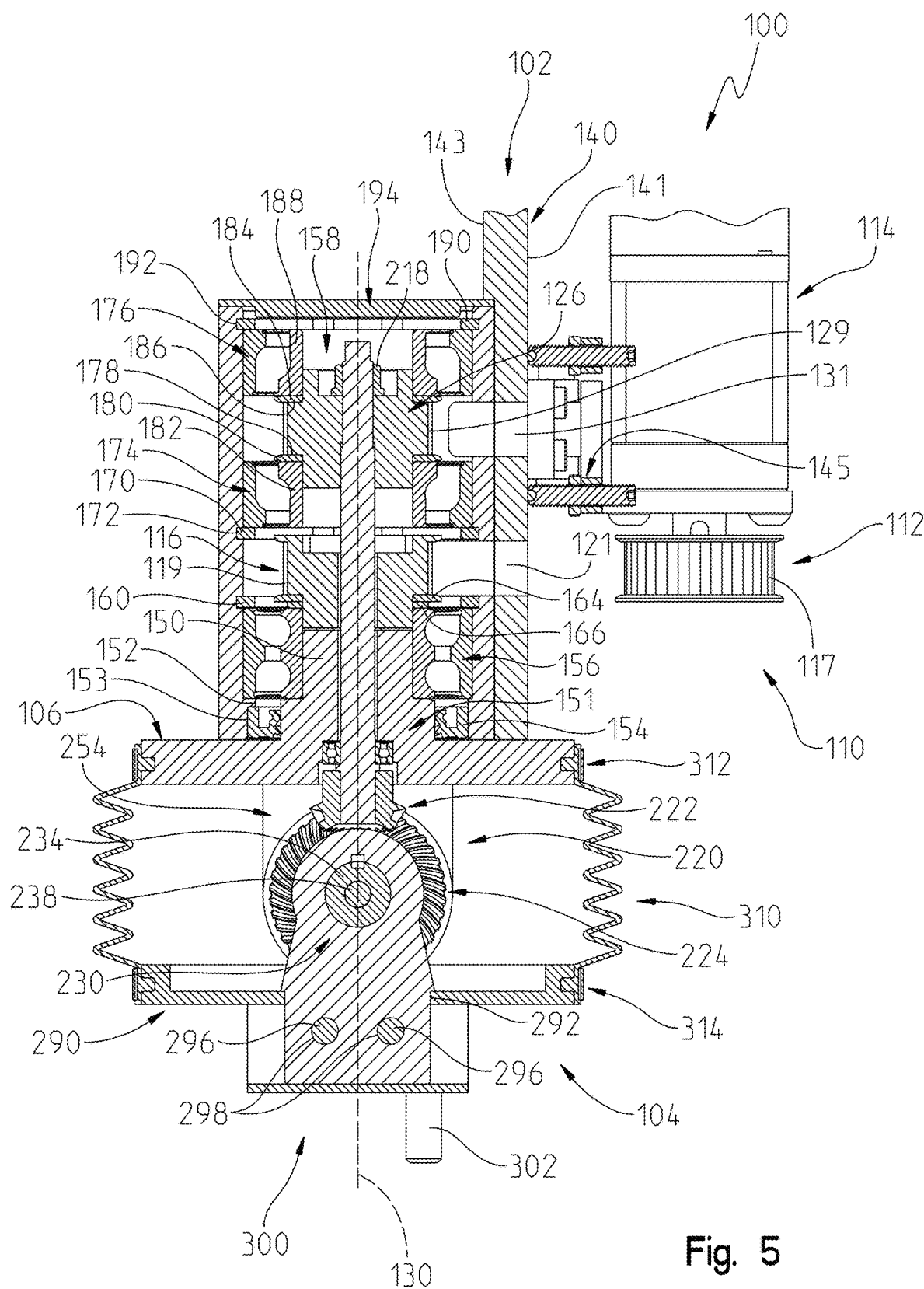
FIG. 5 illustrates a sectional view of the rotational drive of FIG. 1 along lines 5-5 in FIG. 1.
Figure 6:
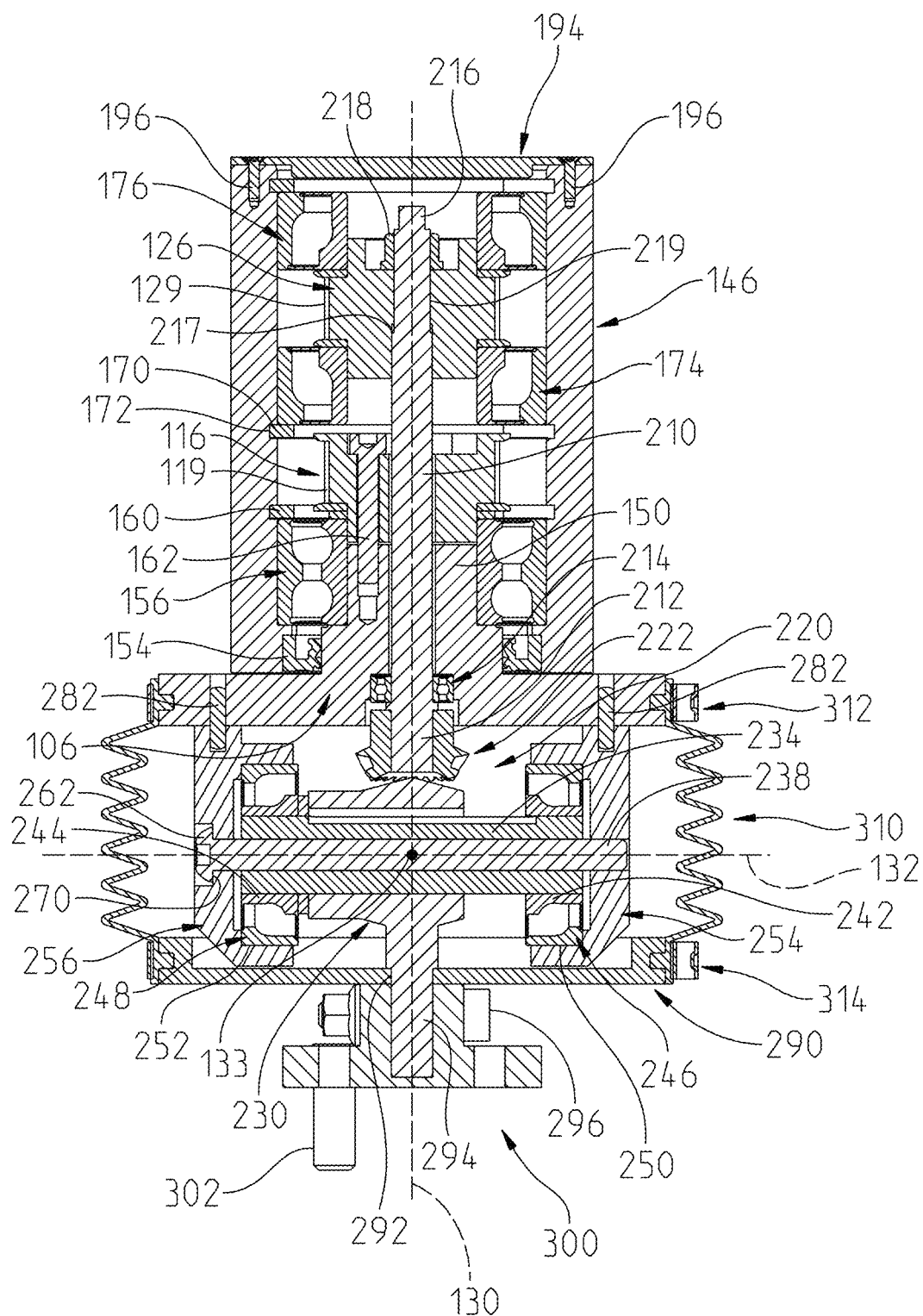
FIG. 6 illustrates a sectional view of the rotational drive of FIG. 1 along lines 6-6 in FIG. 2.

Rotational drive 100 further includes a first drive system 110 coupled to base 102 and intermediate base 106 to rotate intermediate base 106 relative to base 102 about a first axis 130 (see FIG. 6). The rotation of intermediate base 106 causes a corresponding rotation in output mount 104 about first axis 130. First drive system 110 includes a drive input 112 which is rotatable driven by a motor 114. Drive input 112 rotates a drive output 116 through a connecting member 118 (see FIG. 4). Exemplary connecting members include belts, chains, and other suitable devices to impart a rotation of drive input 112 to drive output 116. In embodiments, connecting member 118 is a toothed flexible belt having a plurality of teeth which engage with corresponding recesses in the circumferential surfaces 117, 119 (see FIG. 5) of drive input 112 and drive output 116, respectively.

A second drive system 120 is coupled to base 102 and output mount 104 to rotate output mount 104 relative to base 102 about a second axis 132 (see FIG. 6). Second drive system 120 includes a drive input 122 which is rotatable driven by a motor 115. Drive input 122 rotates a drive output 126 (see FIGS. 6 and 7) through a connecting member 128 (see FIG. 4). Exemplary connecting members include belts, chains, and other suitable devices to impart a rotation of drive input 122 to drive output 126. In embodiments, connecting member 128 is a toothed flexible belt having a plurality of teeth which engage with corresponding recesses in the circumferential surfaces 127, 129 (see FIGS. 1 and 7) of drive input 122 and drive output 126, respectively.

Returning to FIG. 6, second axis 132 is angled relative to first axis 130. In the illustrated embodiment, second axis 132 is generally perpendicular to first axis 130. Further, in embodiments, second axis 132 intersects first axis 130 at an intersection point 133. Intersection point 133 remains stationary relative to base 102 as output mount 104 is moved by each of first drive system 110 and second drive system 120. Intersection point 133 is on second side 143 of support 140 of base 102 and drive input 112 of first drive system 110 is on first side 141 of support 140 of base 102. Drive input 122 of second drive system 120 is also on first side 141 of support 140 of base 102. Both of first drive system 110 and second drive system 120 span support 140 of base 102 with drive output 116 of first drive system 110 and drive output 126 of second drive system 120 being on second side 143 of support 140 of base 102. Connecting member 118 and connecting member 128 pass through an opening 121 and an opening 131, respectively, of support 140 of base 102. Drive output 116 of first drive system 110 has a first rotational axis which is parallel a second rotational axis of drive output 126 of second drive system 120. In the illustrated embodiment, the second rotational axis of drive output 126 of second drive system 120 is colinear with the first rotational axis of drive output 116 of first drive system 110.

Referring to FIG. 5, base 102 includes a support 140. Support 140 is coupled to a positioning system 142 (see FIG. 1) through a plurality of fasteners (not shown). Exemplary positioning systems include robot arms, such as industrial robots in an assembly plant setting, adjustable end-of-arm tools for robot arms, and adjustable fixtures. Exemplary adjustable end-of-arm tools for robot arms and adjustable fixtures are described herein and disclosed in PCT Application Publication No. WO2022/261520 published Dec. 15, 2022, titled ADJUSTABLE END-OF-ARM TOOL OR FIXTURE, the entire disclosure of which is expressly incorporated by reference herein.

Figure 2:
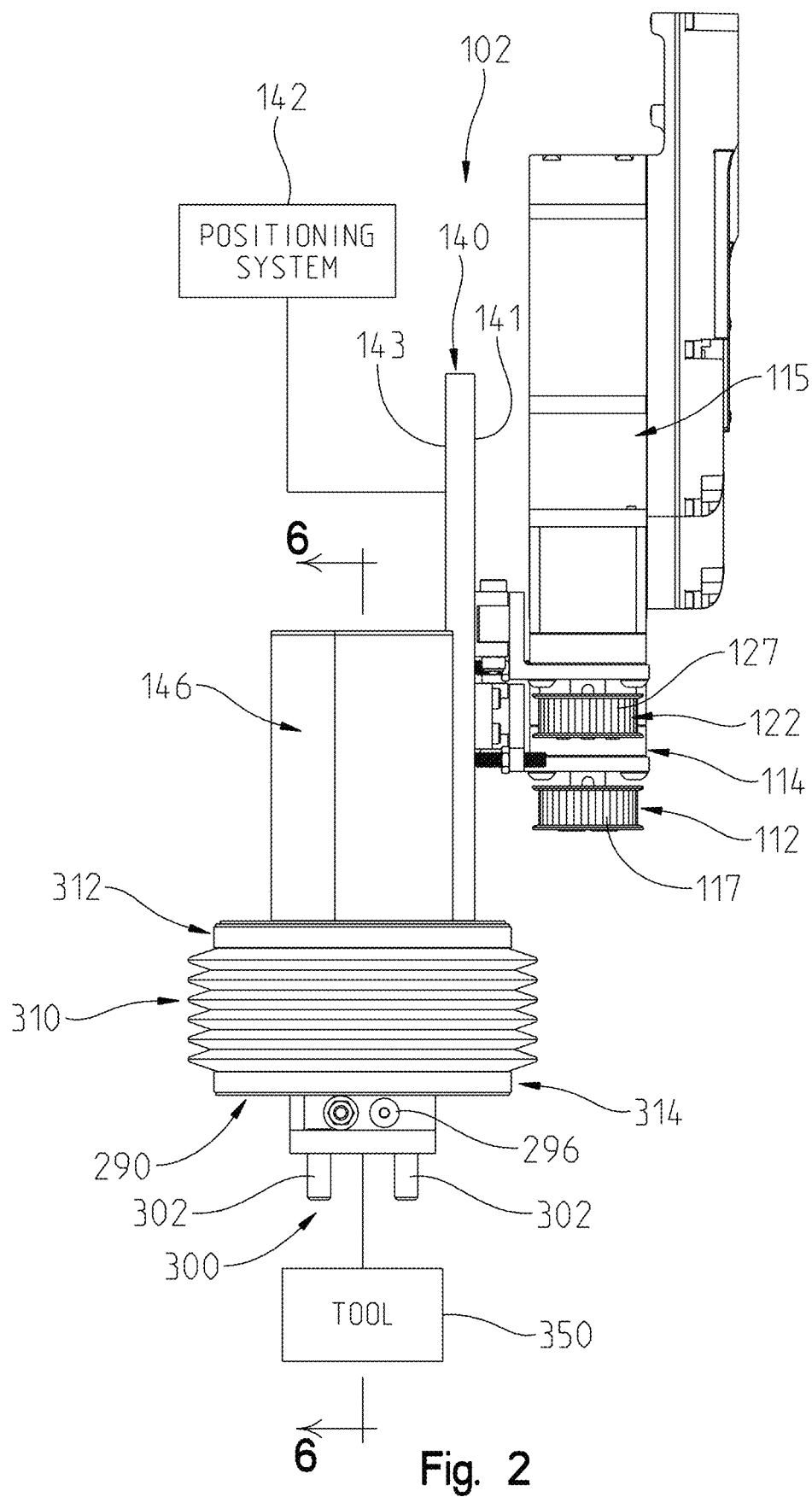
FIG. 2 illustrates a side view of the rotational drive of FIG. 1.
Figure 3:
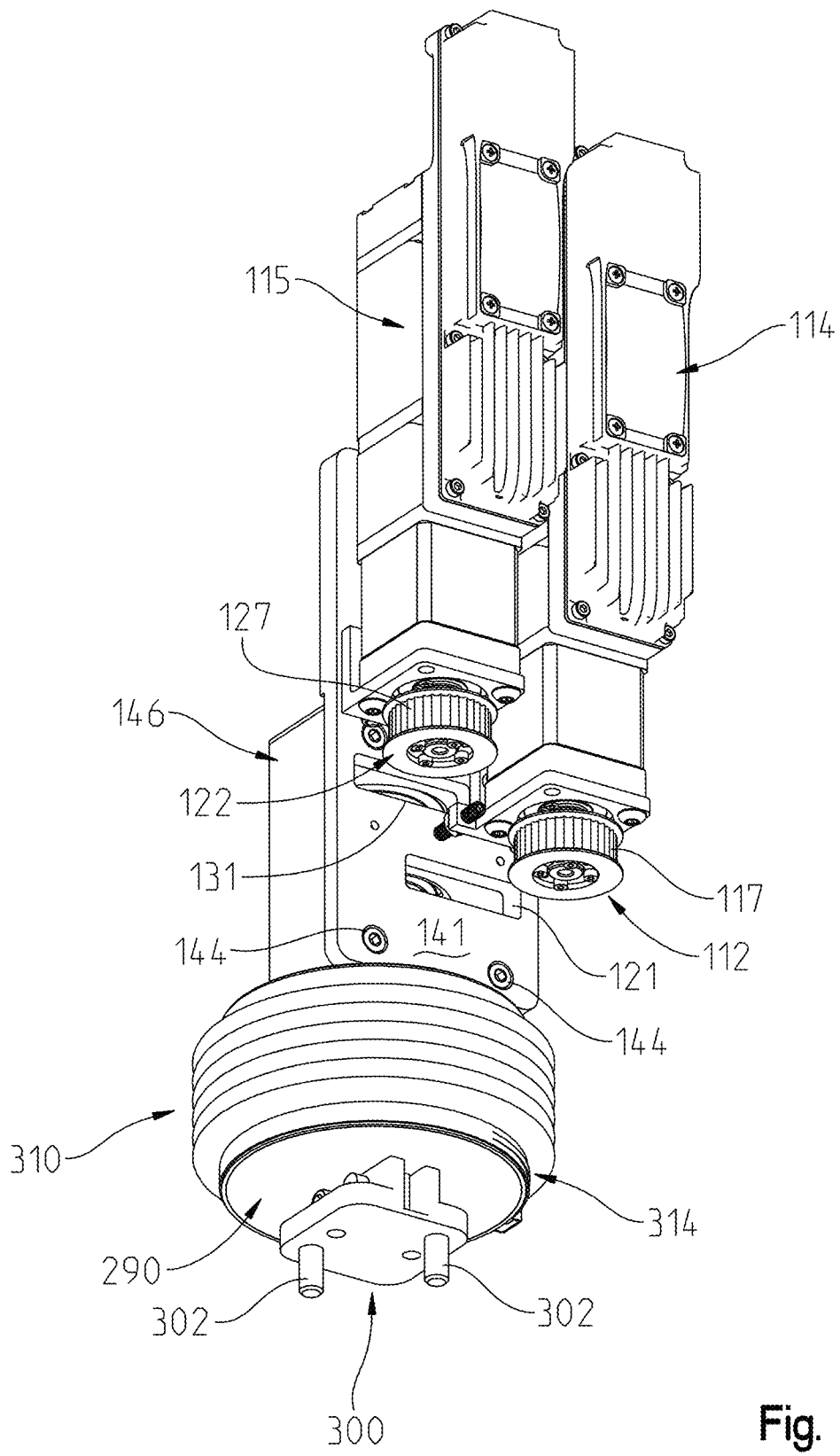
FIG. 3 illustrates a lower rear perspective view of the rotational drive of FIG. 1.

Referring to FIG. 2, motor 114 and motor 115 are coupled to a first side 141 of support 140 through a mount 145 (see FIG. 5) and positioning system 142 is coupled to a second side 143 of support 140 opposite first side 141. In embodiments, one or more of motor 114 and motor 115 are coupled to support 140 on the same side as positioning system 142.

Figure 4:
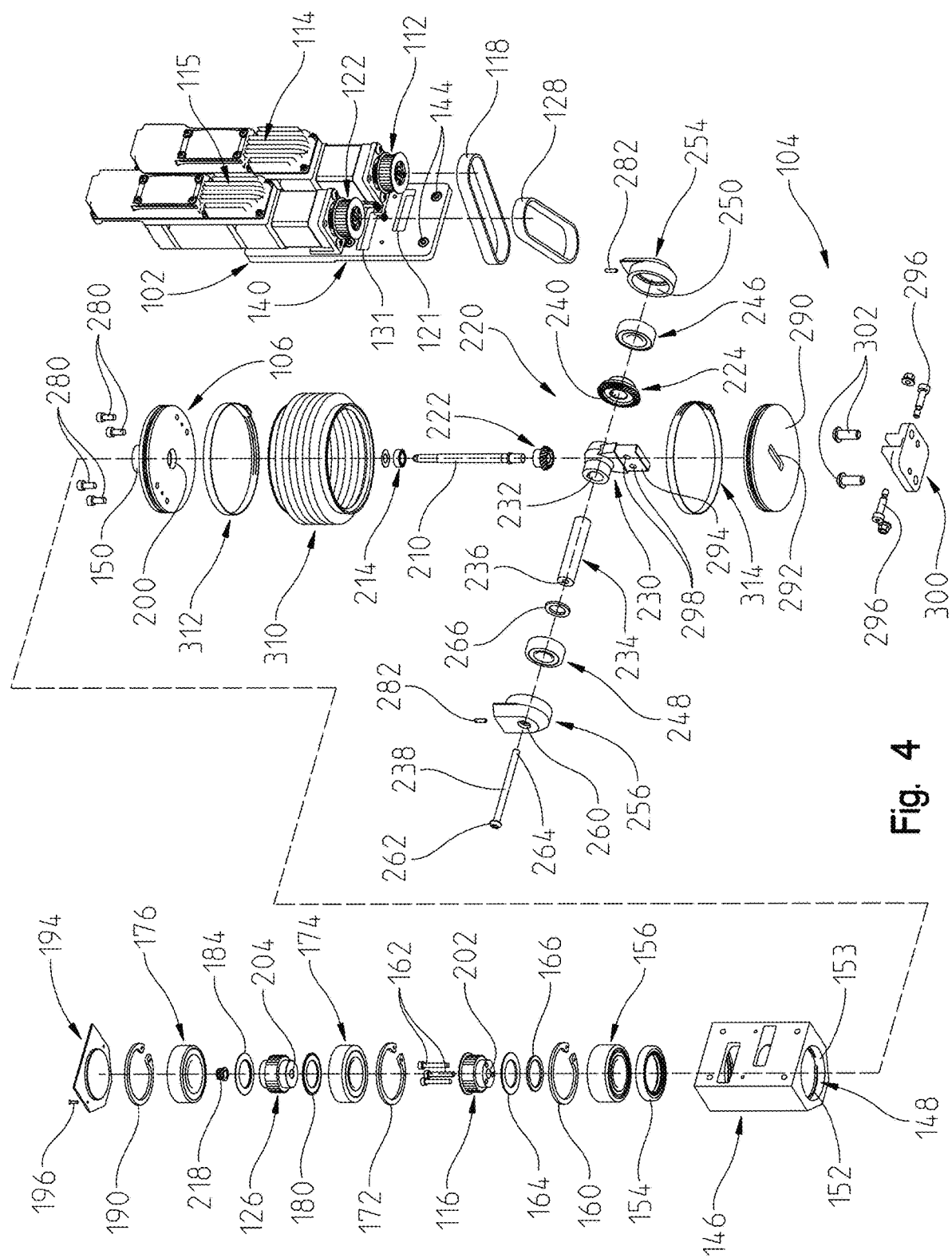
FIG. 4 illustrates a partial exploded view of the rotational drive of FIG. 1.

Support 140 is further coupled to a housing 146 through a plurality of fasteners 144. Referring to FIGS. 4 and 5, housing 146 has a lower opening 148 which receives a post 150 of intermediate base 106. An enlarged lower portion 151 of post 150 of intermediate base 106 carries a seal 154 which contacts an inner circumferential surface 153 of housing 146 and presses against a flange 152 of housing 146. A bearing 156 is received through a top open end 158 of housing 146. Bearing 156 rests on top of flange 152 of housing 146 and receives post 150 of intermediate base 106. Bearing 156 is held in place with a retainer 160.

Drive output 116 of first drive system 110 is secured to post 150 of intermediate base 106 with a plurality of fasteners 162 resulting in intermediate base 106 rotating as a unit with drive output 116 of first drive system 110. A first spacer 164 and a second spacer 166 are interposed between bearing 156 and drive output 116 of first drive system 110.

A retainer 170 is received through top open end 158 of housing 146 and received in a recess 172 in housing 146. Retainer 170 is spaced apart from drive output 116 of first drive system 110 and serves as a support for a bearing 174. Bearing 174 and a second bearing 176 capture drive output 126 of second drive system 120. A flange 178 of drive output 126 of second drive system 120 is supported by a spacer 180 which in turn is supported by an inner race 182 of bearing 174. A second spacer 184 is supported on an upper flange 186 of drive output 126 of second drive system 120 and in turn supports an inner race 188 of second bearing 176. Bearing 174, drive output 126 of second drive system 120, and second bearing 176 are held in place with a retainer 190 which is received in a recess 192 in housing 146. The open end 158 of housing 146 is capped with a cover 194 which is secured to housing 146 with fasteners 196.

As mentioned herein, second drive system 120 is coupled to base 102 and output mount 104 to rotate output mount 104 relative to base 102 about a second axis 132 (see FIG. 6). Referring to FIGS. 4 and 6, drive output 126 of second drive system 120 is coupled to output mount 104 through an axle 210. Axle 210 passes through an opening 200 in intermediate base 106, an opening 202 in drive output 116, and an opening 204 in drive output 126. A lower end 212 of axle 210 carries a first gear 222 of a gearset 220. First gear 222 is positioned against a bearing 214 received in opening 200 of intermediate base 106. An upper end 216 of axle 210 passes through opening 204 in drive output 126. Upper end 216 includes a reduced diameter section 219 which interacts with a seat 217 in opening 204 of drive output 126. Upper end 216 includes a threaded surface which receives a threaded retainer 218 which may be tightened to capture second drive output 126 between the ledge of reduced diameter section 219 which contacts seat 217 and threaded retainer 218 resulting in axle 210 rotating as a unit with drive output 126 of second drive system 120.

Figure 7:
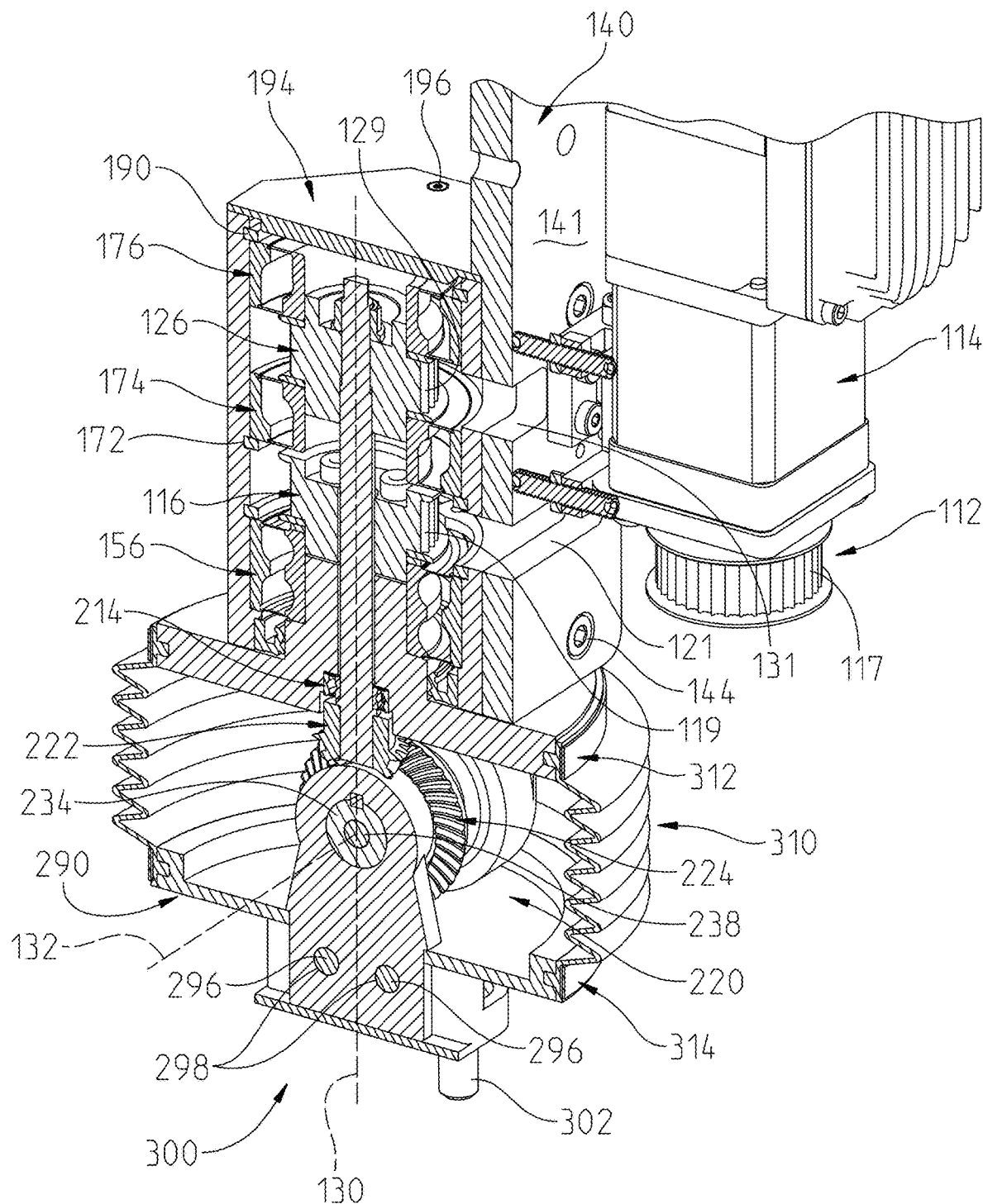
FIG. 7 illustrates a perspective view of the sectional view of FIG. 5 of the rotational drive of FIG. 1.

As drive output 126 of second drive system 120 rotates about first axis 130, axle 210 rotates first gear 222 of gearset 220 about first axis 130. Referring to FIG. 7, first gear 222 intermeshes with a second gear 224 of gearset 220. As shown, first gear 222 and second gear 224 are bevel gears. Other suitable gear arrangements for gearset 220 may be used. Second gear 224 is coupled to output mount 104. In the illustrated embodiment, output mount 104 includes a base 230 having an opening 232 which receives a support 234. Support 234, in the illustrated embodiment is a cylindrical tube having an opening 236 which receives an axle 238.

Second gear 224 includes an opening 240 through which support 234 is received. In embodiments, the outer circumferential surface of support 234 is splined and the inner circumferential surface of opening 240 is splined such that a splined connection is made between second gear 224 and support 234. Support 234 is further received in respective inner races 242, 244 of bearings 246 and 248 (see FIG. 6). Bearings 246, 248 are received in respective recesses 250, 252 of caps 254, 256.

As shown in FIG. 6, support 234 carries bearing 248, base 230, second gear 224, and bearing 246. Axle 238 is received through opening 260 of end cap 256, a spacer 266, opening 236 of support 234 and received into end cap 254. In the illustrated embodiment, an end 264 of axle 238 is threaded into an opening in end cap 254 and tightened until a head portion 262 of axle 238 contacts a seat 270 of end cap 256. Once tightened, second gear 224, support 234, and base 230 form a first unit which is rotatable about second axis 132 relative to a second unit of axle 238, end cap 254, and end cap 256. End caps 254, 256 are fastened to intermediate base 106 through fasteners 280 and locator pins 282. As such, intermediate base 106 is part of the second unit.

Output mount 104 further includes a plate 290 which is coupled to base 230 and forms part of the first unit. A flexible cover 310 is coupled to intermediate base 106 and plate 290 with band clamps 312 and 314 to keep debris away from bearing 248, bearing 246, and gearset 220.

Plate 290 includes an opening 292 which receives a lower portion 294 of base 230. A tool interface 300 is coupled to lower portion 294 of base 230 through fasteners 296 which are received in openings (not shown) in tool interface 300 and openings 298 (see FIG. 7) in base 230. A tool 350 may be coupled to tool interface 300 with fasteners 302 or other suitable devices.

Exemplary tools 350 include grippers, pin clamps, clamps, and locators. Exemplary locators include pins and other locating features. Exemplary grippers include suction cup grippers, magnetic grippers, electro-static grippers, and gecko grippers. Suction cup grippers include cups as the respective interface with the workpiece and a pneumatic system which selectively applies a vacuum to the cup grippers to hold the workpiece relative to rotational drive 100. Magnetic grippers are used with ferromagnetic workpieces and generally include pole shoes as the respective interface with the workpiece and a magnetic flux source which supplies a magnetic flux at the surface of the pole shoes to create a magnetic circuit through the pole shoes and workpiece. Exemplary magnetic flux sources include electromagnets, electro-permanent magnets, rare earth permanent magnets, other suitable magnets, and combinations thereof. Exemplary magnetic grippers are disclosed in U.S. Pat. Nos. 6,707,360, 7,012,495, 8,878,639, 10,903,030, 11,031,166, 11,097,401, US Published Patent Application No. US2021/0031317, titled MAGNETIC LIFTING DEVICE HAVING POLE SHOES WITH SPACED APART PROJECTIONS, US Published Patent Application No. US2022/0045594, titled LINEARLY ACTUATED MAGNETIC COUPLING DEVICE, PCT Published Patent Application No. PCT/US22/31286, filed May 27, 2022, titled MAGNETIC COUPLING DEVICE; U.S. Provisional Patent Application No. 63/351,349, filed Jun. 11, 2022, titled MAGNETIC COUPLING DEVICE; and PCT Published Patent Application No. PCT/US23/24971, filed Jun. 9, 2023, titled MAGNETIC COUPLING DEVICE, the entire disclosures of which are expressly incorporated by reference herein (collectively "Magnetic Gripper References"). Additionally, rotational drive 100 may be included as part of the systems described in PCT Patent Application No. PCT/US22/33154, filed Jun. 11, 2022, titled ADJUSTABLE END-OF-ARM TOOL OR FIXTURE and PCT Patent Application No. PCT/US22/33676, filed Jun. 15, 2022, titled COMPONENT HANDLING SYSTEMS AND METHODS, the entire disclosures of which are expressly incorporated by reference herein. Gecko grippers use dry adhesive microstructures. Exemplary dry adhesive microstructures are disclosed in U.S. Pat. No. 11,534,926.

Referring to FIG. 1, rotational drive 100 further includes a control system 400 including an electronic controller 402. Electronic controller 402 includes at least one processor 404 and associated memory 406. Memory 406 includes position logic 408 regarding the operation of rotational drive 100 to orient output mount 104 and hence tool 350 relative to base 102 and positioning system 142. In embodiments wherein tool 350 includes a magnetic gripper, the position logic 408 of memory 406 may include logic to control the configuration of the magnetic coupling devices and may include logic to determine one or more characteristics of a magnetic circuit formed between the magnetic coupling device and an external workpiece, such as described in the Magnetic Gripper References, the subject matter of which is expressly incorporated by reference herein.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 402 is not microprocessor-based, but rather is configured to control operation of rotational drive 100 based on one or more sets of hardwired instructions. Further, electronic controller 402 may be contained within a single device or be a plurality of devices networked together or otherwise electrically connected to provide the functionality described herein. Additionally, memory 406 may be a single memory or multiple distinct memories which collectively provide the functionality described herein.

Control system 400 may further receive input through one or more input devices 410. Exemplary input devices 410 include buttons, switches, levers, dials, touch displays, soft keys, and a communication module. Control system 400 may further provide output through one or more output devices 412. Exemplary output devices 412 include visual indicators, audio indicators, and a communication module. Exemplary visual indicators include displays, lights, and other visual systems. Exemplary audio indicators include speakers and other suitable audio systems.

Position logic 408 of electronic controller 402 controls motor 114 and motor 115 to orient output mount 104 relative to base 102. Motor 114 may be driven by position logic 408 of electronic controller 402 to rotate output mount 104 about first axis 130. First drive system 110 permits rotation of output mount 104 about first axis 130 relative to second drive system 120 beyond a complete revolution about first axis 130. Thus, output mount 104 may be spun greater than 360 degrees about first axis 130 relative to base 102 in either a clockwise or counterclockwise direction. In embodiments, output mount 104 is rotatable relative to base 106 about axis 132 by up to about 45 degrees in each direction from parallel with base 106 or about a 90 degree range of movement. In embodiments, with a larger separation between plate 290 and base 106 about axis 132 by up to about 90 degrees in each direction from parallel with base 106 or about a 180 degree range of movement. In embodiments, output mount 104 is rotatable relative to base 106 about axis 132 by between 20 degrees to 90 degrees in each direction from parallel with base 106 or between 40 degrees to 180 degrees range of movement.

As motor 114 rotates output mount 104 about first axis 130, due to the connection between second gear 224 and first gear 222 of gearset 220, if drive output 126 of second drive system 120 is held stationary then first gear 222 will also be held stationary and second gear 224 will rotate relative to gearset 220 causing output mount 104 to rotate relative to intermediate base 106 about second axis 132. In embodiments, it is desired for output mount 104 to remain stationary relative to intermediate base 106 while intermediate base 106 rotates relative to base 102 with rotation of drive output 116 of first drive system 110 driven by drive input 112 and motor 114. In one example, motor 115 of second drive system 120 is controlled by position logic 408 to rotate at a rate such that there is no relative rotation between second gear 224 and first gear 222 of gearset 220.

Figure 8:
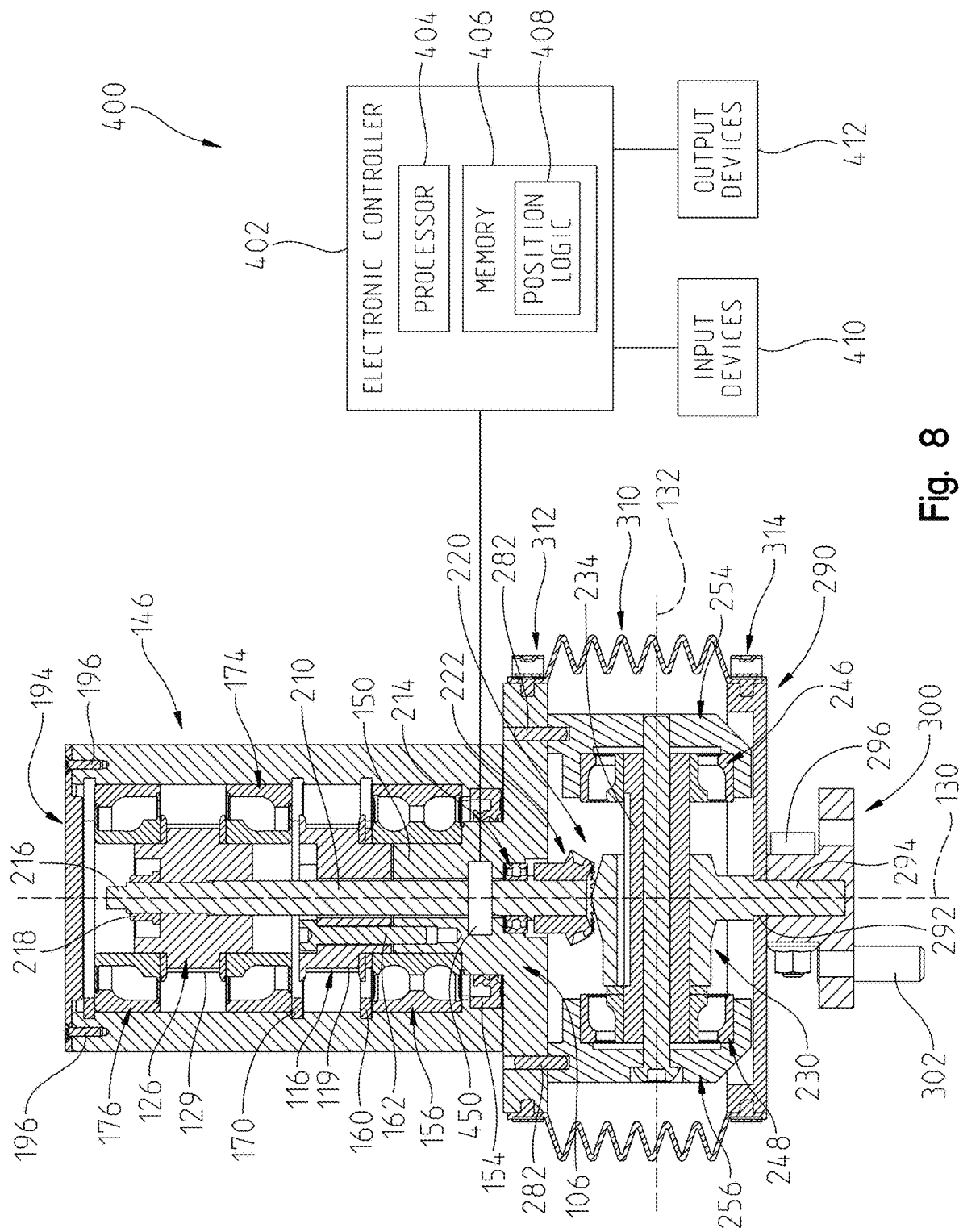
FIG. 8 illustrates the view of FIG. 6 including a clutch.
Figure 8B:
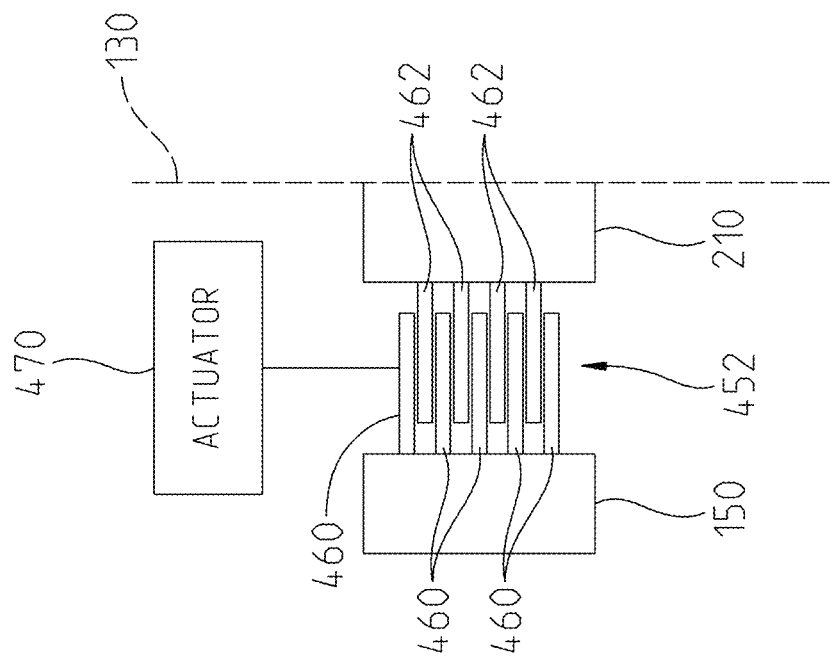
FIG. 8B illustrates a representative view of the clutch of FIG. 8A in an engaged state.
Figure 8A:
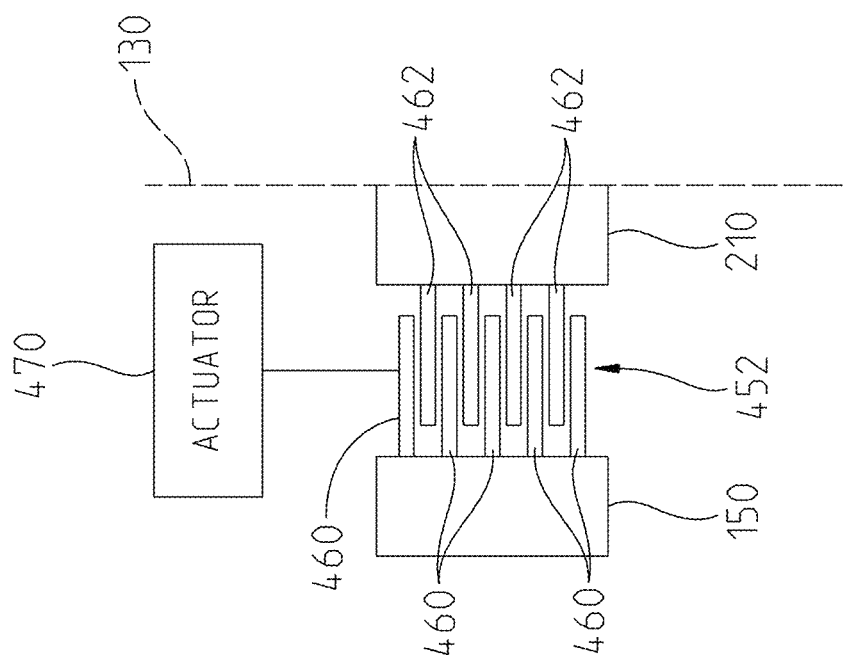
FIG. 8A illustrates a representative view of an exemplary clutch in a disengaged state.

In embodiments, a clutch 450 is provided between axle 210 and post 150 of intermediate base 106. Referring to FIGS. 8A and 8B, in embodiments, clutch 450 includes a plurality of pressure plates 452 and an actuator 470. A first portion 460 of the plurality of pressure plates 452 are coupled to post 150 of intermediate base 106 and a second portion 462 of the plurality of pressure plates 452 are coupled to axle 210. In embodiments, plurality of pressure plates 452, axle 210, and post 150 all are splined to permit the movement of plurality of pressure plates 452 relative to each other, but to couple first portion 460 of plurality of pressure plates 452 to post 150 of intermediate base 106 and couple second portion 462 of plurality of pressure plates 452 to axle 210.

In a disengaged state of clutch 450 (see FIG. 8A), plurality of pressure plates 452 are spaced apart and axle 210 and second portion 462 of plurality of pressure plates 452 may rotate relative to post 150 of intermediate base 106 and first portion 460 of plurality of pressure plates 452 about first axis 130. In an engaged state of clutch 450 (see FIG. 8B), plurality of pressure plates 452 are in contact with each other and axle 210 and second portion 462 of plurality of pressure plates 452 rotate as a unit with post 150 of intermediate base 106 and first portion 460 of plurality of pressure plates 452 about first axis 130. The movement of plurality of pressure plates 452 is controlled by actuator 470 which in embodiments is one of a hydraulic or pneumatic actuator.

In embodiments, each of motor 114 and motor 115 include encoders to provide an indication of a rotational position of the rotor of the respective motor 114 and motor 115 to position logic 408. When clutch 450 is in an engaged state, position logic 408 allows motor 115 to spin freely and after motor 114 has positioned intermediate base 106 in a desired orientation about first axis 130, position logic 408 sets the current encoder value from motor 115 equal to the prior angular value of output mount 104 relative to base 102 prior to clutch 450 being engaged.

Position logic 408 actuates second drive system 120 to position output mount 104 relative to intermediate base 106 about second axis 132. In embodiments, output mount 104 is rotatable about second axis 132 up to about 45 degrees in each direction relative to intermediate base 106. In other embodiments, output member 104 is rotatable about second axis 135 through a smaller range or larger range.

An exemplary processing sequence of position logic 408 includes the steps of coupling tool 350 to output mount 104; rotating output mount 104 about first axis 130 with first drive system 110 to place tool 350 in a first pose relative to base 102 and rotating output mount 104 about second axis 132 with second drive system 120 to place tool 350 in a second pose different from the first pose relative to base 102. In embodiments, during the rotation of output mount 104 about first axis 130 with first drive system 110 to place tool 350 in the first pose relative to base 102, position logic 408 further operates second drive system 120 to prevent rotation of output mount 104 about second axis 132.

Another exemplary processing sequence of position logic 408 when rotational drive 100 includes a clutch 450 includes the steps of coupling tool 350 to output mount 104, placing clutch 450 in the engaged state, rotating output mount 104 about first axis 130 with first drive system 110 to place tool 350 in a first pose relative to base 102, placing clutch 450 in the disengaged state, and rotating output mount 104 about second axis 132 with second drive system 120 to place tool 350 in a second pose different from the first pose relative to base 102.

Figure 9:
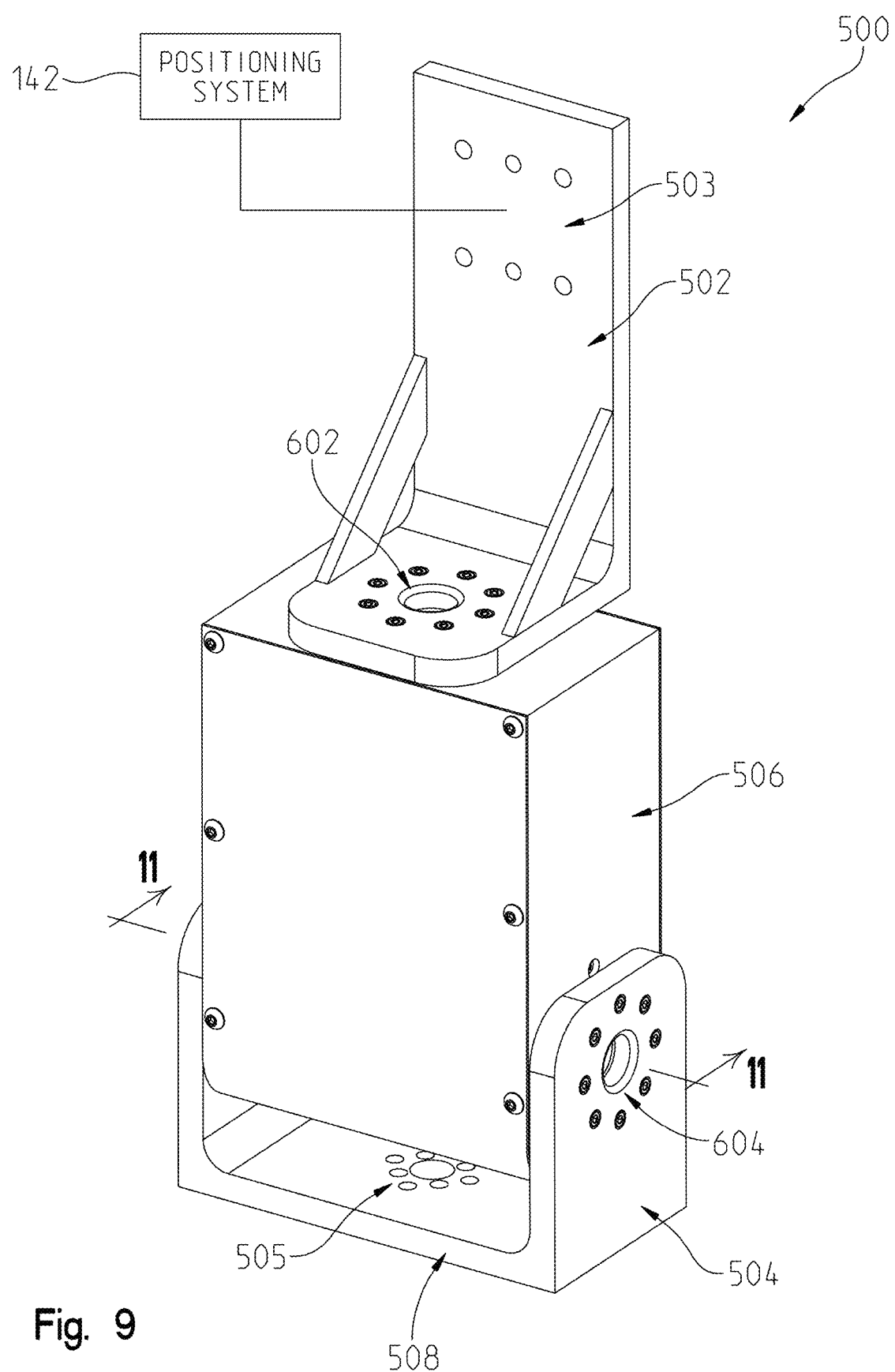
FIG. 9 illustrates a perspective view of another exemplary rotational drive.
Figure 10:
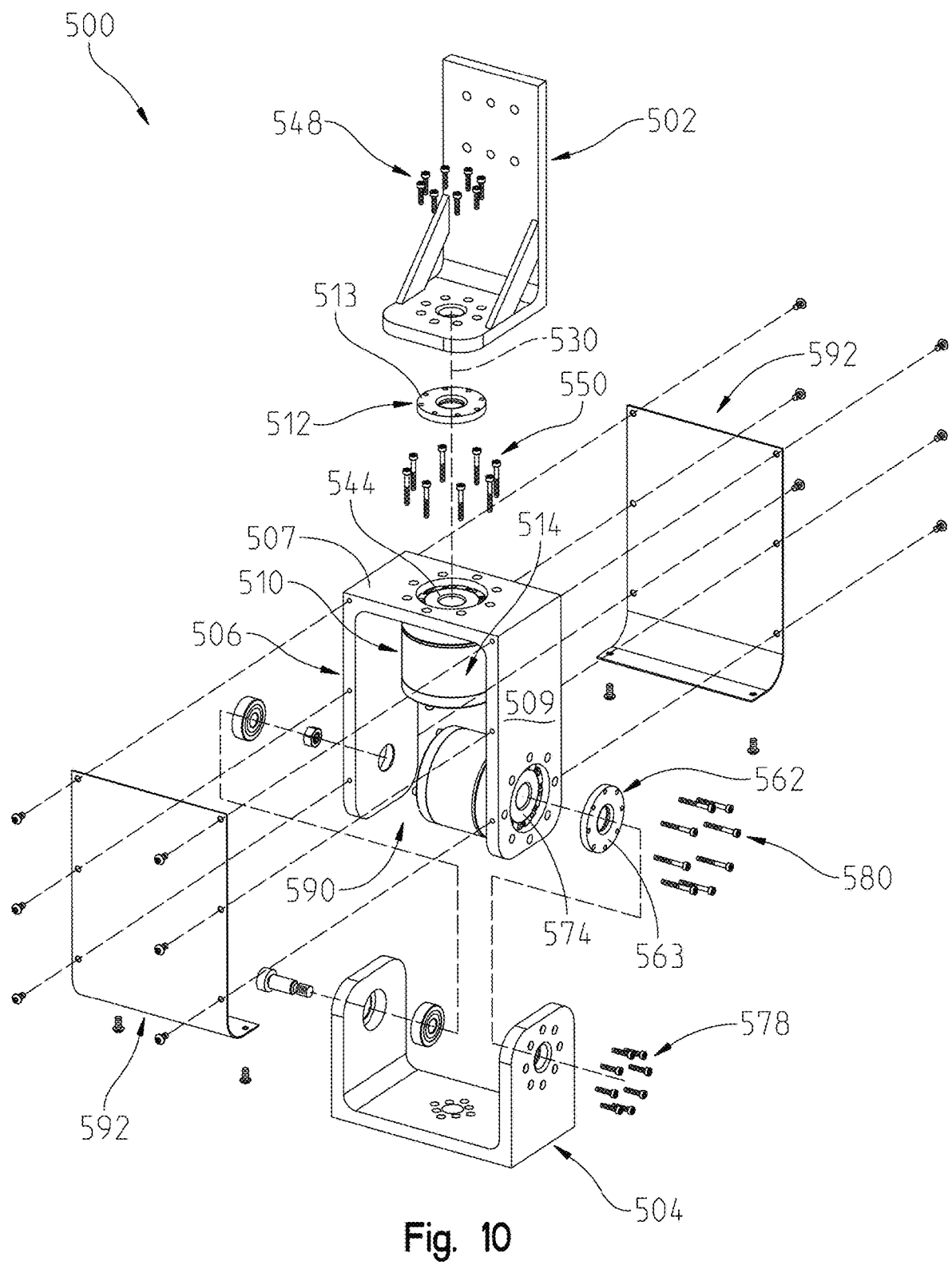
FIG. 10 illustrates an exploded view of the rotational drive of FIG. 9.

Referring to FIG. 9, another exemplary rotational drive 500 is shown. Rotational drive 500 includes a base 502, an output mount 504 rotatable relative to base 502, and an intermediate base 506 positioned between base 502 and output mount 504. Referring to FIG. 10, rotational drive 500 further includes a first drive system 510 coupled to base 502 and intermediate base 506 to rotate intermediate base 506 relative to base 502 about a first axis 530. The rotation of intermediate base 506 causes a corresponding rotation in output mount 504 about first axis 530. First drive system 510 includes a drive output 516 which is rotatable driven by a motor 514.

Figure 11:
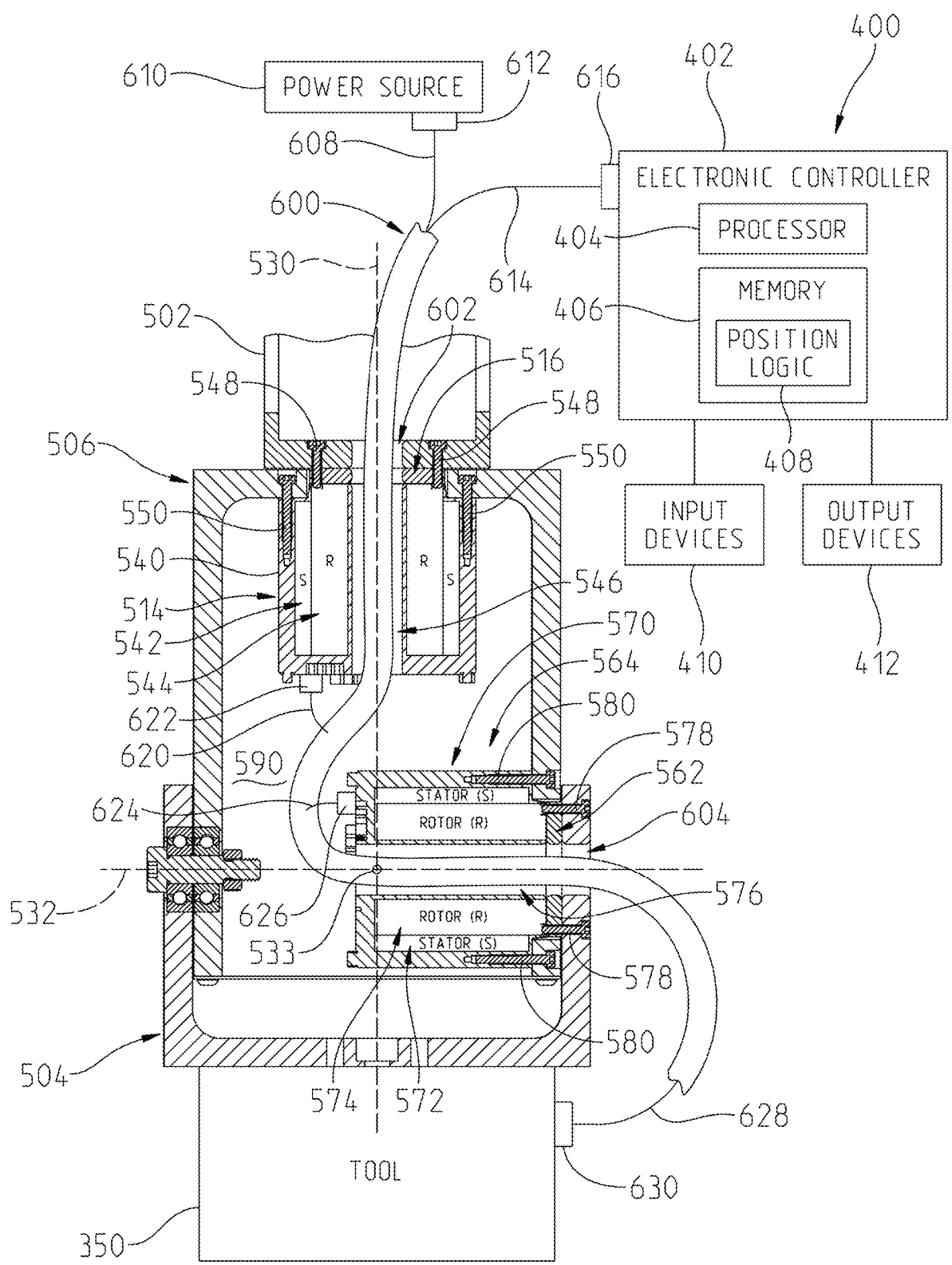
FIG. 11 illustrates a side view of the rotational drive of FIG. 9.

Referring to FIG. 11, motor 514 includes a housing 540, a stator 542 supported by the housing 540, and a rotor 544 rotatable relative to stator 542 and by stator 542. Motor 514 further includes a central opening 546. A plurality of fasteners 548 couple base 502 to rotor 544 through drive output 516 (see FIG. 11). Another set of fasteners 550 couples intermediate base 506 to housing 540 of motor 514. As stator 542 executes a force on rotor 544, stator 542 and housing 540 rotate relative to rotor 544 about first axis 530 due to rotor 544 being held relative to base 502. This rotation in turn causes intermediate base 506 to rotate relative to base 502 about first axis 530.

A thickness of drive output 516 may be selected to result in an upper surface 513 of drive output 516 to extend beyond an upper surface 507 of intermediate base 506 which maintains a gap between base 502 and intermediate base 506. An advantage, among others, of this gap is a greater ease in rotating intermediate base 506 relative to base 502 about first axis 530.

A second drive system 560 is coupled to intermediate base 506 and output mount 504 to rotate output mount 504 relative to intermediate base 506 about a second axis 532 (see FIG. 11). Second drive system 560 includes a drive output 562 which is rotatable driven by a motor 564. Motor 564 includes a housing 570, a stator 572 supported by the housing 570, and a rotor 574 rotatable relative to stator 572 and by stator 572. Motor 564 further includes a central opening 576. A plurality of fasteners 578 couple output mount 504 to rotor 574 through drive output 562 (see FIG. 11). Another set of fasteners 580 couples intermediate base 506 to housing 570 of motor 564. As stator 572 executes a force on rotor 574, rotor 574 and drive output 562 rotate relative to stator 572 about second axis 532 due to stator 572 being held relative to intermediate base 506. This rotation in turn causes output mount 504 to rotate relative to intermediate base 506 about second axis 532.

Second axis 532 is angled relative to first axis 530. In the illustrated embodiment, second axis 532 is generally perpendicular to first axis 530. Further, in embodiments, second axis 532 intersects first axis 530 at an intersection point 533. Intersection point 533 remains stationary relative to base 502 as output mount 504 is moved by each of first drive system 510 and second drive system 520.

A thickness of drive output 562 may be selected to result in a surface 563 of drive output 562 to extend beyond a surface 509 of intermediate base 506 which maintains a gap between output mount 504 and intermediate base 506. An advantage, among others, of this gap is a greater ease in rotating output mount 504 relative to intermediate base 506 about second axis 532. An opposite end of output mount 504 may be coupled to intermediate base 506 through a bearing 582 received in recess of intermediate base 506 and a bearing 584 received in a recess of output mount 504. Bearings 582, 584 are held in place with a shoulder bolt 586 and associated nut 588. Other methods of rotatably coupling output mount 504 to intermediate base 506 may be used.

An interior 590 of intermediate base 506 is enclosed with a pair of covers 592 which are coupled to intermediate base 506 through a plurality of fasteners 594. Covers 592 keep debris away from motors 514, 564 and assist in retaining portions of a wire harness 600 (see FIG. 11) within interior 590 of intermediate base 506.

Turning to FIG. 11, wire harness 600 extends through an opening 602 in base 502, through opening 546 of motor 514 into interior 590 of intermediate base 506. In embodiments, wire harness 600 continues through opening 576 of motor 564 and out of opening 604 of output mount 504. A first end of wire harness 600 has at least one wire 608 that coupled to a power source 610 with a first coupler 612 (e.g. a plug) and at least one wire 614 that is coupled to control system 400 with a second coupler 616 (e.g. a plug). Exemplary power sources 610 include a power bus of a robotic arm 1202 to which rotational drive 500 is coupled. In embodiments, a second end of wire harness 600 has at least one wire 620 that is coupled to motor 514 with a third coupler 622 (e.g. a plug) and at least one wire 624 that is coupled to motor 564 with a fourth coupler 626 (e.g. a plug). As such, wire harness 600 may provide power to each of motor 514 and motor 564 and send information between electronic controller 402 and each of motor 514 and motor 564. Such information may include instructions for an on-board controller to actuate a respective one or both of motor 514 and motor 564 and/or receive sensor values from one or both of motor 514 and motor 564 such as representative of motor positions. In the illustrated embodiment, the second end of wire harness 600 has at least one wire 628 that is coupled to tool 350 with a fifth coupler 630 (e.g. a plug) and each of at least one wire 620 and at least one wire 624 are extending from a middle portion of wire harness 600. As such, wire harness 600 may provide power to each of motor 514, motor 564, and tool 350 and send information between electronic controller 402 and each of motor 514, motor 564, and tool 350. Such information may include instructions for an on-board controller to actuate a respective one or both of motor 514 and motor 564 and/or receive sensor values from one or both of motor 514 and motor 564 such as representative of motor positions. Additionally, such information may include instructions for an on-board controller of tool 350 to alter a magnetic field characteristic of a magnetic tool, information from tool 350 on part presence, part orientation relative to tool 350, strength of part coupling to tool 350, and additional information and/or receive sensor values from tool 350 from which part presence, part orientation relative to tool 350, and other characteristics may be determined. Exemplary part presence and part orientation determinations are disclosed in U.S. Pat. No. 11,850,708, the entire disclosure of which is expressly incorporated by reference herein.

In embodiments, electronic controller 402 communicates with one or more of motor 514, motor 564, and tool 350 over a wireless connection instead of through wire harness 600. The respective ones of electronic controller 402, motor 514, motor 516, and tool 350 include transceivers to allow the wireless communication. In embodiments, power is transmitted to one or more of motor 514, motor 564, and tool 350 inductively instead of through wire harness 600.

Referring to FIG. 1, base 502 includes a support 503. Support 503 is coupled to a positioning system 142 (see FIG. 1) through a plurality of fasteners (not shown). Exemplary positioning systems include robot arms, such as industrial robots in an assembly plant setting, adjustable end-of-arm tools for robot arms, and adjustable fixtures. Exemplary adjustable end-of-arm tools for robot arms and adjustable fixtures are described herein and disclosed in PCT Application Publication No. WO2022/261520 published Dec. 15, 2022, titled ADJUSTABLE END-OF-ARM TOOL OR FIXTURE, the entire disclosure of which is expressly incorporated by reference herein.

Output mount 504 further includes a tool interface 505 in a lower portion 508, illustratively openings 505, which receive fasteners (not shown) or other suitable devices to couple a tool 350 to output mount 504. Exemplary tools 350 include grippers, pin clamps, clamps, and locators. Exemplary locators include pins and other locating features. Exemplary grippers include suction cup grippers, electrostatic grippers, gecko grippers, and magnetic grippers. Suction cup grippers include cups as the respective interface with the workpiece and a pneumatic system which selectively applies a vacuum to the cup grippers to hold the workpiece relative to rotational drive 500. Magnetic grippers are used with ferromagnetic workpieces and generally include pole shoes as the respective interface with the workpiece and a magnetic flux source which supplies a magnetic flux at the surface of the pole shoes to create a magnetic circuit through the pole shoes and workpiece. Exemplary magnetic flux sources include electromagnets, electro-permanent magnets, rare earth permanent magnets, other suitable magnets, and combinations thereof. Exemplary magnetic grippers are disclosed in the Magnetic Gripper References mentioned and incorporated herein. Additionally, rotational drive 500 may be included as part of the systems described in PCT Patent Application No. PCT/US22/33154, filed Jun. 11, 2022, titled ADJUSTABLE END-OF-ARM TOOL OR FIXTURE and PCT Patent Application No. PCT/US22/33676, filed Jun. 15, 2022, titled COMPONENT HANDLING SYSTEMS AND METHODS, the entire disclosures of which are expressly incorporated by reference herein.

Referring to FIG. 11, rotational drive 500 further includes a control system 400 including an electronic controller 402 which is described herein. In relation to rotational drive 500, position logic 408 includes logic to orient output mount 504 and hence tool 350 relative to base 502 and positioning system 142. In embodiments, each of motor 514 and motor 564 include encoders to provide an indication of a rotational position of the rotor of the respective motor 514 and motor 564 to position logic 408. In embodiments wherein tool 350 includes a magnetic gripper, the position logic 408 of memory 406 may include logic to control the configuration of the magnetic coupling devices and may include logic to determine one or more characteristics of a magnetic circuit formed between the magnetic coupling device and an external workpiece, such as described in the Magnetic Gripper References, the subject matter of which is expressly incorporated by reference herein.

Figure 12:
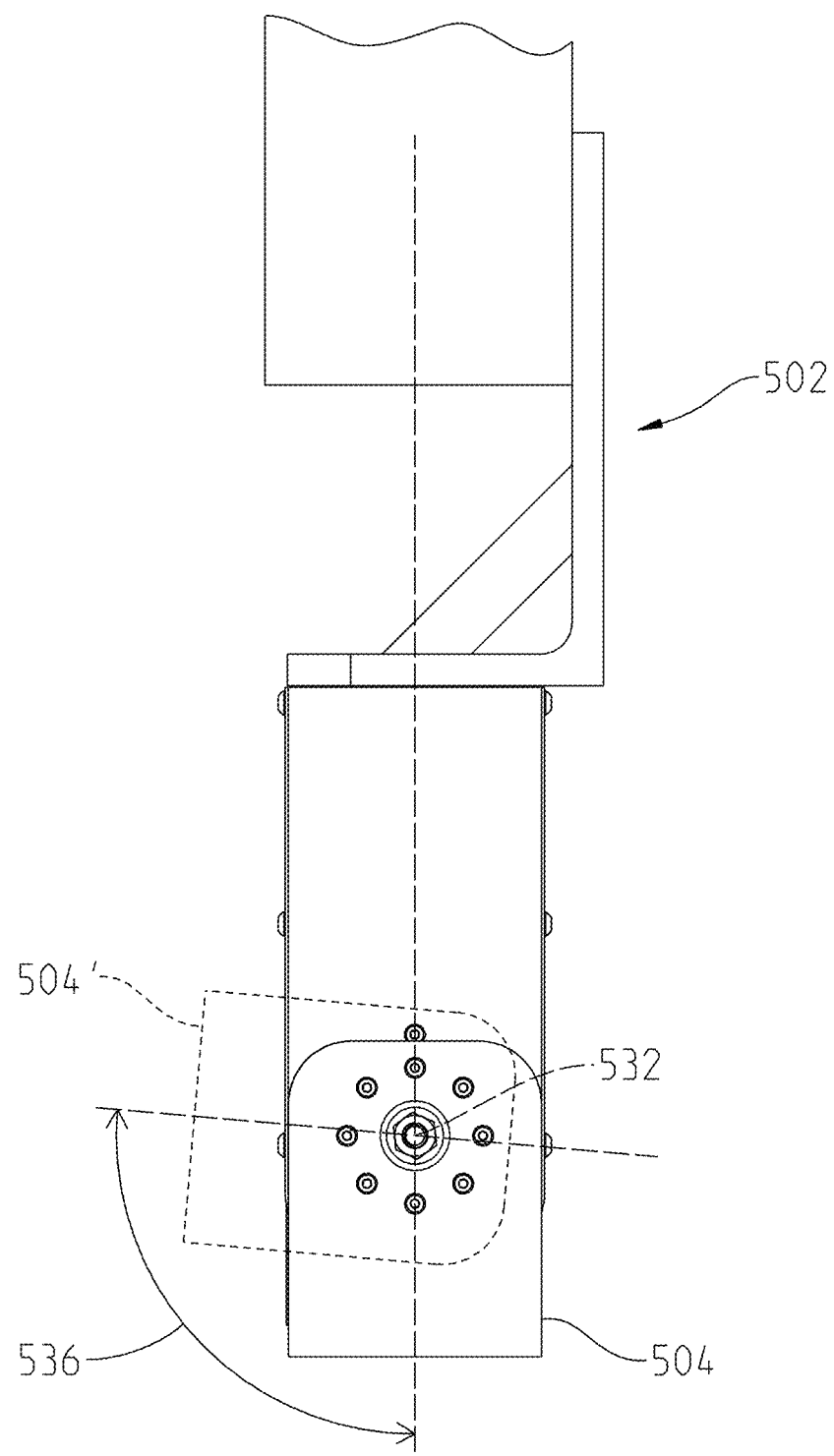
FIG. 12 illustrates a rear view of the rotational drive of FIG. 9.

Position logic 408 of electronic controller 402 controls motor 514 and motor 564 to orient output mount 504 relative to base 502. Motor 514 may be driven by position logic 408 of electronic controller 402 to rotate output mount 504 about first axis 530. In embodiments, intermediate base 506 and output mount 504, and hence tool 350 may rotate a whole 360 degrees about first axis 530 in either a clockwise or counterclockwise direction. In embodiments, intermediate base 506 and output mount 504, and hence tool 350 may rotate greater than 360 degrees about first axis 530 in either a clockwise or counterclockwise direction. In embodiments, output mount 504 is rotatable relative to intermediate base 506 about axis 532 by an angle 536 in each direction from vertical (axis 530). In FIG. 12, output mount 504 is shown in a first position aligned with first axis 530 and a rotated position 504'. Angle 536 may be up to about 60 degrees in each direction, up to about 95 degrees in each direction, and other suitable angles. In embodiments, with a larger separation between lower portion 508 and intermediate base 506 about axis 532 and/or a narrower profile of lower portion 508 or intermediate base 506 the range of motion may be increased.

An exemplary processing sequence of position logic 408 includes the steps of coupling tool 350 to output mount 504; rotating output mount 504 about first axis 530 with first drive system 510 to place tool 350 in a first pose relative to base 502 and rotating output mount 504 about second axis 532 with second drive system 520 to place tool 350 in a second pose different from the first pose relative to base 502. In embodiments, during the rotation of output mount 504 about first axis 530 with first drive system 510 to place tool 350 in the first pose relative to base 502, position logic 408 further operates second drive system 520 to prevent rotation of output mount 504 about second axis 532. This processing sequence corresponds to the relationship of rotational drive 500 shown in FIGS. 9-14.

Figure 15:
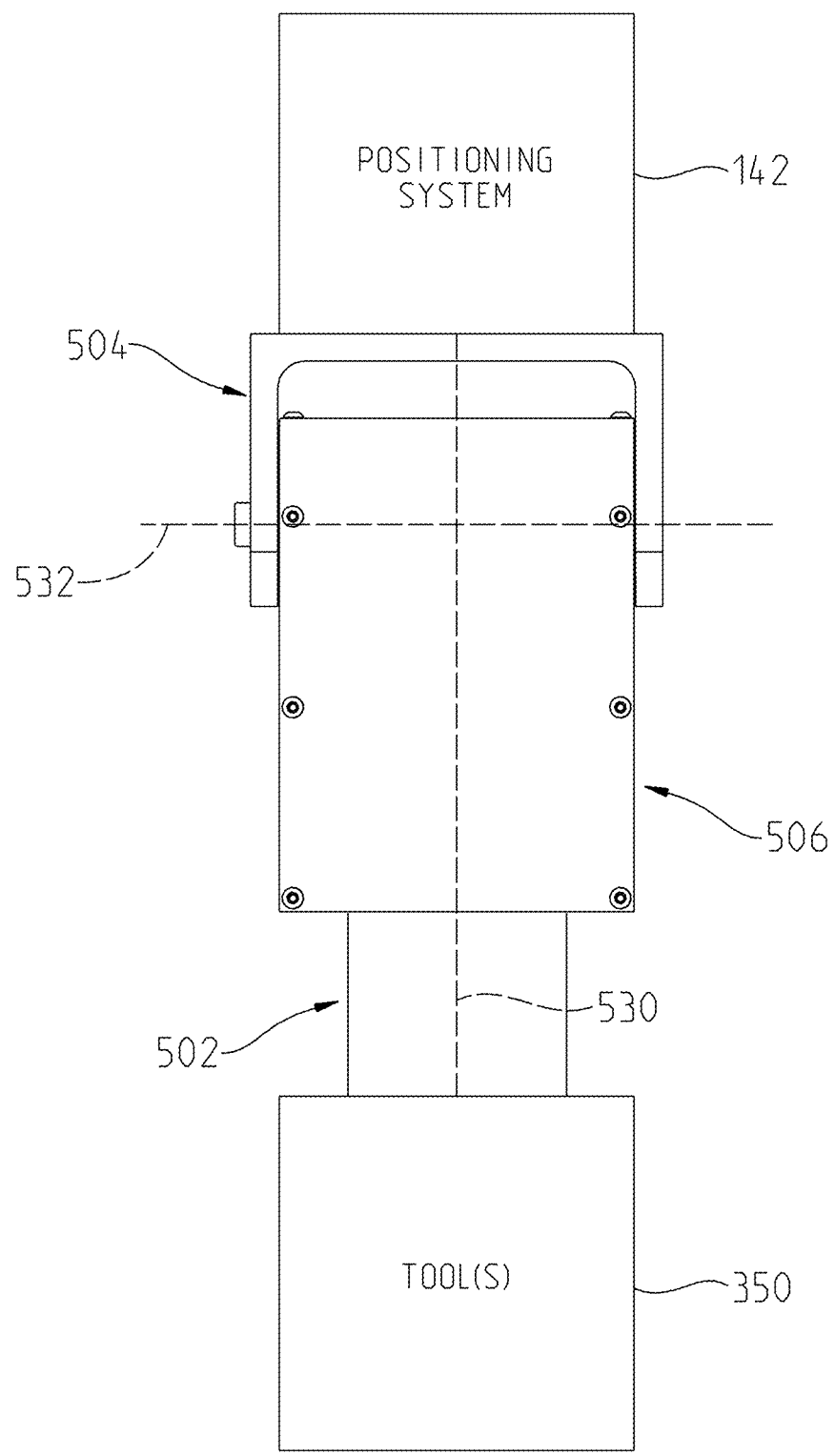
FIG. 15 illustrates the rotational drive of FIG. 9 in a second configuration.

Another exemplary processing sequence of position logic 408 corresponds to the relationship of rotational drive 500 shown in FIG. 15. The processing sequence includes the steps of coupling tool 350 to base 502 which in FIG. 15 operates as an output mount and coupling output mount 504 which in FIG. 15 operates as a base to positioning system 142; rotating intermediate base 506 about second axis 532 with motor 564 to place tool 350 in a first pose relative to base 504; and rotating output mount 502 about first axis 530 with motor 514 to place tool 350 in a second pose different from the first pose relative to base 504. In embodiments, position logic 508 operates motor 514 and motor 564 simultaneously. An advantage, among others, of the relationship of rotational drive 500 shown in FIG. 15 is that tool 350 may be set along a first vector direction by positioning logic and can remain along that vector direction while tool 350 is rotated about first axis 530, such as to orient pole shoes of a magnetic coupling device to a part.

Figure 16:
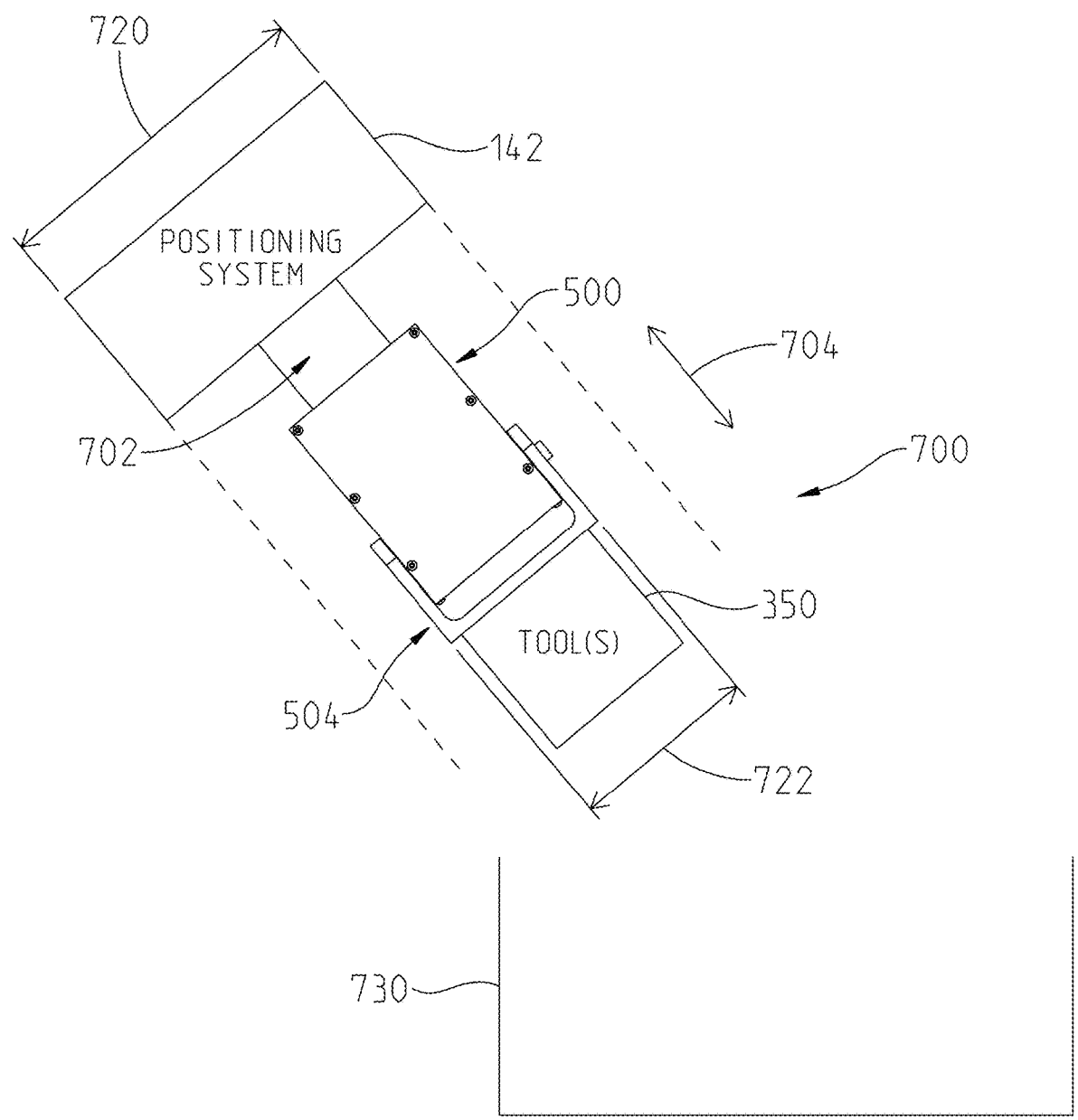
FIG. 16 illustrates an exemplary end-of-arm-tool in a retracted position relative to a container.
Figure 17:
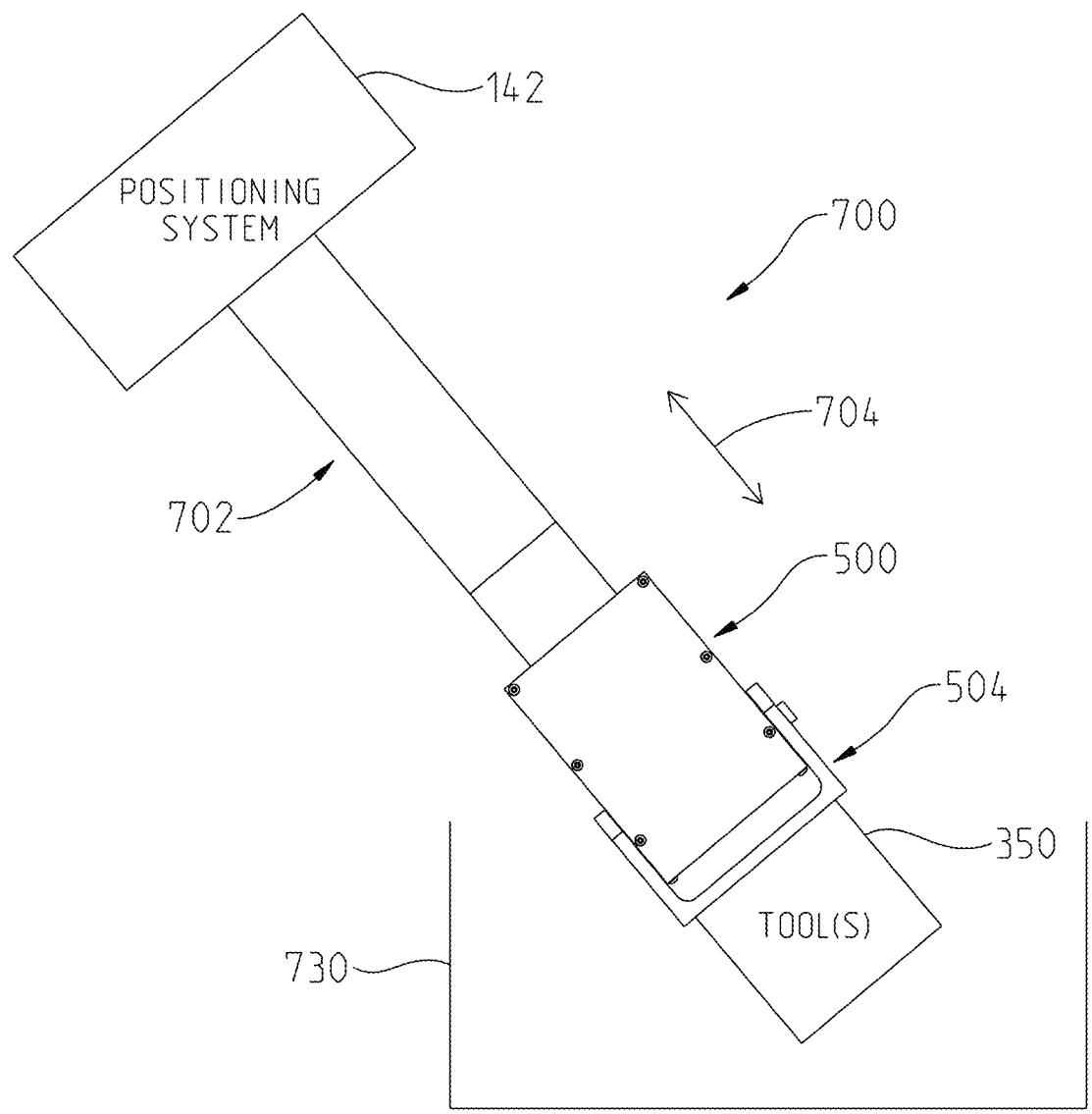
FIG. 17 illustrates the exemplary end-of-arm-tool of FIG. 16 in an extended position relative to the container.

Referring to FIGS. 16 and 17, rotational drive 500 is part of an EOAT 700. EOAT 700 includes a linear adjustment assembly 702 which may position rotational drive 500 along a first linear axis 704. One or more tools 350 are coupled to output mount 504 of rotational drive 500. EOAT 700 is coupled to positioning system 142, such as a robot arm. Positioning system 142 has a first envelope 720 at the end to which EOAT 700 is coupled. EOAT 700 has a second envelope 722 which is smaller than first envelope 720.

FIG. 16 shows EOAT 700 is a retracted position relative to a container 730 which may contain a plurality of ferromagnetic workpieces to be moved by rotational drive 500. FIG. 17 shows EOAT 700 in an extended position with tool 350 in container 730. The smaller envelope 722 of EOAT 700 700 and the rotational capabilities of rotational drive 500 permit tool 350 to navigate into corners of container 730 than traditional end-of-arm-tools.

Figure 18:
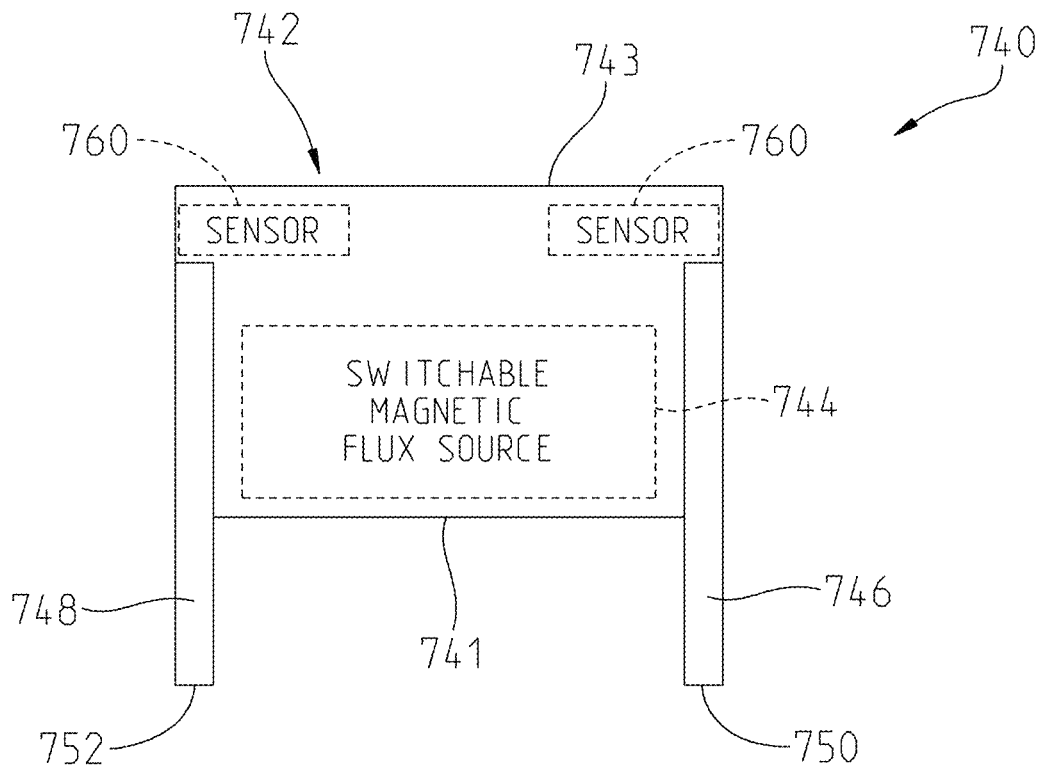
FIG. 18 illustrates an exemplary magnetic coupling device.

Various types of tools 350 may be coupled to rotational drive 500. Referring to FIG. 18, a magnetic gripper 740 having a housing 742 and a switchable magnetic flux source 744. Magnetic gripper 740 further includes a first pole shoe 746 and a second pole shoe 748 which are magnetically coupled to switchable magnetic flux source 744 to couple a ferromagnetic workpiece at interface 750 of first pole shoe 746 and interface 752 of second pole shoe 748. Additionally, as disclosed herein and in the Magnetic Gripper References, magnetic gripper 740 may include one or more sensors 760, such as magnetic flux sensors, which may be used to monitor a characteristic of the magnetic coupling of a ferromagnetic workpiece to magnetic gripper 740.

Figure 19:
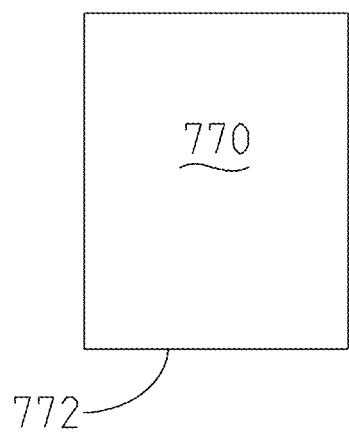
FIG. 19 illustrates a first exemplary pole shoe with a flat interface.
Figure 20:
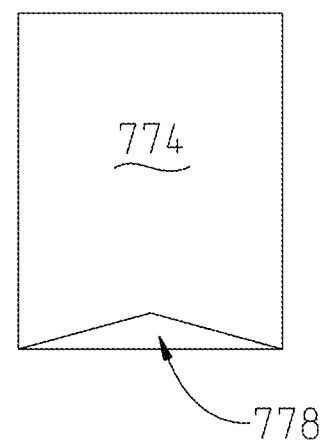
FIG. 20 illustrates a second exemplary pole shoe with a V-shaped interface.
Figure 21:
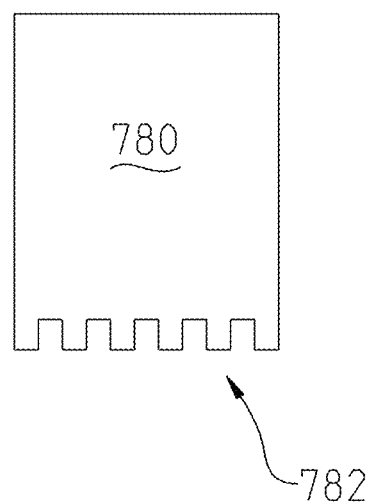
FIG. 21 illustrates a third exemplary pole shoe with a sawtooth interface.

Referring to FIG. 19, a first pole shoe 770 having a flat interface 772 is shown. Referring to FIG. 20, a second pole shoe 774 having a V-shaped interface 778. Referring to FIG. 21, a third pole shoe 780 having a sawtooth interface 782.

Figure 22:
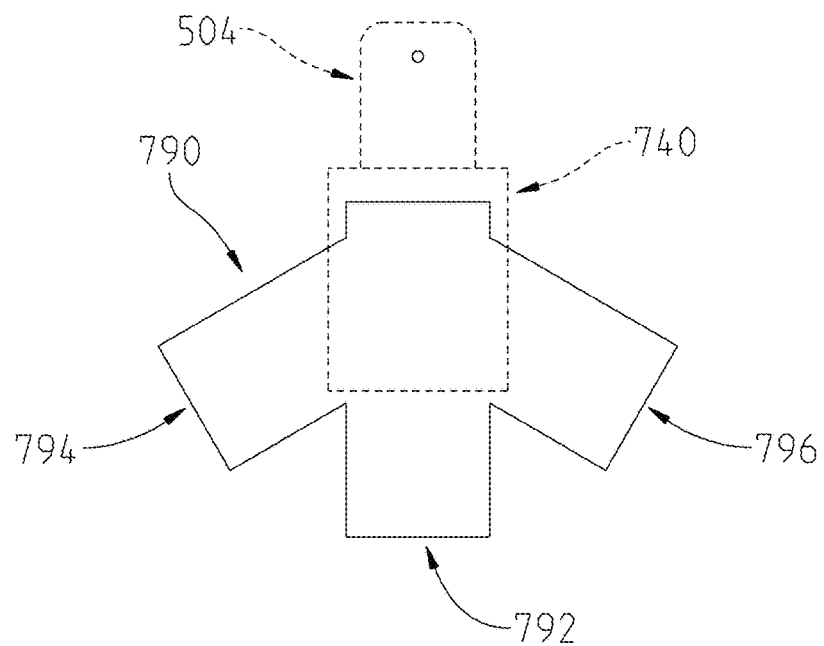
FIG. 22 illustrates a fourth exemplary pole shoe with multiple interfaces in a first pose.
Figure 23:
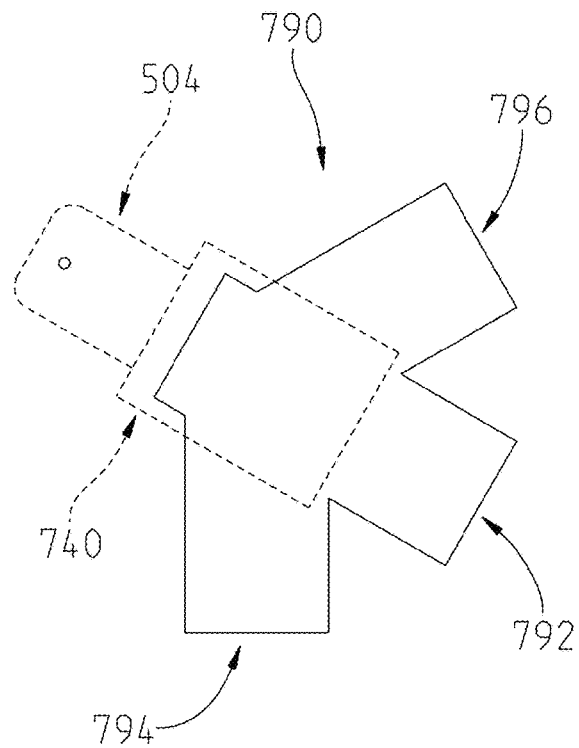
FIG. 23 illustrates the pole shoe of FIG. 22 in a second pose.
Figure 24:
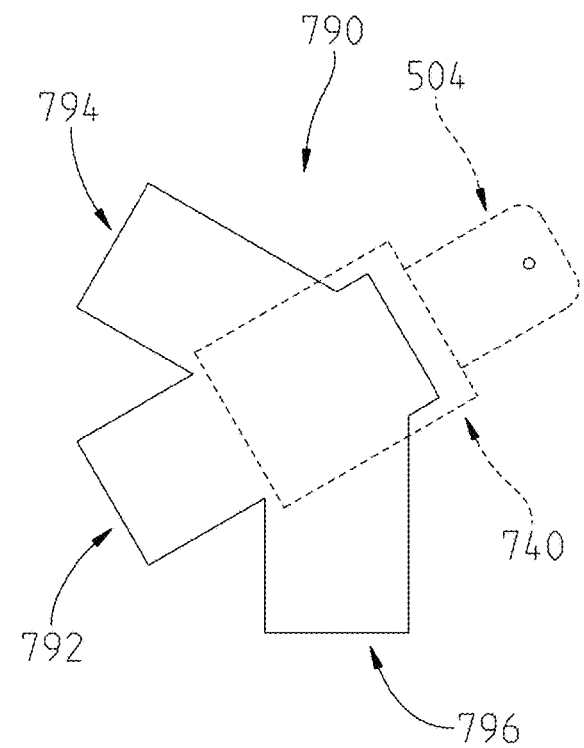
FIG. 24 illustrates the pole shoe of FIG. 22 in a third pose.

Referring to FIG. 22, a pole shoe 790 is illustrated coupled to magnetic gripper 740 (a second instance of pole shoe 790 is coupled to the other side of magnetic gripper 740) which is in turn coupled to output mount 504 of rotational drive 500. Pole shoe 790 includes a plurality of spaced apart interfaces, each of which may be coupled to a respective ferromagnetic workpiece. In the illustrated embodiment, pole shoe 790 includes a first interface 792, a second interface 794, and a third interface 796. In FIG. 22, magnetic gripper 740 is in a first pose with pole shoe 790 located with interface 792 being generally horizontal to couple a ferromagnetic workpiece. In FIG. 23, magnetic gripper 740 is in a second pose with pole shoe 790 located with interface 794 being generally horizontal to couple a ferromagnetic workpiece. In FIG. 24, magnetic gripper 740 is in a third pose with pole shoe 790 located with interface 796 being generally horizontal to couple a ferromagnetic workpiece. In embodiments, switchable magnetic flux source 744 of magnetic gripper 740 may be placed in a first partial on state to couple a first ferromagnetic workpiece to one of first interface 792, second interface 794, and third interface 796 followed by switchable magnetic flux source 744 of magnetic gripper 740 being placed in a second partial on state, the second partial on state having a higher magnetic flux than the first partial on state, to couple a second ferromagnetic workpiece to an open one of first interface 792, second interface 794, and third interface 796 while the first ferromagnetic workpiece is coupled to pole shoe 790 followed by switchable magnetic flux source 744 of magnetic gripper 740 being placed in a third partial on state, the third partial on state having a higher magnetic flux than the second partial on state, to couple a third ferromagnetic workpiece to an open one of first interface 792, second interface 794, and third interface 796 while the first ferromagnetic workpiece and the second ferromagnetic workpiece are coupled to pole shoe 790. As shown, each of first interface 792, second interface 794, and third interface 796 have the same profile. In embodiments, one or more of first interface 792, second interface 794, and third interface 796 has a first profile shaped for a first part and one or more of first interface 792, second interface 794, and third interface 796 has a second profile shaped for a second part, the second profile being different than the first profile. By coupling multiple individual parts to magnetic coupling device 740 at the same time a number of return trips by EOAT 700 to container 730 may be reduced.

Figure 18A:
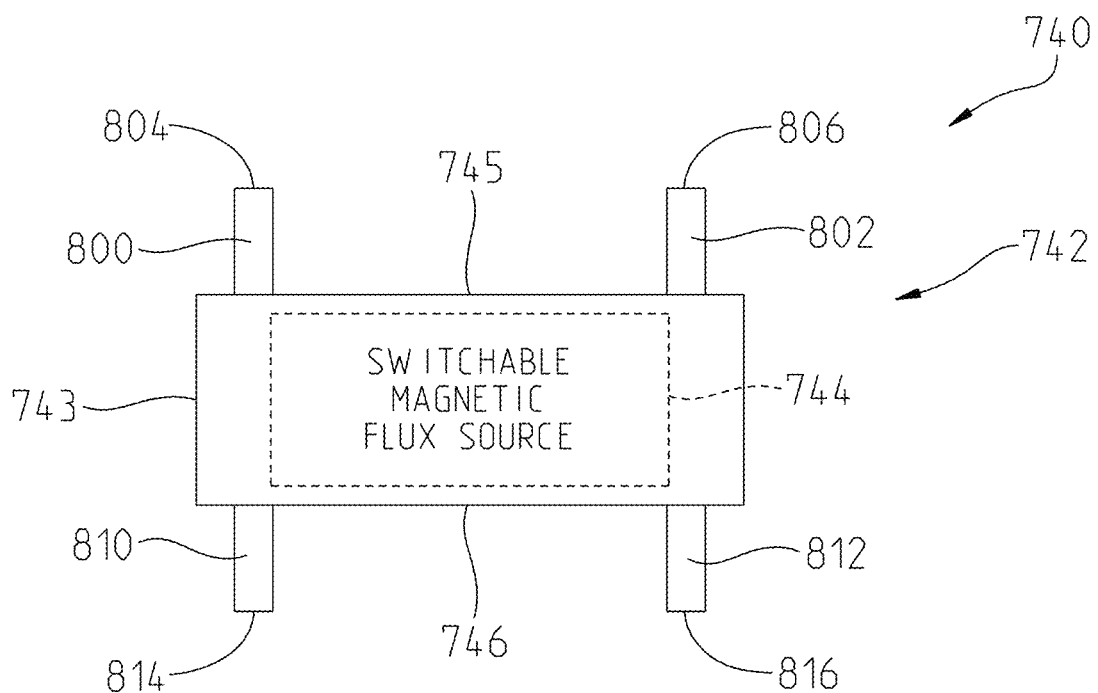
FIG. 18A illustrates a top view of an exemplary arrangement of the magnetic coupling device of FIG. 18.

Another arrangement is shown in FIG. 18A. In this arrangement, magnetic gripper still have poles shoes 746, 746 with interfaces 750, 752 extending below a bottom surface of housing 742. A top surface 743 of housing is coupled to one or more of the systems disclosed herein, such as EOAT 700. Each of side surfaces 745, 749 of housing 742 may also be used to couple parts to magnetic gripper 740 with magnetic flux source 744. A first pair of pole shoes 804, 806 with respective interfaces 804, 806 are shown extending from side 745. A second pair of pole shoes 810, 812 with respective interfaces 814, 816 are shown extending from side 749. With pole shoes 748, 750 a first part may be coupled to magnetic gripper 740. With pole shoes 800, 802 a second part may be coupled to magnetic gripper 740. With pole shoes 810, 812 a third part may be coupled to magnetic gripper 740. Each of first part, second part, and third part may be coupled to magnetic gripper 740 at the same time to reduce a number of return trips by EOAT 700 to container 730. As shown, each of interfaces 750, 752, 804, 806, 814, and 816 have the same profile. In embodiments, the magnetic flux level of magnetic flux source 744 is increased every time an additional part is to be coupled to magnetic gripper 740, as described herein. In embodiments, one or more of the interfaces may have a first profile shaped for a first part and one or more of the interfaces may have a second profile shaped for a second part, the second profile being different than the first profile. In embodiments, one or more of pole shoe pair 746, 748, pole shoe pair 800, 802, and pole shoe pair 810,812 may be replaced with pole shoes having multiple interfaces, such as pol shoes 790 to increase the number of individual parts to be coupled to magnetic gripper 740 and carried by EOAT 700.

Figure 25:
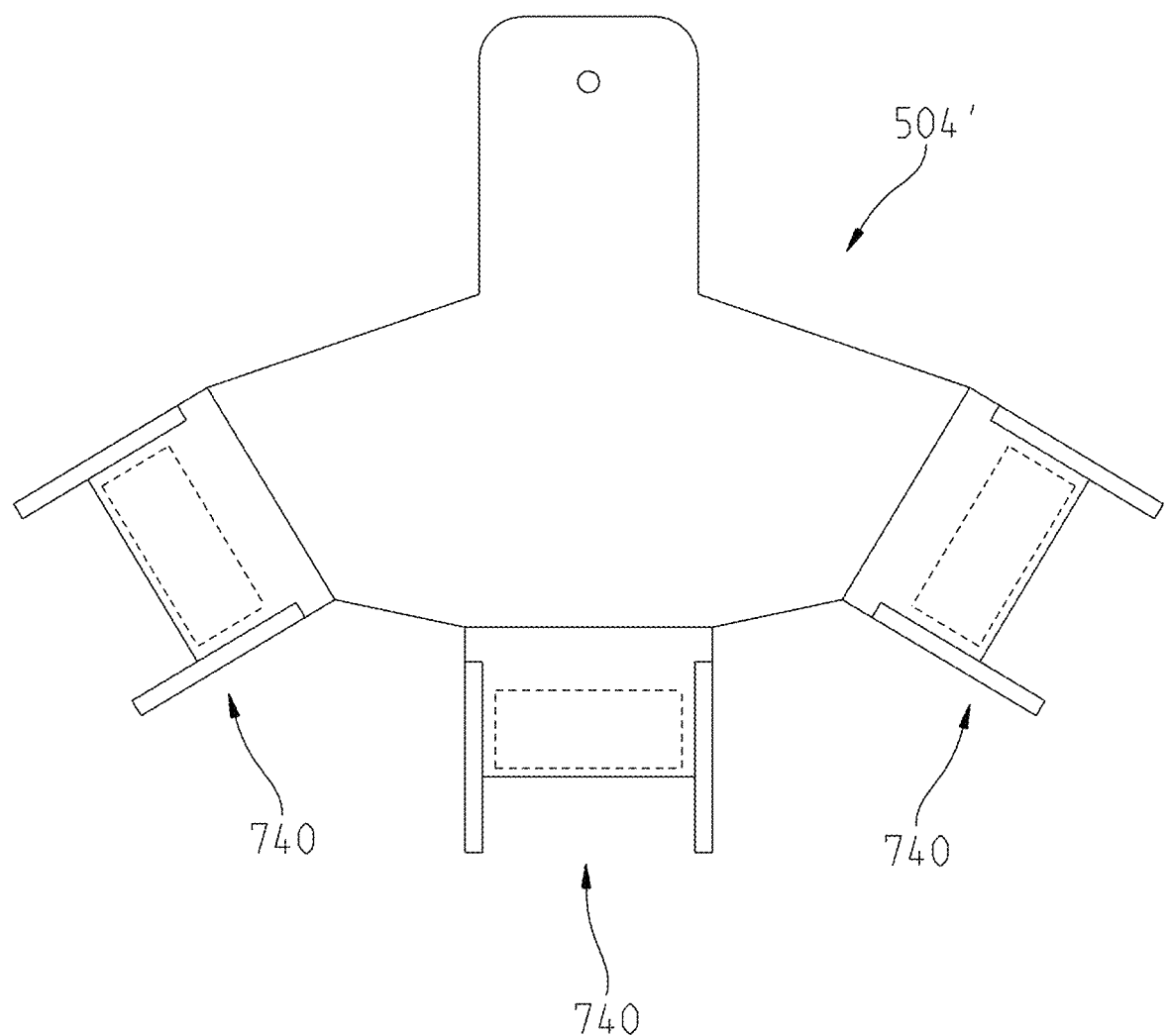
FIG. 25 illustrates an exemplary output mount having multiple tool mount locations.

Referring to FIG. 25, a modified version of output mount 504' is shown. Instead of having a single magnetic gripper 740 coupled to output mount 504 with pole shoes having multiple interfaces, in FIG. 25 output mount 504' has mount locations for multiple magnetic gripper 740, each of which may couple one or more ferromagnetic workpieces to output mount 504' depending on the type of pole shoes used.

In embodiments, either of rotational drive 100 or rotational drive 500 may be implemented as part of the systems disclosed in Published PCT Application No. WO2022261520A1 and Published PCT Application No. WO2022266255A1, the entire disclosures of which are expressly incorporated herein by reference.

In embodiments, either of rotational drive 100 or rotational drive 500 may be attached to an end of a robotic arm, which is an exemplary positioning system 142. Exemplary robotic arms include a first arm segment which is rotatable relative to a base about a vertical axis. The first arm segment is moveably coupled to a second arm segment through a first joint which is opposite the base. At the first joint, the second arm segment may be rotated relative to first arm segment in a first direction. Second arm segment may further be moveably coupled to a third arm segment through a second joint whereat the third arm segment may be rotated relative to second arm segment in a second direction. Rotational drive may be coupled to the free end of the third arm segment or another arm segment attached to the free end of the third arm segment. Additional details of exemplary robotic arms are disclosed in Published PCT Application No. WO2018200948A1, the entire disclosure of which is expressly incorporated by reference herein.

End-of-arm tools (EOATs) and fixtures may be used to manipulate and support objects, for example as part of a manufacturing process. As an example, an EOAT may be coupled to a robot and be used to hold an object or to move an object to a fixture, at which point the object may be supported by the fixture. Exemplary robots include industrial robots having a plurality of links moveably coupled together to alter a position of an end of the robot in space and hence the position of the EOAT. The couplers between the links of the robot may control the end of the robot in one or more translational axes and one or more rotational axes. In embodiments, the end of the robot is controllable in multiple translational axes and multiple rotational axes. However, EOATs and fixtures are typically designed for specific objects, such that a first set of EOATs and/or fixtures may be used for a first group of objects, while a second set of EOATs and/or fixtures may be used for a second group of objects. Thus, transitioning from manufacturing the first group of objects to manufacturing the second group of objects may entail changing out the first set of EOATs and fixtures with the second set of EOATs and fixtures.

This may introduce additional time to the manufacturing process, as well as added complexity and additional space requirements (e.g., to store multiple sets of EOATs and fixtures). Additionally, such specialized EOATS and fixtures may grip objects from multiple edges and/or sides, such that the size of the EOATs and fixtures may be comparable to or exceed that of the objects for which they are used. More powerful robotic devices may be required to effectively control such large EOATs, resulting in additional energy consumption, added mechanical complexity, and increased space requirements, among other detriments.

Figure 33:
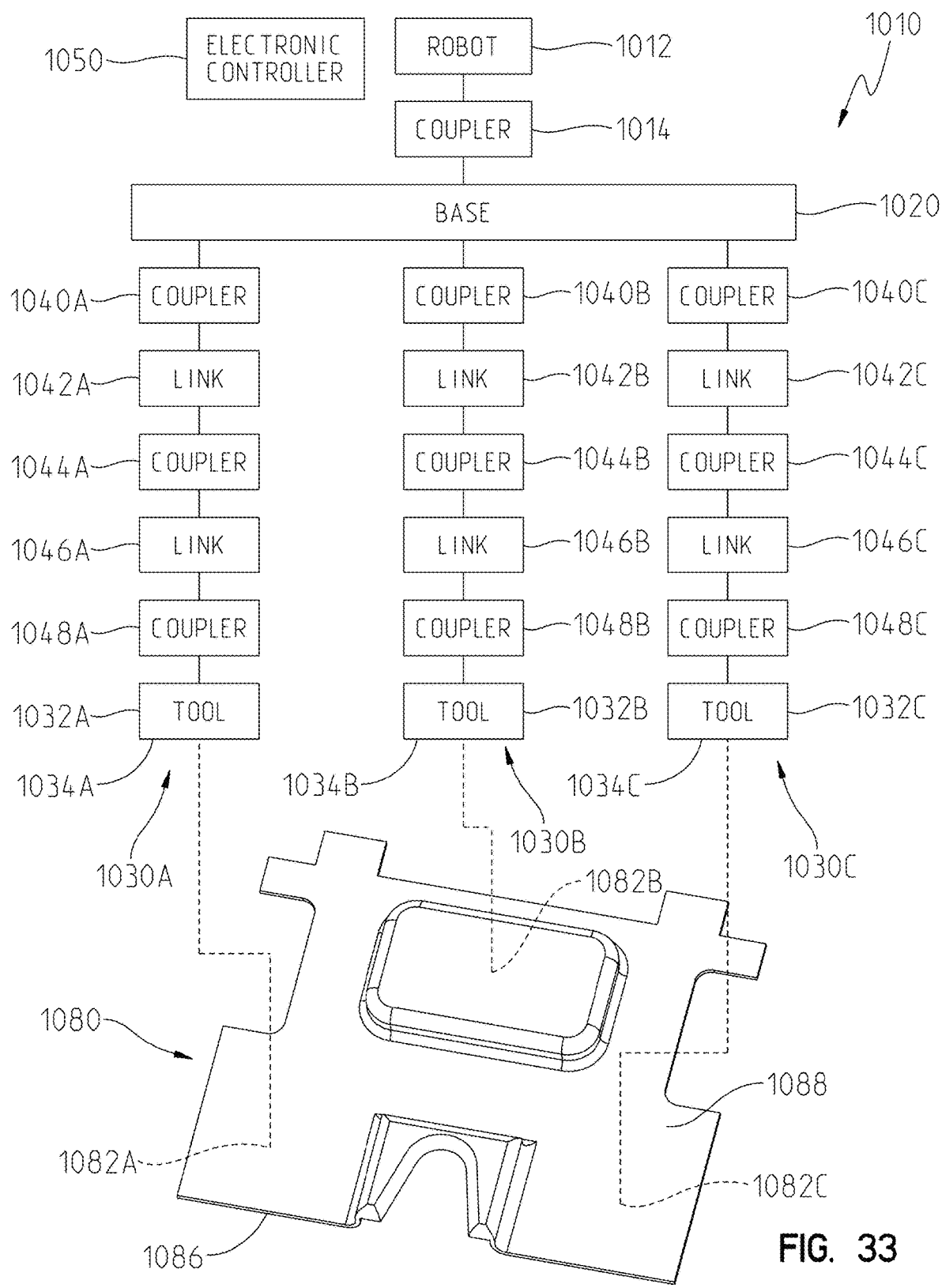
FIG. 33 illustrates a representative view of an exemplary adjustable end-of-arm-tool (EOAT)

Accordingly, aspects of the present disclosure relate to an adjustable EOAT or fixture. As an example, a set of adjustable assemblies may be used as an EOAT or a fixture, where each adjustable assembly may be used to control a tool. Referring to FIG. 33, an exemplary adjustable EOAT 1010 is illustrated. EOAT 1010 is coupled to an end of a robot 1012 through one or more couplers 1014. In embodiments, couplers 1014 fix EOAT 1010 relative to robot 1012. In embodiments, one or more couplers 1014 permit one or more degrees of movement (translational and/or rotational) of EOAT 1010 relative to robot 1012. Exemplary couplers include linear translation mounts, rotational mounts, and other suitable mounts.

EOAT 1010 includes a base 1020 which as illustrated is coupled to robot 1012 through coupler 1014. Base 1020 may include one or more components coupled through in an assembly. Base 1020 carries a plurality of adjustable assemblies 1030A-C. Although three adjustable assemblies 1030A-C are shown, fewer or additional adjustable assemblies may be included as part of EOAT 1010.

Each adjustable assembly 1030 includes a tool 1032 which interfaces with one or more workpieces 1080 to be moved by EOAT 1010 and robot 1012. Exemplary tools include grippers, pin clamps, clamps, and locators. As shown in FIG. 33, tools 1032A-C interfaces with workpiece 1080, illustratively a stamped metal component, at locations 1082A-C. Each of locations 1082A-C are inbound of a perimeter envelope 1086 of workpiece 1080. Thus, a footprint of EOAT 1010 defined by interfaces 1034A-C of tools 1032A-C is completely within perimeter envelope 1086 of workpiece 1080. Although in the illustrated embodiment, each of interfaces 1034A-C of tools 1032A-C are within perimeter envelope 1086 of workpiece 1080, in embodiments, one or more of tools may extend over an outside portion of perimeter envelope 1086 and the respective interface of the tool interact with both a front side 1088 of workpiece 1080 and a rear side (not shown) of workpiece 1080. As mentioned herein the positions of interfaces 1034A-C of tools 1032A-C may be positioned in multiple positions relative to base 1020. It should be noted that the positions of interfaces 1034A-C relative to base 1020 need not be determined rather the positioned relative to base 1020 simply provides a reference. In actuality, the interfaces may be positioned based on a coordinate system of the robot, the adjustable assembly itself, or other coordinate systems in the system.

Exemplary locators include pins and other locating features. Exemplary grippers include suction cup grippers, electro-static grippers, gecko grippers, and magnetic grippers. Magnetic grippers are also referred to herein as magnetic coupling devices. Suction cup grippers include cups as the respective interface 1034 with workpiece 1080 and a pneumatic system which selectively applies a vacuum to the cup grippers to hold workpiece 1080 relative to EOAT 1010. Magnetic grippers are used with ferromagnetic workpieces 1080 and generally include pole shoes as the respective interface 1034 with workpiece 1080 and a magnetic flux source which supplies a magnetic flux at the surface of the pole shoes to create a magnetic circuit through the pole shoes and workpiece 1080. Exemplary magnetic flux sources include electromagnets, electro-permanent magnets, rare earth permanent magnets, other suitable magnets, and combinations thereof. Exemplary magnetic grippers are disclosed in U.S. Pat. Nos. 7,012,495, 8,878,639, 10,903, 030; US Published Patent Application Nos. US20180311795 and US20210031317; U.S. Provisional Patent Application No. 63/194,692; and Published PCT Application No. WO2020086791A1, the entire disclosures of which are expressly incorporated by reference herein.

Figure 34:
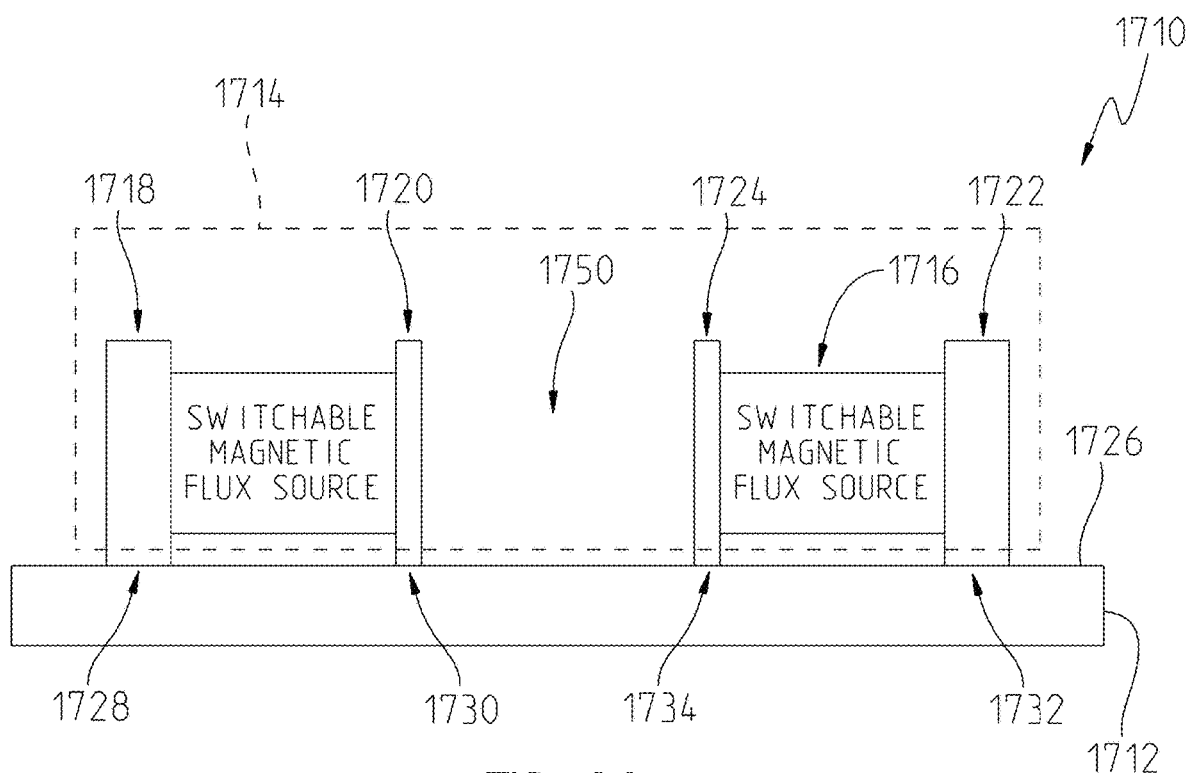
FIG. 34 illustrates a representative view of an exemplary magnetic coupling device having multiple workpiece contact interfaces for each pole of the magnetic coupling device and the magnetic coupling device in an OFF state.

Referring to FIG. 34, an exemplary magnetic coupling device 1710 is shown. Magnetic coupling device 1710 is configured to magnetically couple a ferromagnetic workpiece 1712. Magnetic coupling device 1710 includes a housing 1714, a switchable magnetic flux source 1716, a first north pole portion 1718, a second north pole portion 1720, a first south pole portion 1722, and a second south pole portion 1724. First north pole portion 1718 includes a workpiece interface 1728, second north pole portion 1720 includes a workpiece interface 1730, first south pole portion 1722 includes a workpiece interface 1732, and second south pole portion 1724 includes a workpiece interface 1734, each of which contacts a respective part of ferromagnetic workpiece 1712, illustratively a surface 1726 of ferromagnetic workpiece 1712. Each of workpiece interface 1728, workpiece interface 1730, workpiece interface 1732, and workpiece interface 1734 include at least one workpiece engagement surface. Workpiece interface 1728, workpiece interface 1730, workpiece interface 1732, and workpiece interface 1734 may each be planar, curved, contoured, have a plurality of spaced apart projections, or any other suitable shape for contacting ferromagnetic workpiece 1712. Each of first north pole portion 1718, second north pole portion 1720, first south pole portion 1722, and second south pole portion 1724 are made of a ferromagnetic material and may be a part of housing 1714 or separate components coupled to housing 1714.

Figure 35:
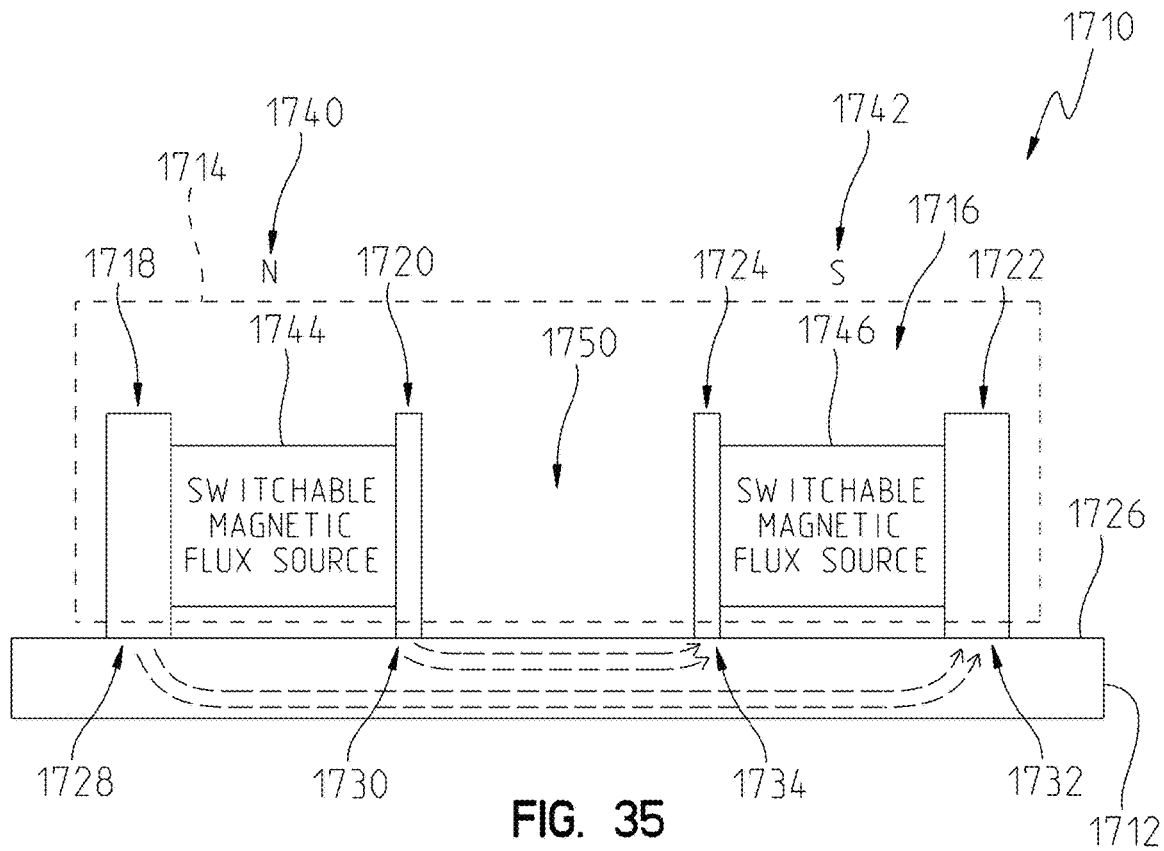
FIG. 35 illustrates the magnetic coupling device of FIG. 34 with the magnetic coupling device in an ON state.

Switchable magnetic flux source 1716 of magnetic coupling device 1710 is switchable between an OFF state wherein a magnetic circuit is formed within housing 1714 and an ON state wherein a magnetic circuit is formed from switchable magnetic flux source 1716 through workpiece interface 1728 and workpiece interface 1730 of magnetic coupling device 1710, through ferromagnetic workpiece 1712, through workpiece interface 1732 and workpiece interface 1734 of magnetic coupling device 1710, and back to switchable magnetic flux source 1716 (as represented by the arrows shown in FIG. 35). In embodiments, switchable magnetic flux source 1716 may be placed in at least one partial ON state wherein the strength of the magnetic circuit formed through ferromagnetic workpiece 1712 is more than the OFF state and less than the ON state.

Switchable magnetic flux source 1716 may include multiple permanent magnets and is configurable to have an overall north pole portion 1744 and an overall south pole portion 1746. As shown in FIG. 35, overall north pole portion 1744 of switchable magnetic flux source 1716 is positioned between first north pole portion 1718 and second north pole portion 1720 and overall south pole portion 1746 of switchable magnetic flux source 1716 is positioned between first south pole portion 1722 and second south pole portion 1724. Overall north pole portion 1744 of switchable magnetic flux source 1716 is magnetically coupled with first north pole portion 1718 and second north pole portion 1720 resulting in workpiece interface 1728 of first north pole portion 1718 and workpiece interface 1730 of second north pole portion 1720 forming an overall north pole 1740 of magnetic coupling device 1710. Overall south pole portion 1746 is magnetically coupled with first south pole portion 1722 and second south pole portion 1724 resulting in workpiece interface 1732 of first south pole portion 1722 and workpiece interface 1734 of second south pole portion 1724 forming an overall south pole 1742 of magnetic coupling device 1710.

Switchable magnetic flux source 1716 may include one or more permanent magnets and is configurable to have an overall north pole portion 1744 and an overall south pole portion 1746. In embodiments, switchable magnetic flux source 1716 includes at least one electro-permanent magnet which is switchable between an ON state (having a north pole and a south pole) and an OFF state (not magnetized relative to external objects). Further, the at least one electro-permanent magnet may be configured to have varying magnetic strengths which allow the device to be configured in a partial ON state having a magnetic strength at workpiece interfaces 1728, 1730, 1732, and 1734 less than the ON state and greater than an OFF state. In embodiments, switchable magnetic flux source 1716 includes at least one rare earth permanent magnet and at least one electro-permanent magnet, the combination of which is switchable between an ON state having a magnetic strength at workpiece interfaces 1728, 1730, 1732, and 1734 and an OFF state wherein a magnetic circuit is formed internally to housing 1714. Further, the combination may be configured to have varying magnetic strengths which allow the device to be configured in a partial ON state having a magnetic strength at workpiece interfaces 1728, 1730, 1732, and 1734 less than the ON state and greater than an OFF state. In embodiments, switchable magnetic flux source 1716 includes a plurality of rare earth permanent magnets, the combination of which is switchable between an ON state having a magnetic strength at workpiece interfaces 1728, 1730, 1732, and 1734 and an OFF state wherein a magnetic circuit is formed internally to housing 1714. Further, the combination may be configured to have varying magnetic strengths which allow the device to be configured in a partial ON state having a magnetic strength at workpiece interfaces 1728, 1730, 1732, and 1734 less than the ON state and greater than an OFF state. In embodiments, switchable magnetic flux source 1716 includes at least one rare earth permanent magnet which is moveable relative to the housing 1714 to thus be switchable between an ON state having a magnetic strength at workpiece interfaces 1728, 1730, 1732, and 1734 and an OFF state wherein a magnetic circuit is formed internally to housing 1714.

As shown in FIGS. 34 and 35, a channel 1750 is provided between pole portions 1720 and 1724. Channel 1750, as discussed herein, may receive one or more sensors, stationary pins, retractable pins, probes, and/or additional tools. In embodiments, magnetic coupling device 1710 does not include channel 1750 nor second north pole portion 1720 and second south pole portion 1724. Rather, the switchable magnetic flux source 1716 extends from proximate workpiece interface 1728 to proximate first south pole portion 1722.

Figure 36:
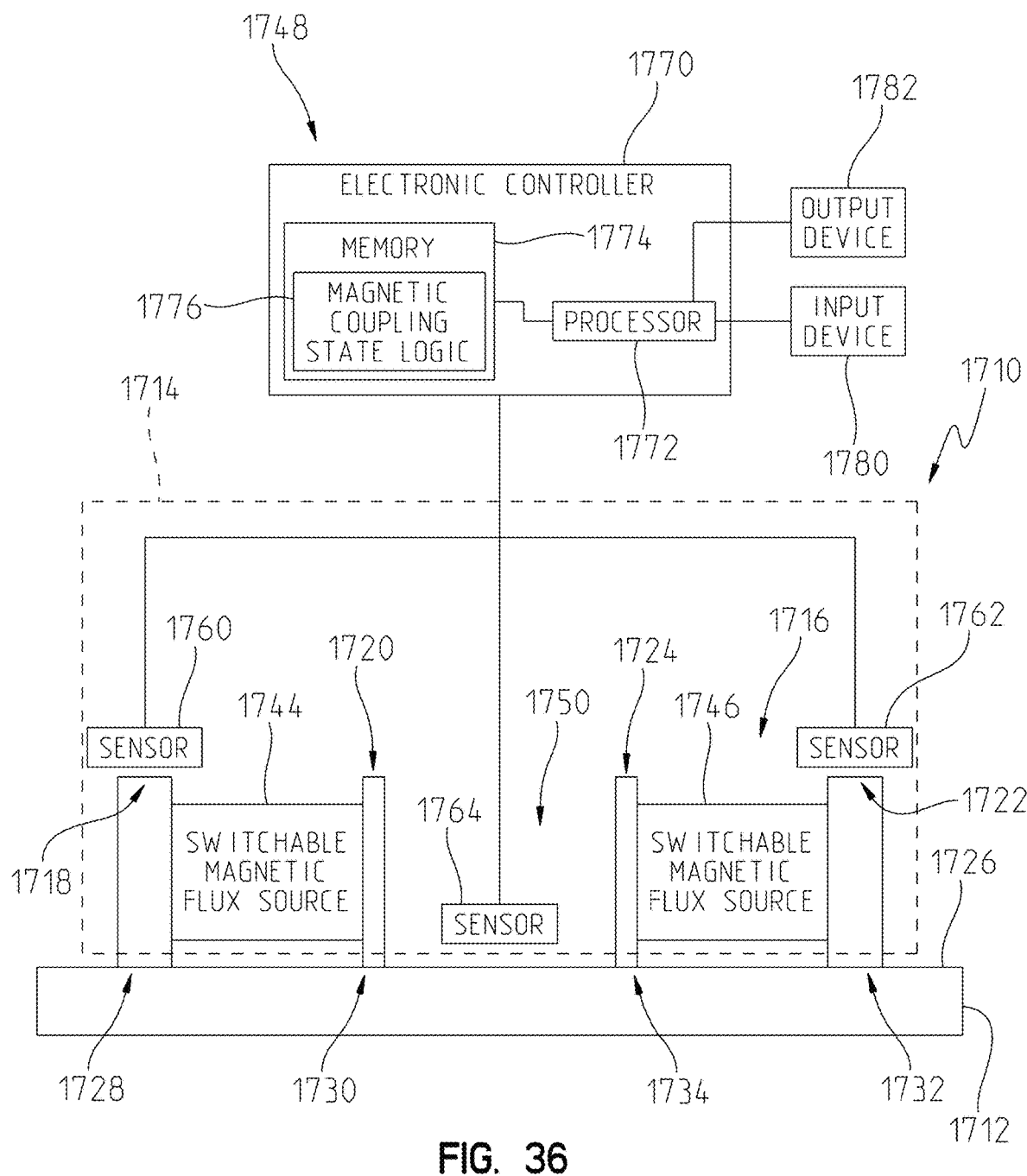
FIG. 36 illustrates the magnetic coupling device of FIG. 34 with a sensing system.

Referring to FIG. 36, in embodiments, magnetic coupling device 1710 further includes a monitoring system 1748 including one or more sensors which monitor a characteristic of magnetic coupling device 1710 and/or a characteristic of a magnetic circuit formed between magnetic coupling device 1710 and ferromagnetic workpiece 1712. As shown in FIG. 36, a first sensor 1760 may be positioned proximate first north pole portion 1718, a second sensor 1762 may be positioned proximate first south pole portion 1722, and a third sensor 1764 may be positioned proximate ferromagnetic workpiece 1712 in a channel 1750 provided between second north pole portion 1720 and second south pole portion 1724. Each of first sensor 1760, second sensor 1762, and third sensor 1764 may be a magnetic flux sensor. Additional types of sensors include temperature sensors which are used to compensate for temperature dependent drift in the magnetic flux sensors. Additionally, the positions of sensors 1760, 1762, and 1764 are exemplary and one or sensors may be positioned at different locations. In embodiments, sensor 1764 may be a proximity sensor. Exemplary proximity sensors include inductive sensors, ultrasound sensors, photonic sensors, and other suitable sensors. In embodiments, sensor 1764 may be a camera, a Lidar sensor, or other suitable sensor to obtain one of an image of part 1712 or part profile information.

Each of sensors 1760, 1762, and 1764 are operatively coupled to an electronic controller 1770. Electronic controller 1770 includes at least one processor 1772 and associated memory 1774. Memory 1774 includes magnetic coupling state logic 1776, logic control circuit, which monitors the output of sensors 1760, 1762, 1764 to determine one or more characteristics of magnetic coupling device 1710 and/or one or more characteristics of a magnetic circuit formed between magnetic coupling device 1710 and ferromagnetic workpiece 1712. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 1770 is not microprocessor-based, but rather is configured to control operation of magnetic coupling device 1800 based on one or more sets of hardwired instructions. Further, electronic controller 1770 may be contained within a single device or be a plurality of devices networked together or otherwise electrically connected to provide the functionality described herein.

Electronic controller 1770 may further receive input through one or more input devices 1780. Exemplary input devices include buttons, switches, levers, dials, touch displays, soft keys, and a communication module. Electronic controller 1770 may further provide output through one or more output devices 1782. Exemplary output devices include visual indicators, audio indicators, and a communication module. Exemplary visual indicators include displays, lights, and other visual systems. Exemplary audio indicators include speakers and other suitable audio systems.

Figure 37:
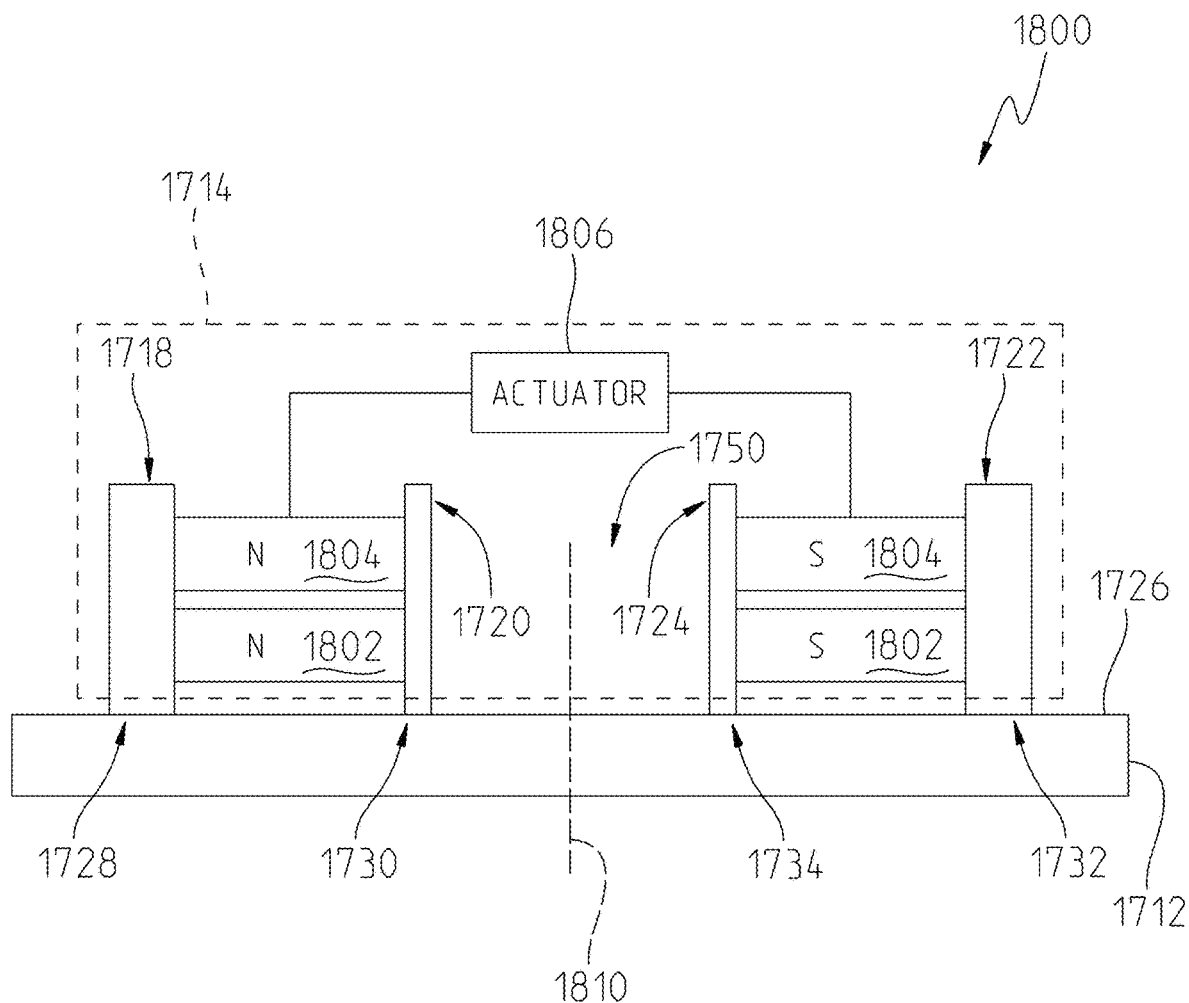
FIG. 37 illustrates a representative view of an exemplary magnetic coupling device having multiple workpiece contact interfaces for each pole of the magnetic coupling device, the magnetic coupling device including a stack of permanent magnets with a first permanent magnet moveable relative to a second permanent magnet with an actuator.

Referring to FIG. 37, an exemplary embodiment of magnetic coupling device 1710 is shown, illustratively magnetic coupling device 1800. Each of workpiece interface 1730 and workpiece interface 1734 are closer to rotational axis 1810 than either of first permanent magnet 1802 and second permanent magnet 1804. Between workpiece interface 1730 and workpiece interface 1734 is channel 1750 which as mentioned herein may receive one or more sensors, stationary pins, retractable pins, retractable pin clamps, cameras, probes, and/or additional tools. Workpiece interface 1730 of second north pole portion 1720 and workpiece interface 1734 of second south pole portion 1724 provide an external north pole of magnetic coupling device 1800 and an external south pole of magnetic coupling device 1800, respectively, of a magnetic circuit formed with rare earth permanent magnets without any of the rare earth permanent magnets forming the magnetic circuit being positioned between second north pole portion 1720 and second south pole portion 1724. Further, in embodiments, each of first permanent magnet 1802 and second permanent magnet 1804 surround rotational axis 1810 and each of first permanent magnet 1802 and second permanent magnet 1804 include a respective aperture to form part of channel 1750.

Magnetic coupling device 1800 includes a switchable magnetic flux source 1716 having a first permanent magnet 1802 and a second permanent magnet 1804. Second permanent magnet 1804 is spaced apart from first permanent magnet 1802. In embodiments, a spacer (not shown) is positioned between first permanent magnet 1802 and second permanent magnet 1804. In embodiments, each of first permanent magnet 1802 and second permanent magnet 1804 are rare earth permanent magnets.

Figure 38:
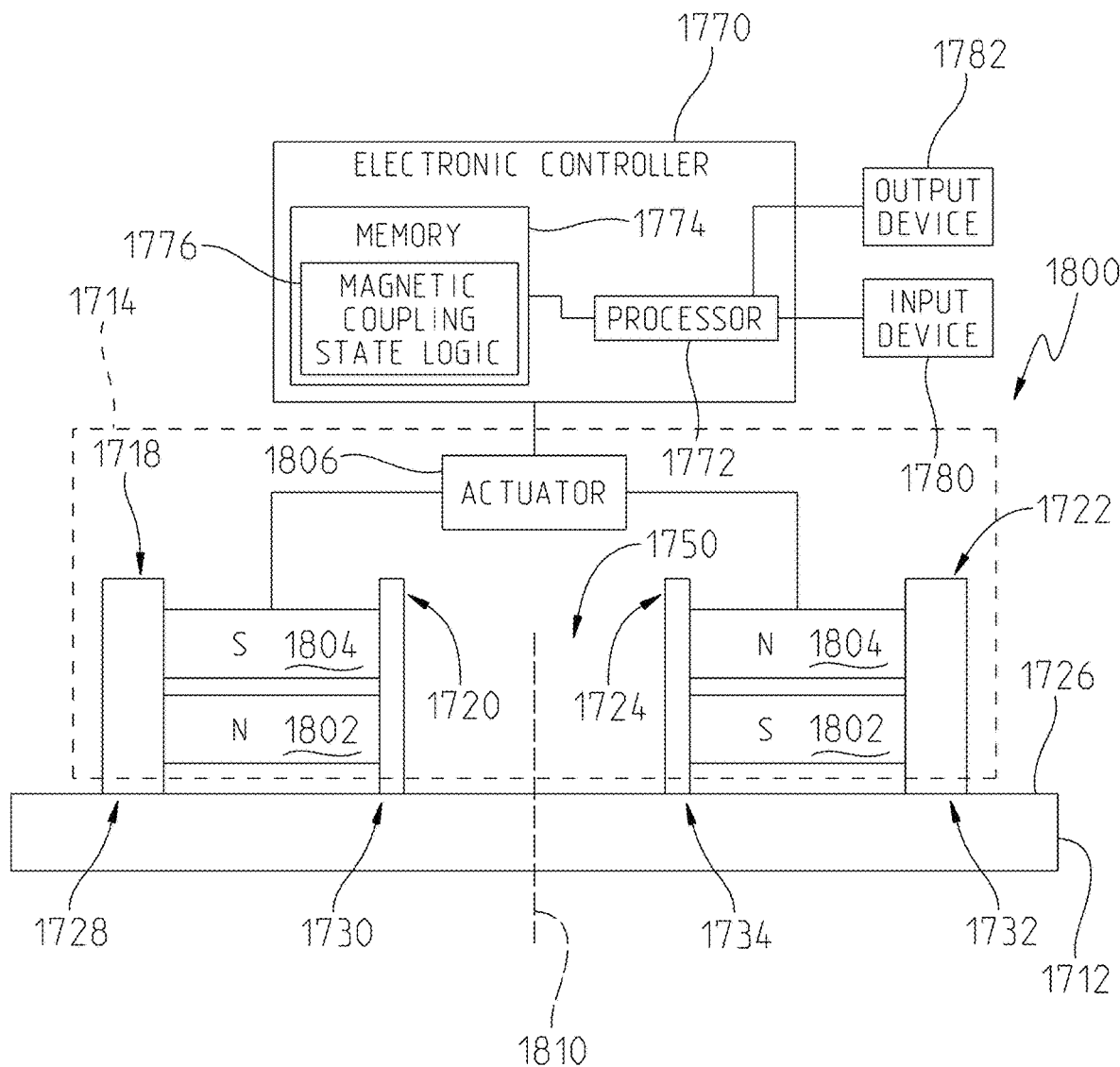
FIG. 38 illustrates the magnetic coupling device of FIG. 37 including an electronic controller operatively coupled to the actuator.

Second permanent magnet 1804 is moveable relative to first permanent magnet 1802. Magnetic coupling device 1800 includes an actuator 1806 which positions second permanent magnet 1804 relative to first permanent magnet 1802. Exemplary actuators 1806 include manual actuators, hydraulic actuators, pneumatic actuators, mechanical actuators, electrically controlled actuators, and combinations thereof. Referring to FIG. 38, actuator 1806 is an electrically controlled actuator and includes a motor (not shown) which is controlled by electronic controller 1770 to position second permanent magnet 1804 relative to first permanent magnet 1802. Exemplary actuators are disclosed in U.S. Pat. No. 10,903,030, the entire disclosure of which is expressly incorporated by reference herein.

In embodiments, actuator 1806 rotates second permanent magnet 1804 relative to first permanent magnet 1802 about a rotational axis 1810. First permanent magnet 1802 is held fixed relative to housing 1714. Workpiece interface 1728 of first north pole portion 1718, workpiece interface 1730 of second north pole portion 1720, workpiece interface 1732 of first south pole portion 1722, and workpiece interface 1734 of second south pole portion 1724 are magnetically coupled to first permanent magnet 1802 and second permanent magnet 1804. In embodiments, one or both of first permanent magnet 1802 and second permanent magnet 1804 are comprised of a single rare earth magnet. In embodiments, one or both of first permanent magnet 1802 and second permanent magnet 1804 are comprised of a multiple rare earth magnets that collectively form the respective first permanent magnet 1802 or second permanent magnet 1804.

In one position of second permanent magnet 1804 relative to first permanent magnet 1802, a north pole of second permanent magnet 1804 is generally aligned with a north pole of first permanent magnet 1802 and a south pole of second permanent magnet 1804 is generally aligned with a south pole of first permanent magnet 1802, as shown in FIG. 37. This configuration corresponds to magnetic coupling device 1800 being in an ON state with workpiece interface 1728 of first north pole portion 1718 and workpiece interface 1730 of second north pole portion 1720 corresponding to an external north pole of magnetic coupling device 1800 and workpiece interface 1732 of first south pole portion 1722 and workpiece interface 1734 of second south pole portion 1724 corresponding to an external south pole of magnetic coupling device 1800. In the ON state, when magnetic coupling device 1800 is in contact with ferromagnetic workpiece 1712, a magnetic circuit is formed to magnetically couple ferromagnetic workpiece 1712 to magnetic coupling device 1800.

In another position of second permanent magnet 1804 relative to first permanent magnet 1802, a north pole of second permanent magnet 1804 is generally aligned with a south pole of first permanent magnet 1802 and a south pole of second permanent magnet 1804 is generally aligned with a north pole of first permanent magnet 1802, as shown in FIG. 38. This configuration corresponds to magnetic coupling device 1800 being in an OFF state and a magnetic circuit is formed generally within housing 1714; magnetic coupling device 1800 lacks an external north pole at workpiece interface 1728 of first north pole portion 1718 and workpiece interface 1730 of second north pole portion 1720 and an external south pole at workpiece interface 1732 of first south pole portion 1722 and workpiece interface 1734 of second south pole portion 1724. In the OFF state, ferromagnetic workpiece 1712 is not magnetically coupled to magnetic coupling device 1800.

Actuator 1806 rotates second permanent magnet 1804 about rotational axis 1810 to move second permanent magnet 1804 between the positions shown in FIG. 37 and FIG. 38. In embodiments, actuator 1806 is able to position second permanent magnet 1804 at rotational positions between those shown in FIGS. 37 and 38. These intermediate rotational positions correspond to partial ON states of magnetic coupling device 1800 with workpiece interface 1728 of first north pole portion 1718 and workpiece interface 1730 of second north pole portion 1720 corresponding to an external north pole of magnetic coupling device 1800 and workpiece interface 1732 of first south pole portion 1722 and workpiece interface 1734 of second south pole portion 1724 corresponding to an external south pole of magnetic coupling device 1800, but having a lower level of magnetic flux available at each of the external north pole and the external south pole. As such, magnetic coupling device 1800 is able to be configured to provide a variable strength magnetic flux level to perform various operations, such as the operations disclosed in U.S. Pat. No. 10,903,030, the entire disclosure of which is expressly incorporated by reference herein.

Referring to FIG. 37, each of workpiece interface 1730 and workpiece interface 1734 are closer to rotational axis 1810 than either of first permanent magnet 1802 and second permanent magnet 1804. Between workpiece interface 1730 and workpiece interface 1734 is channel 1750 which as mentioned herein may receive one or more sensors and/or tools, such as probes. Workpiece interface 1730 of second north pole portion 1720 and workpiece interface 1734 of second south pole portion 1724 provide an external north pole of magnetic coupling device 1800 and an external south pole of magnetic coupling device 1800, respectively, of a magnetic circuit formed with rare earth permanent magnets without any of the rare earth permanent magnets forming the magnetic circuit being positioned between second north pole portion 1720 and second south pole portion 1724. Further, in embodiments, each of first permanent magnet 1802 and second permanent magnet 1804 surround rotational axis 1810 and each of first permanent magnet 1802 and second permanent magnet 1804 include a respective aperture to form part of channel 1750.

Figure 40:
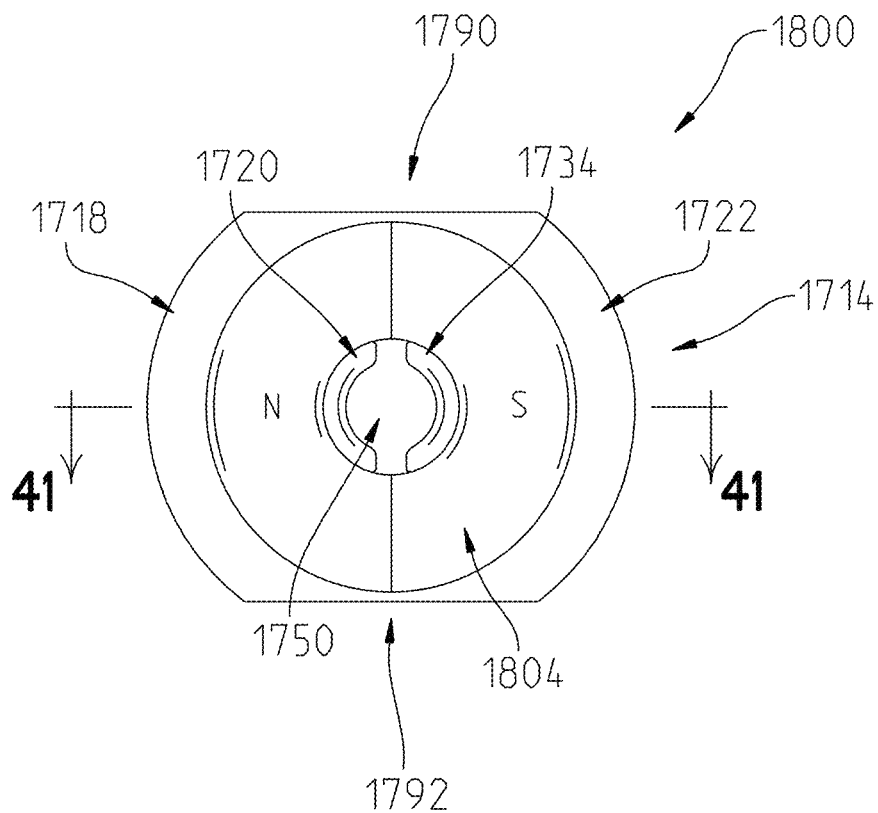
FIG. 40 illustrates a top view of an exemplary magnet and pole piece assembly of the magnetic coupling device of FIG. 37.
Figure 41:
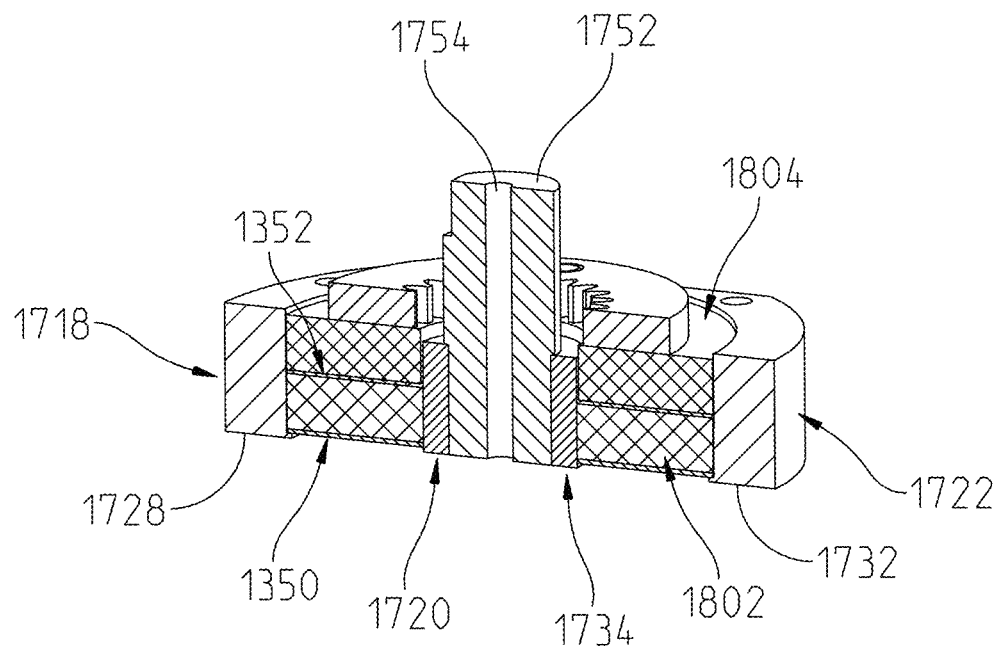
FIG. 41 illustrates a sectional view of another exemplary magnet and pole piece assembly of the magnetic coupling device of FIG. 37.

Referring to FIGS. 40 and 41, an exemplary arrangement for magnetic coupling device 1800 is shown. Second north pole portion 1720 and workpiece interface 1734 are carried by a support 1752 (see FIG. 41). Channel 1750 is provided as a central opening 1754 through support 1752.

Referring to FIG. 40, housing 1714 is made of a ferromagnetic material. An exemplary ferromagnetic material is steel. Housing 1714 is dimensioned such that only thin wall webs 1790 and 1792 connect first north pole portion 1718 and housing 1714 which are both thick walled portions of housing 1714. By having thin wall web 1790 and thin wall web 1792 being thinner than first north pole portion 1718 and first south pole portion 1722, the magnetic flux is directed through workpiece interface 1728 of first north pole portion 1718 and workpiece interface 1732 of first south pole portion 1722 into ferromagnetic workpiece 1712 instead of passing between first north pole portion 1718 and first south pole portion 1722 through thin wall webs 1790 and thin wall webs 1792.

Figure 39:
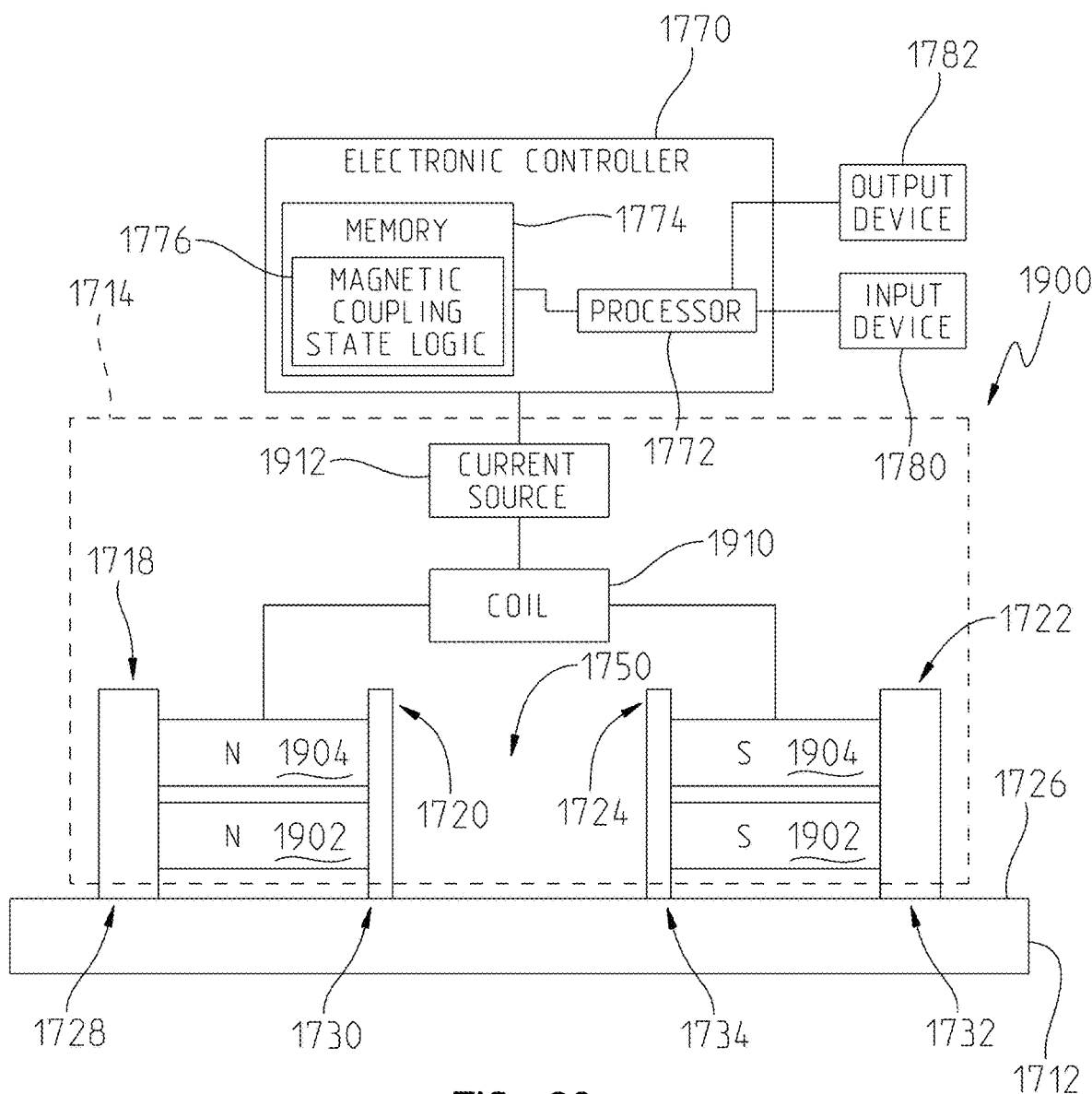
FIG. 39 illustrates a representative view of an exemplary magnetic coupling device having multiple workpiece contact interfaces for each pole of the magnetic coupling device, the magnetic coupling device including a stack of permanent magnets with a first electro-permanent magnet and a second permanent magnet.

Referring to FIG. 39, an exemplary embodiment of magnetic coupling device 1710 is shown, illustratively magnetic coupling device 1900. Magnetic coupling device 1900 includes a switchable magnetic flux source 1716 having a first permanent magnet 1902 and a second permanent magnet 1904. Second permanent magnet 1904 is spaced apart from first permanent magnet 1902. In embodiments, a spacer (not shown) is positioned between first permanent magnet 1902 and second permanent magnet 1904 or an air gap is maintained between first permanent magnet 1902 and second permanent magnet 1904. In embodiments, first permanent magnet 1902 is a rare earth permanent magnet and second permanent magnet 1904 is an electro-permanent magnet. First permanent magnet 1902 and second permanent magnet 1904 are held fixed relative to housing 1714. Workpiece interface 1728 of first north pole portion 1718, workpiece interface 1730 of second north pole portion 1720, workpiece interface 1732 of first south pole portion 1722, and workpiece interface 1734 of second south pole portion 1724 are magnetically coupled to first permanent magnet 1902 and second permanent magnet 1904.

Figure 13:
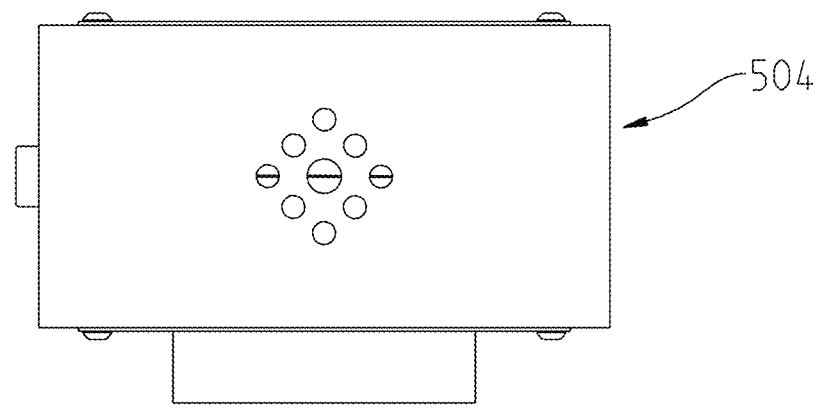
FIG. 13 illustrates a bottom view of the rotational drive of FIG. 9.
Figure 14:
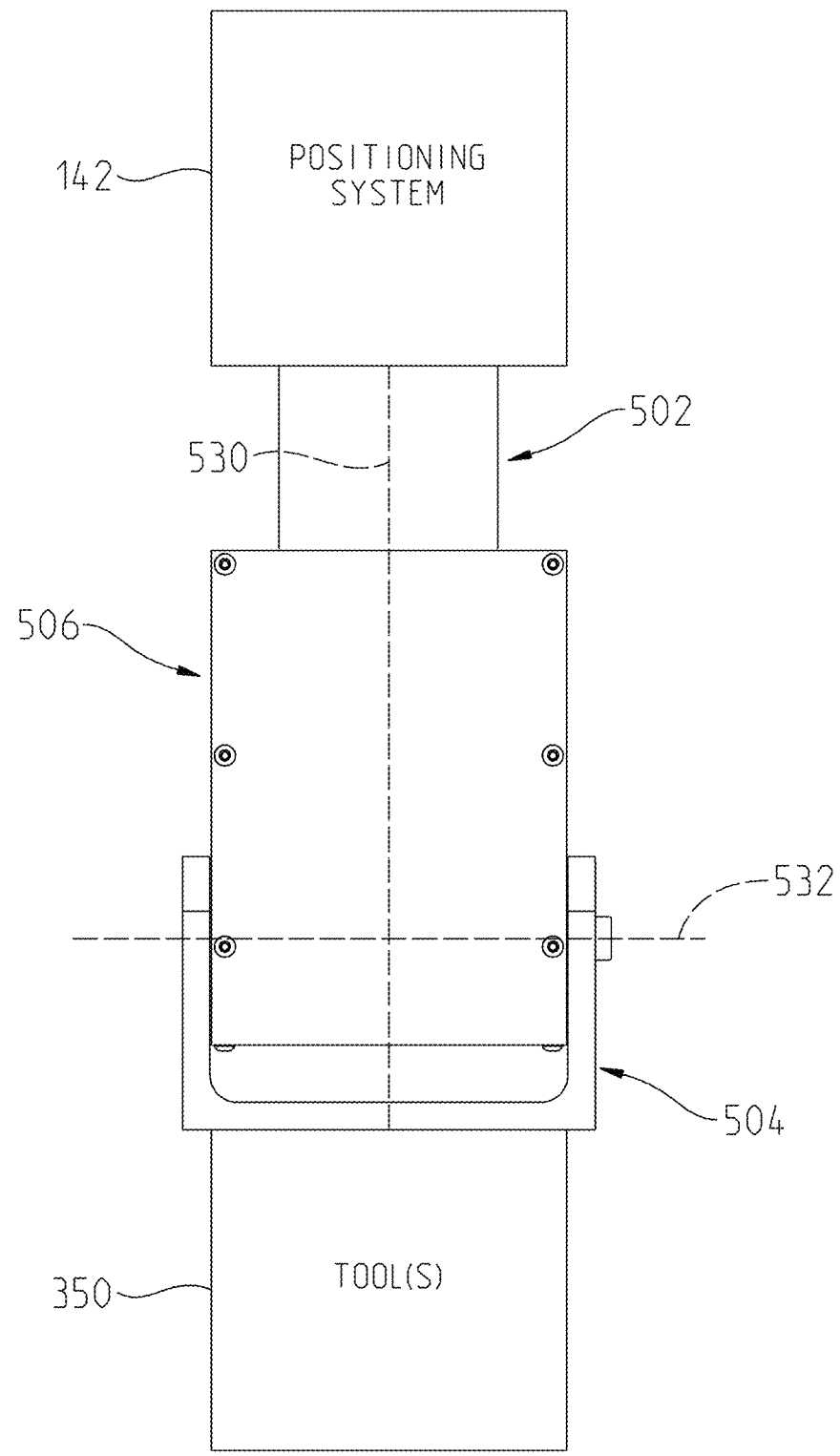
FIG. 14 illustrates the rotational drive of FIG. 9 in a first configuration.

At least a portion of second permanent magnet 1904 is surrounded by a coil 1910 which is coupled to a current source 1912. A direction and strength of a current provided through coil 1910 is controlled by electronic controller 1770. The current is used to alter the pole positions for second permanent magnet 1904. In embodiments, the current may be used to position a north pole of second permanent magnet 1904 in general alignment with a north pole of first permanent magnet 1902 and a south pole of second permanent magnet 1904 is general alignment with a south pole of first permanent magnet 1902, as shown in FIG. 13. The current does not need to be persistent to maintain second permanent magnet 1904 in this configuration. This configuration corresponds to magnetic coupling device 1900 being in an ON state with workpiece interface 1728 of first north pole portion 1718 and workpiece interface 1730 of second north pole portion 1720 corresponding to an external north pole of magnetic coupling device 1900 and workpiece interface 1732 of first south pole portion 1722 and workpiece interface 1734 of second south pole portion 1724 corresponding to an external south pole of magnetic coupling device 1900. In the ON state, when magnetic coupling device 1900 is in contact with ferromagnetic workpiece 1712, a magnetic circuit is formed to magnetically couple ferromagnetic workpiece 1712 to magnetic coupling device 1900. In embodiments, the magnetic mass of first permanent magnet 1902 and second permanent magnet 1904 may be different or the same. In embodiments, one or both of first permanent magnet 1902 and second permanent magnet 1904 are comprised of a permanent magnet. In embodiments, one or both of first permanent magnet 1802 and second permanent magnet 1804 are comprised of multiple permanent magnets that collectively form the respective first permanent magnet 1802 or second permanent magnet 1804.

In embodiments, the current may be used to position a north pole of second permanent magnet 1904 in general alignment with a south pole of first permanent magnet 1902 and a south pole of second permanent magnet 1904 in general alignment with a north pole of first permanent magnet 1902. This configuration corresponds to magnetic coupling device 1900 being in an OFF state and a magnetic circuit is formed generally within housing 1714; magnetic coupling device 1900 lacks an external north pole at workpiece interface 1728 of first north pole portion 1718 and workpiece interface 1730 of second north pole portion 1720 and an external south pole at workpiece interface 1732 of first south pole portion 1722 and workpiece interface 1734 of second south pole portion 1724. In the OFF state, ferromagnetic workpiece 1712 is not magnetically coupled to magnetic coupling device 1800.

In embodiments, the electro permanent magnet of the second permanent magnet 1904 may be charged to different levels to provide a variable magnetic strength at the workpiece interfaces 1728, 1730, 1732, 1734. Thus, at least one partial ON state may be configured having a magnetic strength at the workpiece interfaces 1728, 1730, 1732, 1734 being less than the ON state and greater than the OFF state. Exemplary electro-permanent magnets include AlNiCo electro-permanent magnets.

Referring to FIG. 39, between workpiece interface 1730 and workpiece interface 1734 is channel 1750 which as mentioned herein may receive one or more sensors and/or tools, such as probes. In embodiments, each of first permanent magnet 1802 and second permanent magnet 1804 surround rotational axis 1810 and each of first permanent magnet 1802 and second permanent magnet 1804 include a respective aperture to form part of channel 1750.

Figure 42:
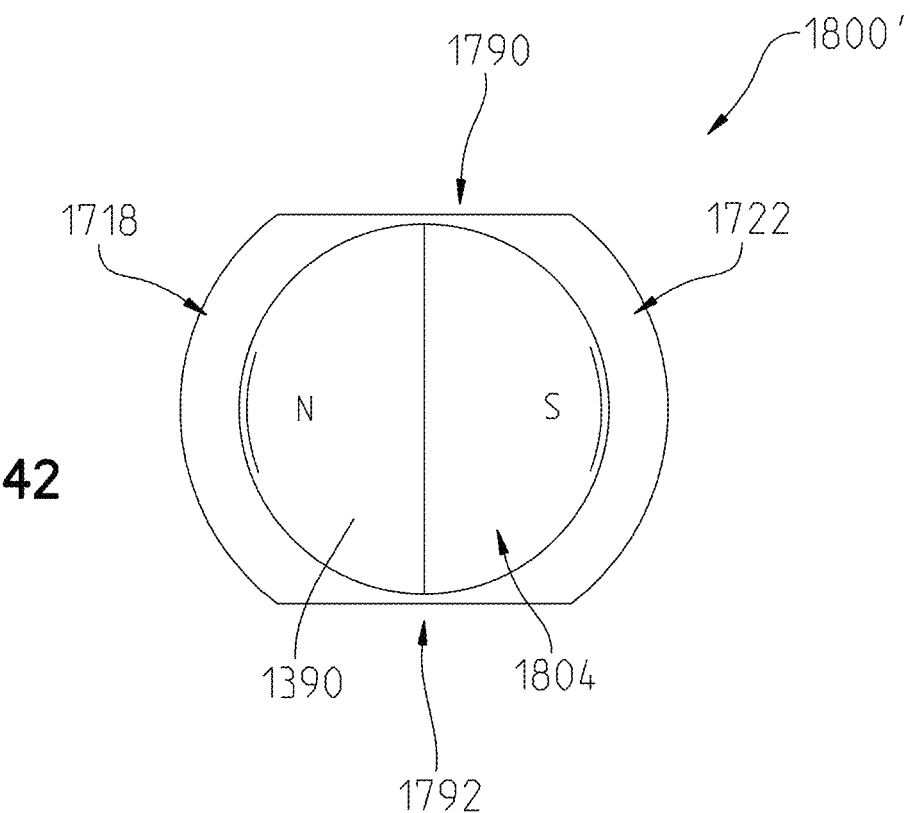
FIG. 42 illustrates a top view of an exemplary magnet and pole piece assembly of the magnetic coupling device of FIG. 37 without the central channel.

Referring to FIG. 42, in embodiments, magnetic coupling device 1800' (and similarly for magnetic coupling device 1900) does not include channel 1750. Rather, each of first permanent magnet 1802 and second permanent magnet 1804 are solid circular permanent magnets. In embodiments, a plurality of magnets may collectively form one or both of first permanent magnet 1802 and second permanent magnet 1804. Further, each of first permanent magnet 1802 and second permanent magnet 1804 may have various shapes. An exemplary arrangement is shown in FIGS. 2, 4, and 7 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein. Another exemplary arrangement is shown in U.S. Pat. No. 7,012,495, titled SWITCHABLE PERMANENT MAGNETIC DEVICE, the entire disclosure of which are expressly incorporated by reference herein. Further, each of first permanent magnet 1802 and second permanent magnet 1804 may be a platter containing multiple magnets. An exemplary arrangement is shown in FIGS. 17-19 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein.

Figure 43:
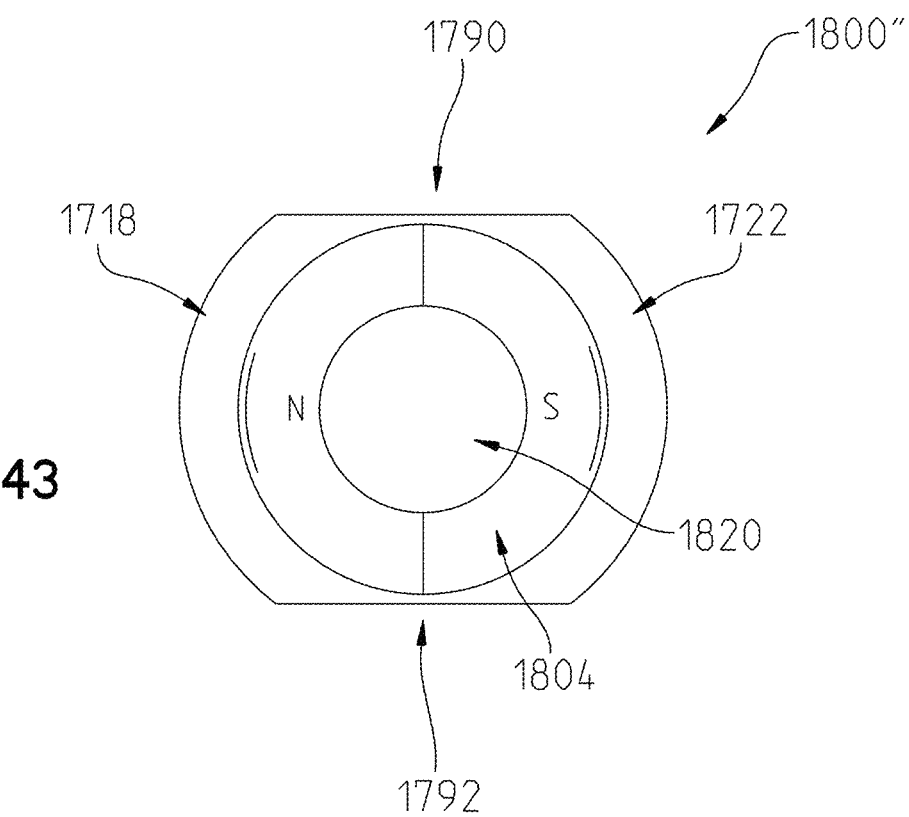
FIG. 43 illustrates a top view of an exemplary magnet and pole piece assembly of the magnetic coupling device of FIG. 37 without the central channel and including a ferromagnetic cores.

Referring to FIG. 43, in embodiments, magnetic coupling device 1800" (and similarly for magnetic coupling device 1900) does not include channel 1750, but each of first permanent magnet 1802 and second permanent magnet 1804 includes a ferromagnetic core (ferromagnetic core 1820 for second permanent magnet 1804 shown in FIG. 17). An exemplary arrangement is shown in U.S. Provisional Patent Application No. 63/351,349, filed Jun. 11, 2022, titled MAGNETIC COUPLING DEVICE, the entire disclosure of which are expressly incorporated by reference herein.

Returning to FIG. 33, each adjustable assembly 1030A-C illustratively includes a plurality of links and a plurality of couplers. In the illustrated embodiment, a first coupler 1040A-C couples a first link 1042A-C to base 1020, a second coupler 1044A-C couples first link 1042A-C to a second link 1046A-C, and a third coupler 1048A-C couples second link 1046A-C to tool 1032A-C. In embodiments, one or more of couplers 1040A-C, 4104A-C, and 1048A-C fix the respective components being coupled together. In embodiments, one or more couplers 1040A-C, 1044A-C, and 1048A-C permit one or more degrees of movement (translational and/or rotational) between the respective components being coupled together. Exemplary couplers include linear translation mounts, rotational mounts, and other suitable mounts. A given coupler 1040A-C, 1044A-C, and 1048A-C may contain multiple stages of mounts to provide more than one degree of freedom between the respective components being coupled together and/or a mount that itself provides multiple degrees of freedom. In embodiments, a given one of couplers 1040A-C, 1044A-C, and 1048A-C may provide a single degree of freedom between the respective components being coupled together. In embodiments, a given one of couplers 1040A-C, 1044A-C, and 1048A-C may provide multiple degrees of freedom between the respective components being coupled together. In embodiments, a given one of couplers 1040A-C, 1044A-C, and 1048A-C may provide both at least one rotational degree of freedom and at least one translational degree of freedom.

In embodiments, the positioning of the respective components coupled together by couplers 1040A-C, 1044A-C, and 1048A-C are controlled by an electronic controller 1050. Electronic controller 1050 controls one or more actuators of the respective couplers 1040A-C, 1044A-C, and 1048A-C to move the corresponding coupled components relative to each other and/or to hold the position of the corresponding coupled components relative to each other. Although illustrated as a single electronic controller 1050, electronic controller 1050 may be one or more controllers which control the operation of couplers 1040A-C, 1044A-C, and 1048A-C. Further, electronic controller 1050 may control the operation of coupler 1014 and/or robot 1012.

As explained herein, by adjusting the relative positions of interfaces 1034 of tools 1032, EOAT may be easily used with multiple workpieces having different shapes and/or same shaped workpieces randomly placed in a container. Further, the description of EOAT 1010 may also be implemented as a fixture to hold workpiece 1080. In the case of a fixture, base 1020 supports adjustable assemblies 1030A-C relative to the floor or other support.

As described herein, an adjustable assembly may comprise a linear adjustment subassembly and a rotational adjustment subassembly, such that the tool of the adjustable assembly is linearly controllable along the x, y, and z axes (e.g., by the linear adjustment subassembly), as well as rotationally controllable about the x, y, and z axes (e.g., by the rotational adjustment subassembly). While example movements are described herein, it will be appreciated that any of a variety of additional or alternative movements may be implemented by an adjustable assembly according to aspects described herein. Further, the grouping of translational movements (linear movements) in one sub-assembly and rotational movements (angular movements) in another sub-assembly is for the ease of the reader, not due to a requirement that they be in separate sub-assemblies. On the contrary, it is possible, in embodiments to have a given sub-assembly that provides both translational and rotational motion.

In embodiments, one or more of the adjustable assemblies may have less than six degrees of freedom. In embodiments, one or more of the adjustable assemblies may have more than six degrees of freedom. In embodiments, each of the adjustable assemblies includes the same number of degrees of freedom. In embodiments, at least two of the adjustable assemblies have different numbers of degrees of freedom.

Example tools include, but are not limited to, a gripper (e.g., a magnetic gripper, an electro-static gripper, a gecko gripper, a suction gripper, or a pin clamp) or a locator (e.g., a 2-way locating pin or a 4-way locating pin). In examples, a tool may engage with an object from substantially one side. For example, a magnetic gripper or a suction gripper may be referred to herein as single-sided tools that act on an object from the side at which the magnetic or suction force is provided. Similarly, a pin clamp or locator may engage with an object through a hole of the object. A pin clamp may include a retractable pin that is extended on the opposite side of the object. In such an example, a separate tool may not be required to exert force that is opposite that of the pin clamp, such that a pin clamp may also be a single-sided tool. Thus, such aspects may be in contrast to gripping an object from opposing edges or on both sides of the object using multiple tools. EOATs and fixtures may be smaller in size where single-sided tools are used, for example as compared to EOATs and fixtures where one or more additional tools are needed on opposite sides or edges of an object. In addition to such single-sided tools, an EOAT may similarly use any of a variety of double-sided tools, including, but not limited to, power clamps, parallel clamps, swing units, and multiple finger or mylar gripping devices, among other mechanical grippers. Further, aspects described herein may be used for any of a variety of other tools, including, but not limited to, drivers, drills, and paint heads, as well as tools for welding, painting, and polishing, among other examples.

An EOAT or fixture may include one or more adjustable assemblies, thereby manipulating or supporting an object using one or more tools associated therewith. For example, an EOAT may have a longitudinal mid-plane along its base along which adjustable assemblies are distributed. In examples, the adjustable assemblies of the EOAT may be positioned such that all tools are on one side of the longitudinal mid-plane, while, in other examples, at least one tool may be on the opposite side of the longitudinal mid-plane. For example, the EOAT may comprise three adjustable assemblies, where two tools are on one side of the longitudinal mid-plane and one tool is on the other side of the longitudinal mid-plane. Such a configuration may enable the EOAT to manipulate a larger object than if all tools were on the same side of the longitudinal mid-plane, by virtue of the increased range of motion (e.g., on both sides of the longitudinal mid-plane rather than a single side).

In examples, an adjustable EOAT or adjustable fixture as described herein is controlled by a controller that configures a set of adjustable assemblies, for example, to manipulate or support an object. The controller may control movement along and/or rotation about the x, y, and/or z axes of each adjustable assembly, thereby positioning an associated tool accordingly. The controller may configure the set of adjustable assemblies for a first object and, subsequently, for a second object. The controller may store one or more configurations for the set of adjustable assemblies (e.g., in association with an object), such that a stored configuration may be retrieved and used to configure the adjustable assemblies accordingly. For example, a stored configuration may define a position and a rotation for a tool along and about the x, y, and z axes. As another example, the stored configuration may define one or more contact points of an object in three-dimensional space, which may be used to generate a position and a rotation for one or more tools of an EOAT accordingly.

In examples, a set of stored configurations may be utilized in a sequence, for example according to an order with which objects are handled on an assembly line. Thus, one or more EOATs and/or fixtures in a series may be configured according to each subsequent object in the sequence as the objects progress down the assembly line. As another example, a configuration may be dynamically selected from the set of stored configurations and applied accordingly. For example, computer vision techniques may be used to identify an object and select an associated configuration accordingly. In another example, such computer vision techniques may be used to dynamically identify one or more locations at which to interact with an object, such that an EOAT and/or fixture may be configured based on the identified locations. Thus, an EOAT may be configured according to a predefined sequence of configurations or dynamically based on an identified object, or any combination thereof.

In some instances, the controller configures a set of adjustable assemblies for an EOAT and a set of adjustable assemblies for a corresponding fixture, such that the EOAT can be used to manipulate an object and place the object on the fixture. The controller may configure an adjustable assembly to be in a retracted or disabled state, such that only a subset of adjustable assemblies is used by the EOAT or fixture. Similarly, the controller may engage or disengage a tool of an adjustable assembly, for example causing the tool to generate or cease generation of a magnetic force or suction force, or extending or retracting a pin of a pin clamp, among other examples.

As a result of the adjustable nature of an EOAT or fixture according to aspects of the present disclosure, it may be possible to transition to handling different objects more quickly, EOATs may be lighter and therefore require less powerful robotic devices, and less space may be needed to house or operate the robotic device as a result in such a reduction in robotic payloads, thereby reducing the overall size of an assembly line, among other benefits. Further, a reduced number of tool stands (e.g., for holding different specialized EOATs) may be provided and fewer fixture stands may be needed in instances where adjustable EOATs and fixtures are used. Additionally, non-valued time may be reduced, as an equipment may spend a lower percentage of time changing tools and a higher percentage of time contributing to value-added processes. As a result of reduced equipment and decreased complexity, higher technical availability may be achieved. Similarly, time to market may be decreased as a result of reduced design and engineering requirements. For instances, simulations may be used to identify robot and/or EOAT movements to adapt an assembly line to manufacture a given object.

In some instances, the controller may further control a robotic device to which the EOAT is mechanically coupled or the controller may be separate from that of a robotic device. One or more image capture devices, light detection and ranging (LIDAR) systems, and/or other machine vision systems and sensors may be used by the controller, for example, to dynamically configure a set of adjustable assemblies based on a detected object. Such sensors may be mounted on the EOAT, the robotic device, and/or external to the EOAT and robotic device, among other examples. Thus, an EOAT need not be restricted to preconfigured object positions. As another example, the controller may identify obstacles and configure an EOAT or fixture so as to avoid a collision or reduce potential damage, among other examples. For example, the controller may model adjustable assemblies and associated movements, such that information of the surrounding environment (e.g., as may be gathered using computer vision techniques and/or LIDAR) may be evaluated to identify potential issues. In embodiments, the tools of the EOAT or fixture itself may be used to assist in determining proximity to the workpiece and/or correctness of the placement of the tool on the workpiece. Additional details are provided in U.S. Pat. No. 10,903,030, US Published Patent Application Nos. US20180311795, and Published PCT Application No. WO2020086791A1, the entire disclosures of which are expressly incorporated by reference herein.

Example computer vision techniques include, but are not limited to, object detection and object tracking. In some instances, sematic segmentation or instance segmentation may be used, for example to determine object boundaries. In some instances, machine learning techniques may be used, for example to detect objects and/or control movement of a robotic device, an adjustable EOAT, an adjustable fixture, and/or one or more constituent adjustable assemblies, linear adjustment subassemblies, or rotational adjustment assemblies. For example, a convolutional neural network or graph neural network may be used for object identification, among other examples. It will be appreciated that the adjustable EOATs and fixtures described herein may be independently controllable or may be controlled in conjunction with one another, among other examples.

Figure 26A:
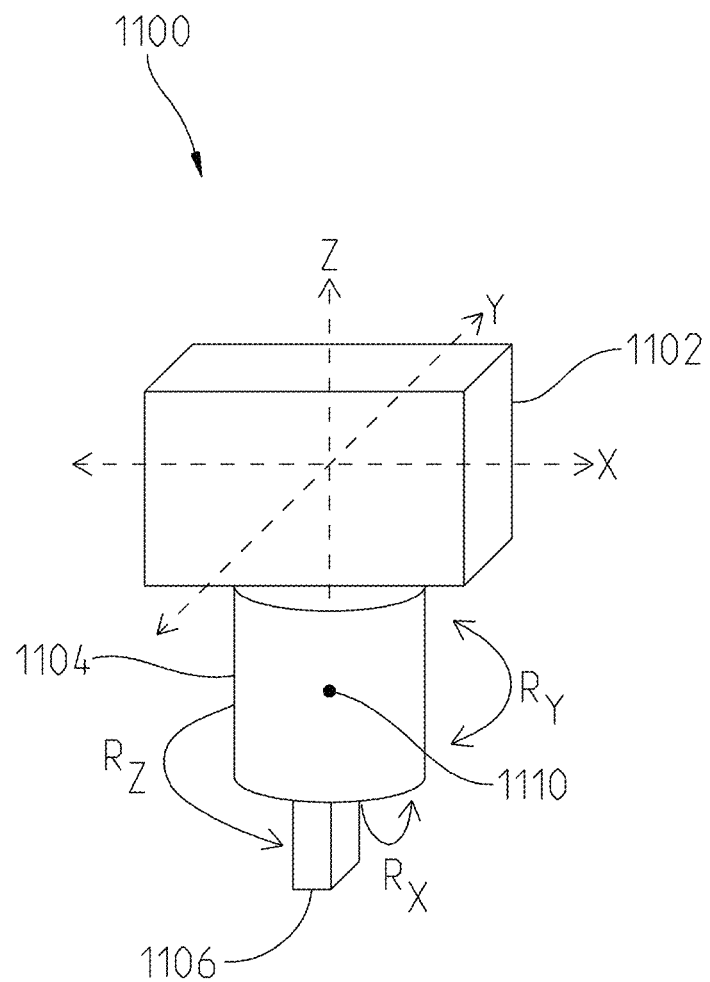
FIG. 26A illustrates a representative front view of an adjustable assembly for use with an adjustable end-of-arm tool or adjustable fixture.

FIG. 26A illustrates a block diagram of a front view of adjustable assembly 1100 for use with an adjustable end-of-arm tool ("EOAT") or adjustable fixture. As illustrated, adjustable assembly 1100 comprises linear adjustment subassembly 1102, rotational adjustment subassembly 1104, and tool 1106. The linear adjustment subassembly 1102 and the rotational adjustment subassembly 1104 have a plurality of links and couplers which permit the desired movements of the adjustable assembly 1100 to position tool 1106. As illustrated, linear adjustment subassembly 1102 enables movement along the x, y, and z axes. Rotational adjustment subassembly 1104 is mechanically coupled to linear adjustment subassembly 1102, such that movement by linear adjustment subassembly 1102 adjusts the position of rotational adjustment subassembly 1104 accordingly. Further, the grouping of translational movements (linear movements) in one sub-assembly and rotational movements (angular movements) in another sub-assembly is for the ease of the reader, not due to a requirement that they be in separate sub-assemblies. On the contrary, it is possible, in embodiments to have a given sub-assembly that provides both translational and rotational motion. As another example, rotational mounts may couple links of a sub-assembly together, thereby enhancing the modularity and range of motion of the sub-assembly, as may be beneficial in instances where multiple adjustable assemblies 1100 are used.

Rotational adjustment subassembly 1104 is illustrated as enabling rotational movement about the x, y, and z axes. It will be appreciated that a given point of rotation 1110 may occur in the center of rotational adjustment assembly 1104, at an end portion of the rotational adjustment assembly, and/or at an attachment point of tool 1106, among other examples. In embodiments, rotational adjustment assembly 1104 may be coupled to linear adjustment subassembly in a way wherein rotation is not about the x, y, and z axes, but rather about three orthogonal axes (a fourth axis, a fifth axis, and a sixth axis) that are rotated relative to at least two of the x, y, and z axes. However, in examples the fourth axis, the fifth axis, and the sixth axis do coincide with the x, y, and z axes.

In embodiments, rotational adjustment assembly 1104 is a wrist joint having a frame and an output interface supported by the frame. The tool 1106 is coupled to the output interface. The output interface may be rotated about the z-axis with a hydraulic motor, stepper motor, or other suitable device which rotates the frame relative to the linear adjustment subassembly 1102. Along with the output interface, a control assembly for rotation about the y-axis and a control assembly for rotation about the x-axis are rotated about the z-axis. The control assembly for rotation about the y-axis may include a first ring that surrounds the z-axis and which is pivotably connected to the frame. The pivot axis between the frame and the first ring corresponds to the y-axis. The angular position of the first ring relative to the frame may be controlled with a hydraulic cylinder coupled between the frame and the first ring at a location spaced apart from the pivots between the frame and first ring. The first ring carries the control assembly for rotation about the x-axis and the output interface. As such, a rotation of the first ring about the y-axis causes a corresponding rotation of the output interface and hence the tool about the y-axis. The control assembly for rotation about the x-axis may include a second ring that surrounds the z-axis and which is pivotably connected to the first ring of the y-axis control assembly. The pivot axis between the first ring and the second ring corresponds to the x-axis. The angular position of the second ring relative to the first ring may be controlled with a hydraulic cylinder coupled between the first ring and the second ring at a location spaced apart from the pivots between the first ring and the second ring. The second ring carries the output interface. As such, a rotation of the second ring about the x-axis causes a corresponding rotation of the output interface and hence the tool about the x-axis. In embodiments, the pivot axis between the frame and first ring for the control assembly for rotation about the y-axis and the pivot axis between the first ring and the second ring for the control assembly for rotation about the x-axis intersect each other. In embodiments, the pivot axis between the frame and first ring for the control assembly for rotation about the y-axis and the pivot axis between the first ring and the second ring for the control assembly for rotation about the x-axis intersect each other and intersect the rotation axis of the frame about the z-axis, shown as point 1110 in FIG. 26A. An exemplary wrist joint is disclosed in Chinese Patent No. CN110171015B.

Thus, linear adjustment subassembly 1102 and rotational adjustment subassembly 1104 are usable to adjust the position of tool 1106 along and about the x, y, and z axes. As described above, tool 1106 may be a gripper or a locator, among other examples. In some instances, tool 1106 may be removable from rotational adjustment assembly 1104, such that tool 1106 is mechanically coupled at an attachment point of rotational adjustment assembly 1104.

Figure 26B:
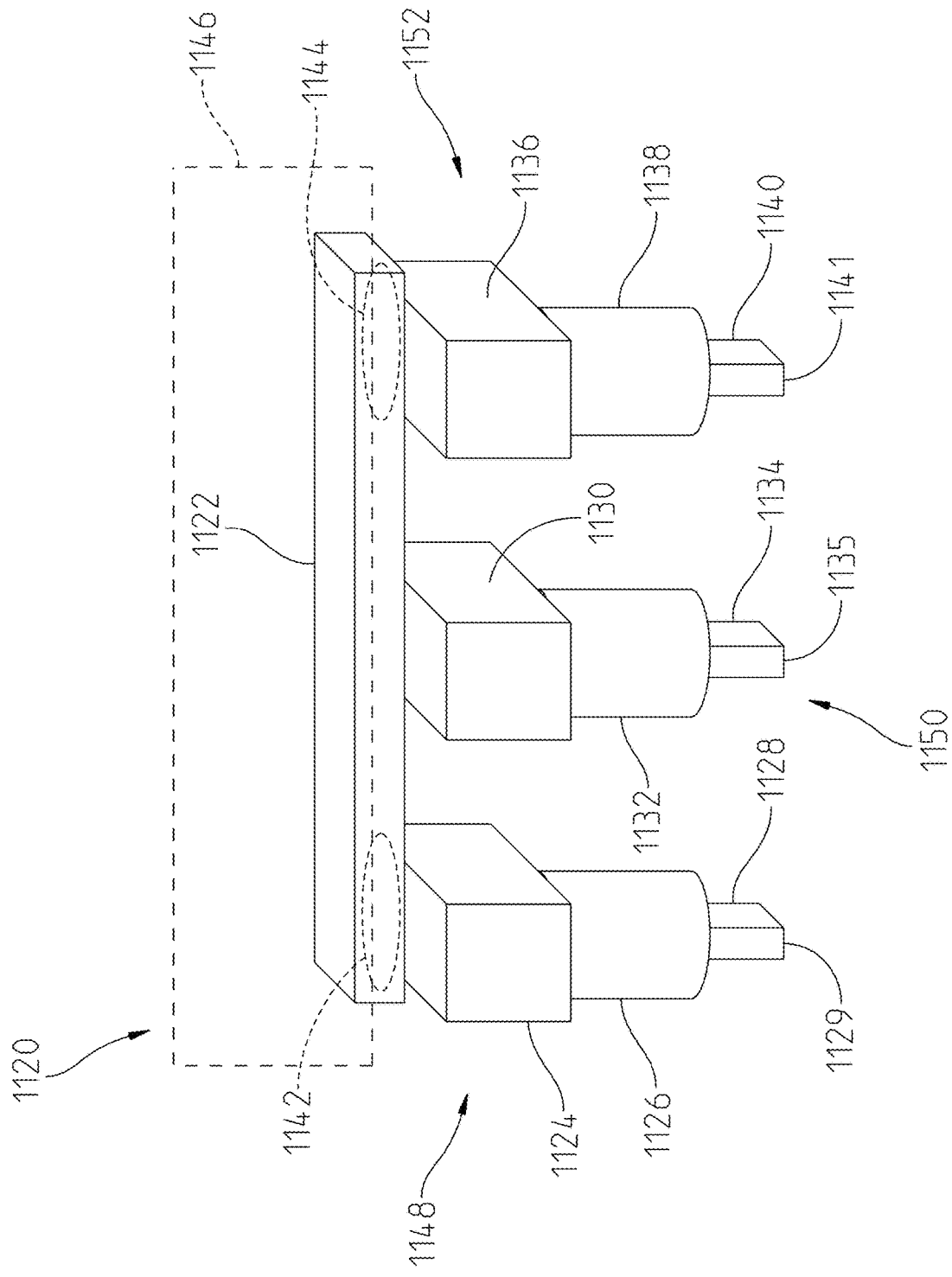
FIGS. 26B and 26C illustrate representative front and back views, respectively, of an adjustable end-of-arm tool having multiple adjustable assemblies in various configurations according to aspects of the present disclosure.
Figure 26C:
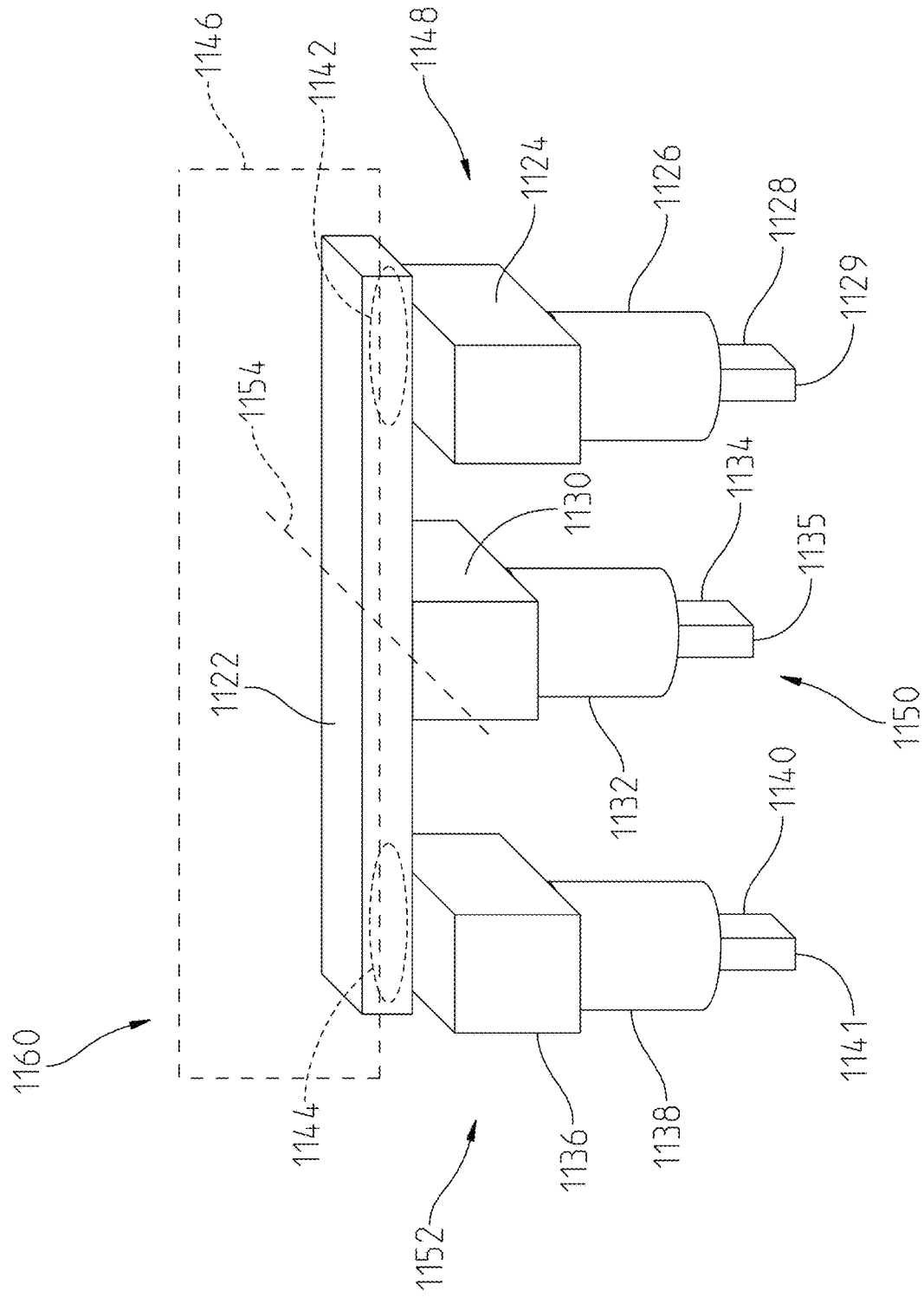

FIGS. 26B and 26C illustrate block diagrams of a front view 1120 and a back view 1160, respectively, of an adjustable end-of-arm tool 1122 having multiple adjustable assemblies 1148, 1150, and 1152 in various configurations according to aspects of the present disclosure.

EOAT 1122 comprises adjustable assembly 1148 (e.g., comprising linear adjustment subassembly 1124, rotational adjustment subassembly 1126, and tool 1128), adjustable assembly 1150 (e.g., comprising linear adjustment subassembly 1130, rotational adjustment subassembly 1132, and tool 1134), and adjustable assembly 1152 (e.g., comprising linear adjustment subassembly 1136, rotational adjustment subassembly 1138, and tool 1140). The respective linear adjustment subassemblies 1124, 1130, and 1136 and the respective rotational adjustment subassemblies 1126, 1132, and 1138 each have a plurality of links and couplers which permit the desired movements of the respective adjustable assembly 1148, 1150, and 1152 to position respective tool 1128, 1134, and 1140. In embodiments, the interfaces 1129, 1135, and 1141 of tools 1128, 1134, and 1140 of EOAT 1122 may form a plane via which an object can be manipulated. In embodiments, at least two of the interfaces 1129, 1135, and 1141 of tools 1128, 1134, and 1140 of EOAT 1122 are non-planer due to either a translation of one of tools relative to the other and/or a rotation of one of the tools relative to the other. It will be appreciated that, in other examples, interfaces 1129, 1135, and 1141 may be planar. In examples, tools 1128, 1134, and 1140 need not be the same type of tool. For example, tools 1128 and 1140 may be magnetic grippers, while tool 1134 may be a locating pin.

As illustrated in view 1120, EOAT 1122 is in a configuration where adjustable assemblies 1148, 1150, and 1152 are distributed along longitudinal mid-plane 1146 such that tools 1128, 1134, and 1140 are all on one side of longitudinal mid-plane 1146. EOAT 1122 is further illustrated as including rotation mounts 1142 and 1144, such that adjustable assemblies 1148 and/or 1152 may be rotated to achieve alternate configurations. View 1160 in FIG. 26C illustrates such an alternate configuration of EOAT 1122, where adjustable assemblies 1148 and 1152 are configured to position tools 1128 and 1140 on the opposite side of longitudinal mid-plane 1146 as compared to adjustable assembly 1150 and its associated tool 1134. In addition to the illustrated rotation, rotation mounts 1142 and 1144 may be linearly translatable along longitudinal mid-plane 1146 to adjust the position of tools 1128 and 1140 along longitudinal mid-plane 1146 with respect to tool 1134.

Such a configuration may offer a deeper range of motion (e.g., along axis 1154) as compared to that of the configuration in view 1120. In other configurations, an adjustable assembly may be configured to be in line with longitudinal mid-plane 1146, such that the configuration of tools 1128, 1134, and 1140 is wider (e.g., along axis 1146) than the configurations illustrated in views 1120 and 1160. It will be appreciated that, in other examples, rotation mounts 1142 and/or 1144 may be omitted, such that adjustable assemblies 1148 and 1152, respectively, are fixably attached to EOAT 1122, similar to adjustable assembly 1150. In other examples, any number of adjustable assemblies and/or rotation mounts may be used.

Figure 26D:
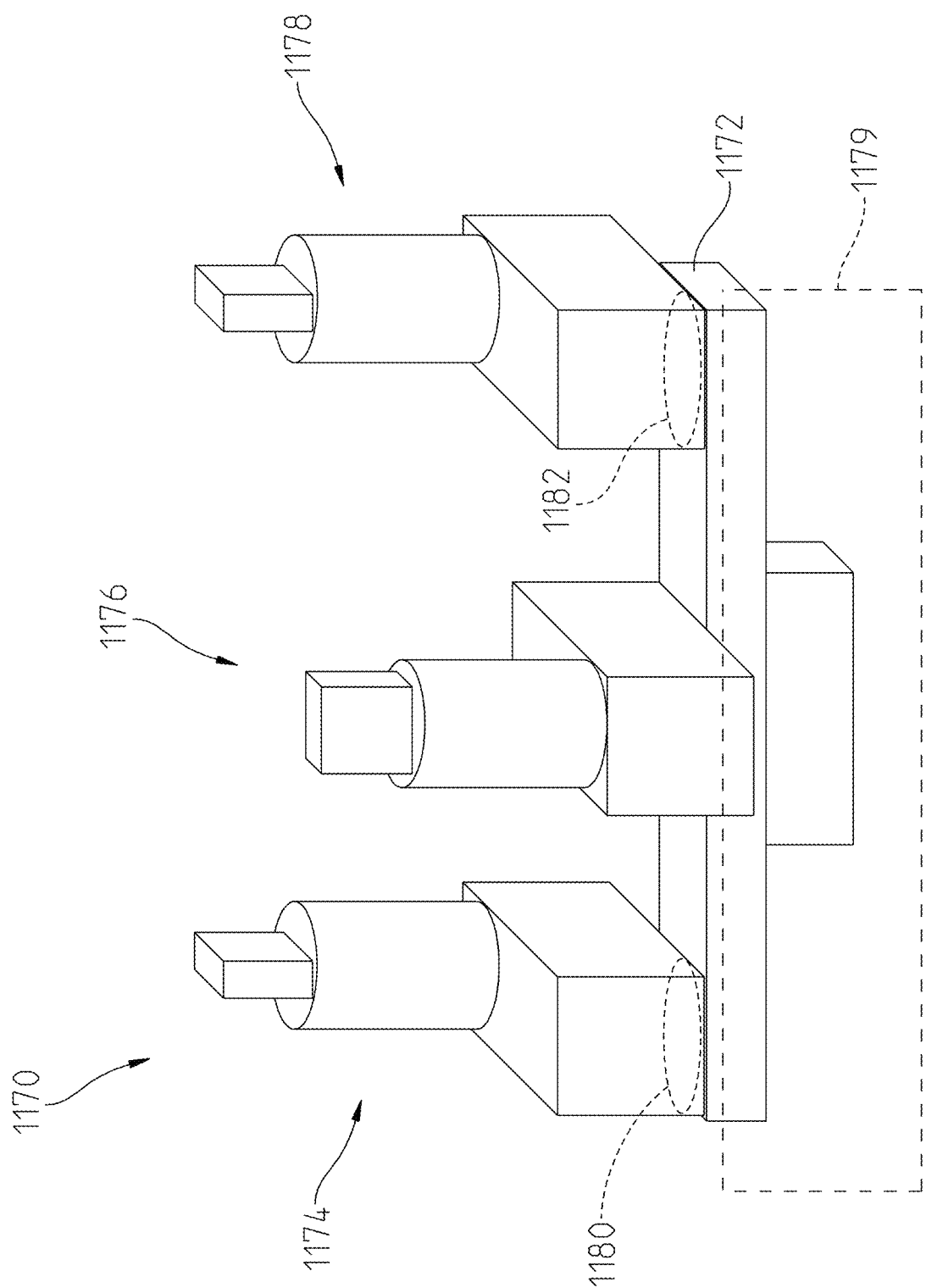
FIG. 26D illustrates a representative front view of an adjustable fixture having multiple adjustable assemblies.

FIG. 26D illustrates a block diagram of a front view of an adjustable fixture 1170 having multiple adjustable assemblies. Aspects of adjustable fixture 1170 are similar to EOAT 1122 and are therefore not necessarily re-described in detail. For example, EOAT 1122 is illustrated as comprising adjustable assemblies 1174, 1176, and 1178, which are similar to those discussed above with respect to FIGS. 26A-26C.

Similar to EOAT 1122, base 1172 of adjustable fixture 1170 comprises rotation mounts 1180 and 1182, such that adjustable assemblies 1174 and 1178 may be rotated for configurations where one or more of adjustable assemblies 1174, 1176, and 1178 are on the same or different sides of a longitudinal mid-plane 1179 of adjustable fixture 1170. As discussed above, adjustable fixture 1170 may be used to support an object, as may be placed on adjustable fixture 1170 using an adjustable EOAT, such as EOAT 1122 discussed above. Thus, both adjustable fixture 1170 and EOAT 1122 may be configured by a controller to support and manipulate, respectively, the same object.

FIGS. 27A-27D illustrate example views 1200, 1220, 1240, and 1260 of a robotic device 1202 having an adjustable end-of-arm tool (e.g., comprising linear adjustment subassembly 1210, rotational adjustment subassembly 1204, and tool 1212) manipulating multiple objects 1208 and 1262 according to aspects described herein. Although the EOAT is illustrated with a single adjustable assembly, the EOAT may have two or more adjustable assemblies each having translational and/or rotational adjustability.

Thus, in addition to the tool adjustment aspects described above with respect to an adjustable assembly, an EOAT itself may be moved. As an example, the EOAT may be configured according to a stored configuration associated with objects 1208 or objects 1262, such that robotic device 1202 may then move the EOAT to manipulate objects 1208 or objects 1262 accordingly.

For example, as compared to view 1200, view 1220 depicts the EOAT in a configuration to manipulate objects 1208. As illustrated, rotational adjustment subassembly 1204 has been configured to rotate tool 1212 in such a way that it may manipulate objects 1208. In some examples, linear adjustment subassembly 1210 may similarly move tool 1212 along one or more axes, for example to better access objects 1208 in container 1206.

Accordingly, robotic device 1202 may move the adjustable EOAT into container 1206, at which point a controller may engage tool 1212 to manipulate object 1214 of objects 1208 accordingly. For example, tool 1212 may be a magnetic gripper or a suction gripper, such that tool 1212 is used to generate magnetic or suction force. In some examples, the EOAT may remain in a substantially similar configuration for the duration that it is used by robotic device 1202 to manipulate object 1214. In other instances, linear adjustment subassembly 1210 and/or rotational adjustment subassembly 1204 may be reconfigured while tool 1212 is gripping object 1214. For example, linear adjustment subassembly 1210 may move tool 1212 along one or more of the x, y, or z axes in addition to or as an alternative to movement by robotic device 1202. Thus, it will be appreciated that robotic device 1202 and the EOAT may operate in concert to manipulate object 1214.

View 1260 similarly illustrates robotic device 1202 using EOAT to manipulate objects 1262 using tool 1212. In examples, the EOAT is configured according to a stored configuration associated with objects 1262, for example, from a previous configuration for objects 1208. In some instances, computer vision, a LIDAR system, or other sensor information is used to identify objects 1208 and/or objects 1262 within container 1206, such that the EOAT may be dynamically configured to manipulate objects 1208 and/or 1262 accordingly. For example, the EOAT may be configured based on the sensor information (e.g., absent pre-existing configuration information for objects 1208 and/or 1262) or an associated configuration may be adapted according to the sensor information, for example to account for variations in the position of objects 1208 and/or 1262.

Figure 28A:
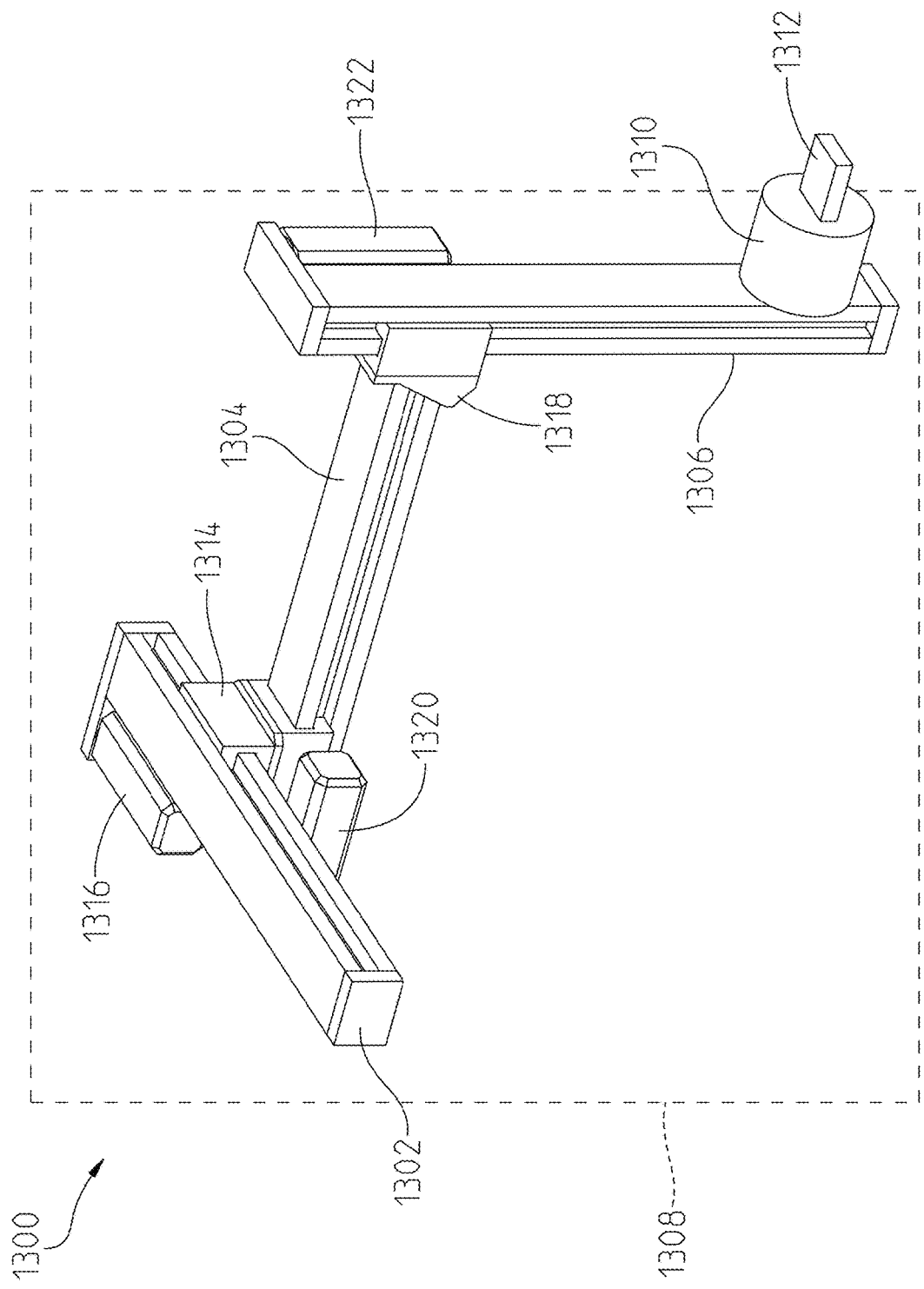
FIG. 28A illustrates a front left view of an example adjustable assembly.
Figure 28B:
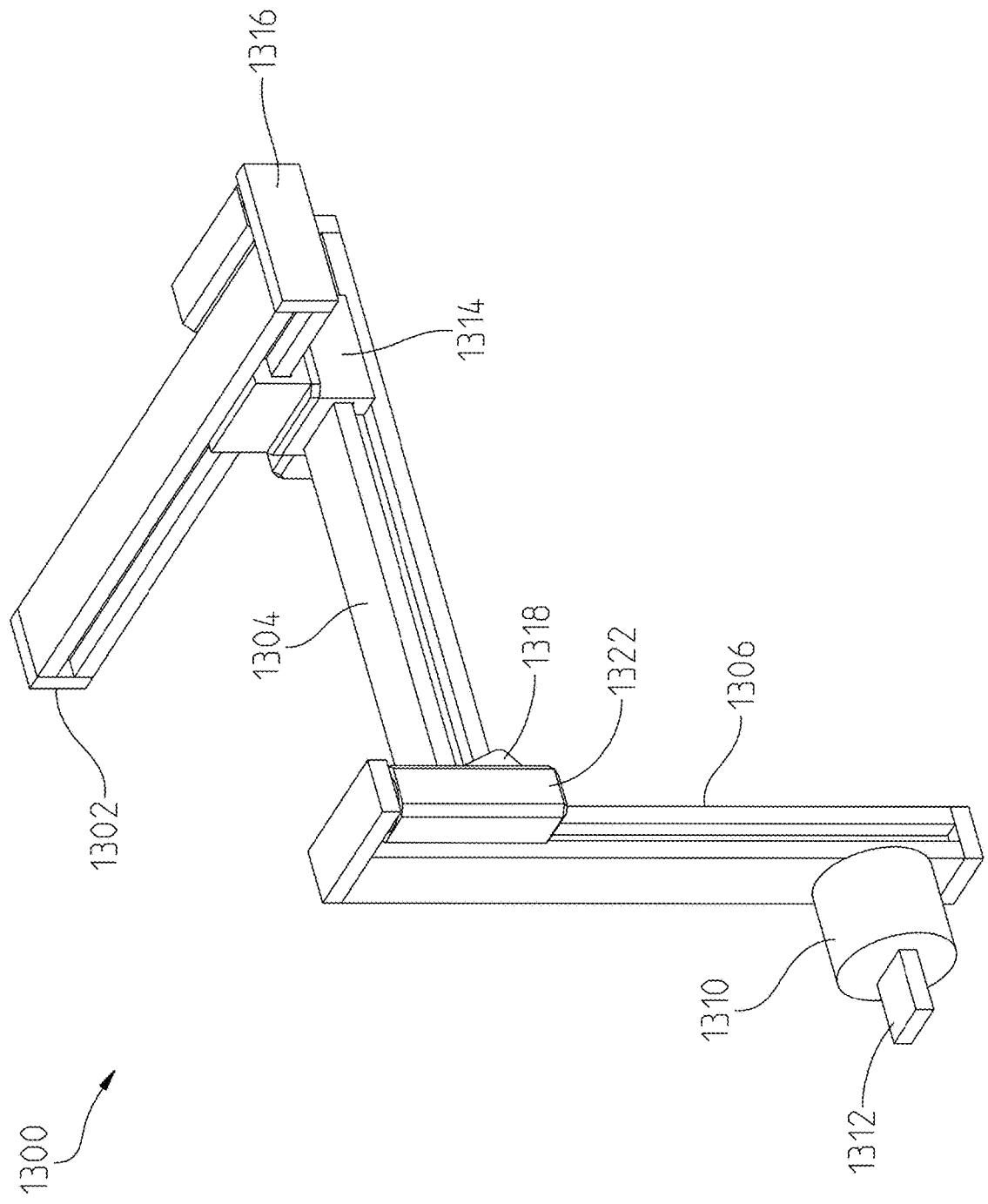
FIG. 28B illustrates a front right view of an example adjustable assembly.
Figure 28C:
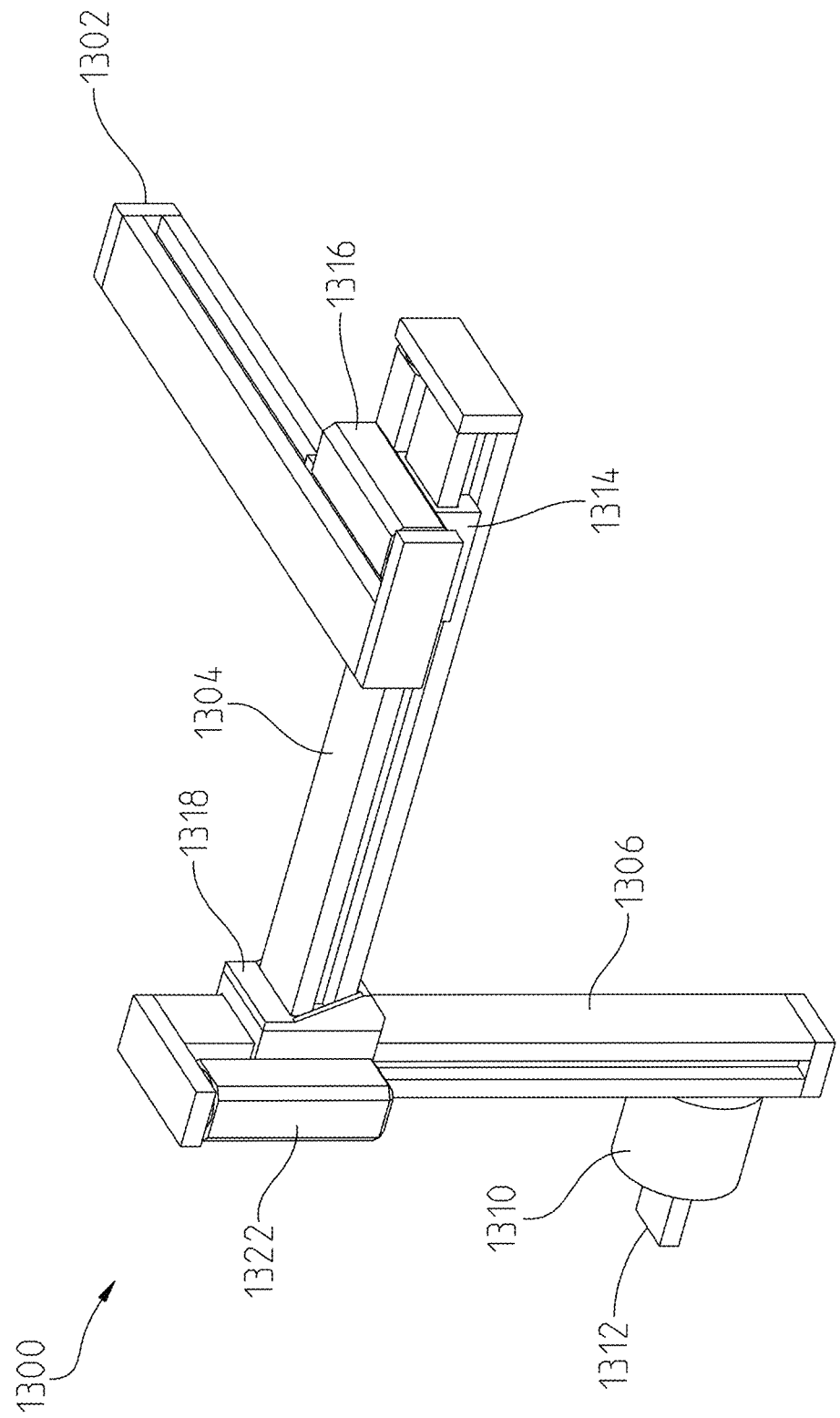
FIG. 28C illustrates a rear left view of an example adjustable assembly.

FIG. 28A illustrates a front left view of an example adjustable assembly 1300, while FIG. 28B illustrates a front right view and FIG. 28C illustrates a rear left view. As illustrated, adjustable assembly 1300 comprises linear adjustment subassembly 1308, rotational adjustment subassembly 1310, and tool 1312. The linear adjustment subassembly 1308 and the rotational adjustment subassembly 1310 each have a plurality of links and couplers which permit the desired movements of the adjustable assembly 1300 to position the tool 1312. Linear adjustment subassembly 1308 is illustrated as comprising linear rails 1302, 1304, and 1306. As illustrated, slidable coupler 1314 slides along linear rail 1302 and linear rail 1304, while slidable coupler 1322 slides along linear rail 1306. Thus, in the instant example, slidable coupler 1314 enables movement along two perpendicular axes (e.g., that of linear rails 1302 and 1304; the x and y axes), while slidable coupler 1318 enables movement along one axis perpendicular to those of slidable coupler 1314 (e.g., that of linear rail 1306; the z axis).

Linear adjustment subassembly 1308 is further depicted as comprising motors 1316, 1320, and 1322. As illustrated, motor 1316 causes movement along linear rail 1302, motor 1320 causes movement along linear rail 1304, and motor 1322 causes movement along linear rail 1306. In examples, motors 1316, 1320, and 1322 each comprise a rotary encoder, such that the positions along linear rails 1302, 1304, and 1306 may be determined. For example, the location of coupler 1314 may be determined relative to linear rail 1302 by a rotary encoder of motor 1316, while the location of coupler 1314 along linear rail 1304 may be determined by a rotary encoder of motor 1320. Similarly, the location of coupler 1318 along linear rail 1306 may be determined by motor 1322. It will be appreciated that such aspects are provided as an example and, in other examples, any of a variety of additional or alternative techniques may be used to determine the current configuration of linear adjustment subassembly 1308. Such feedback may similarly be provided by rotational adjustment subassembly 1310. For example, an absolute encoder may be used (e.g., for each axis), such that homing after an interruption in power may not be required. Further, data from absolute encoders of an adjustable assembly may be used by a controller (e.g., controller 1050) to store a configuration of the adjustable assembly for subsequent use.

Adjustable assembly 1300 is further illustrated as comprising rotational adjustment assembly 1310 and tool 1312, aspects of which are similar to those discussed above with respect to FIGS. 26A-26D and 27A-27D, and are therefore not necessarily re-described in detail. As noted above, rotational adjustment assembly 1310 may enable rotation about the x, y, and z axis, such that tool 1312 may be rotated accordingly.

It will be appreciated that the location at which rotational adjustment assembly 1310 is affixed to linear rail 1306 is provided as an example. As another example, rotational adjustment assembly 1310 may be affixed to the end of linear rail 1306 or, as a further example, rather than moving linear rail 1306 with respect to slidable coupler 1318, linear rail 1306 may be fixably coupled to linear rail 1304 and motor 1322 may be configured to move rotational adjustment assembly 1310 along linear rail 1306 instead.

Figure 29A:
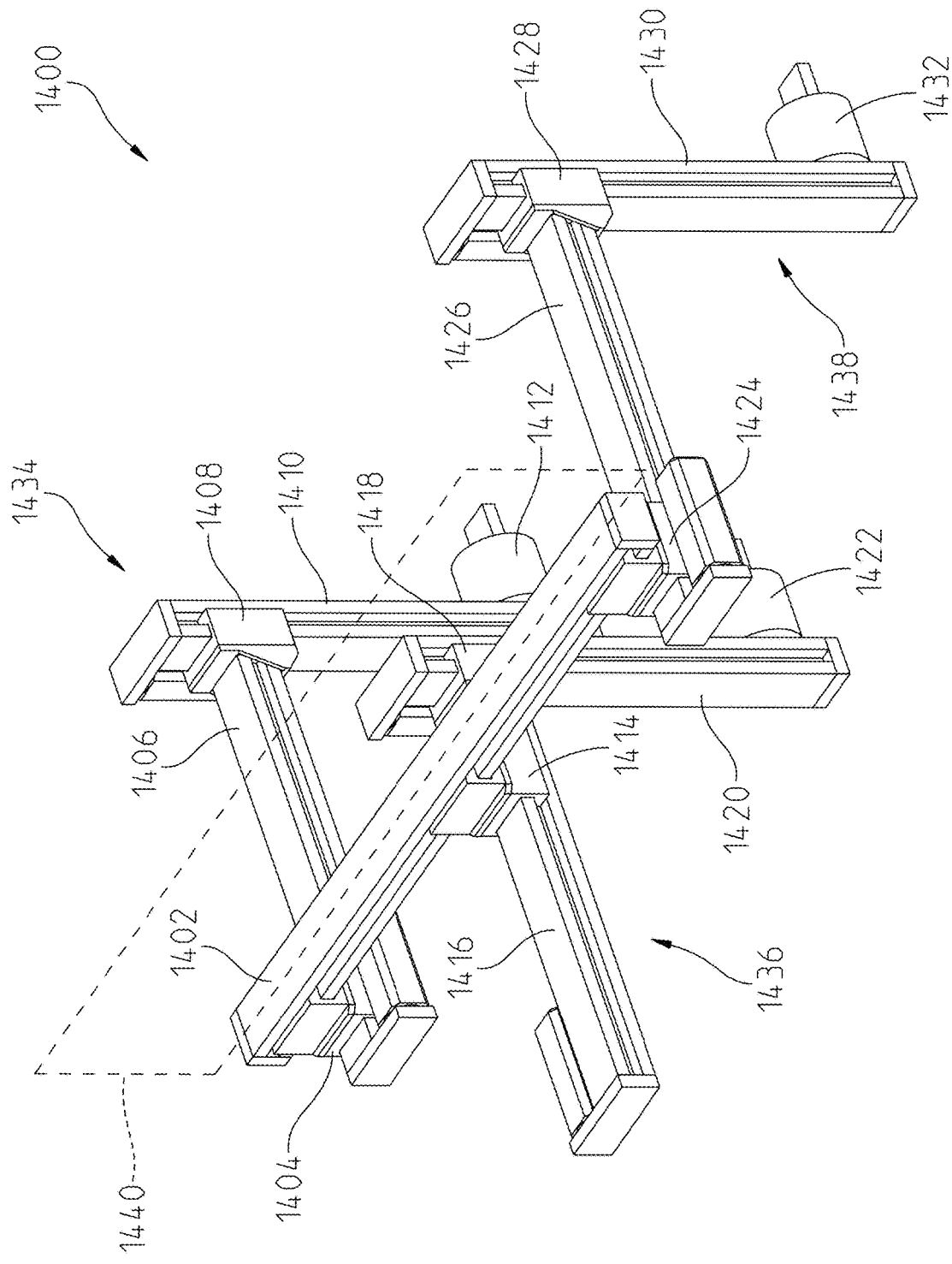
FIG. 29A illustrates a top perspective view of an adjustable end-of-arm tool having multiple adjustable assemblies according to aspects of the present disclosure.
Figure 29B:
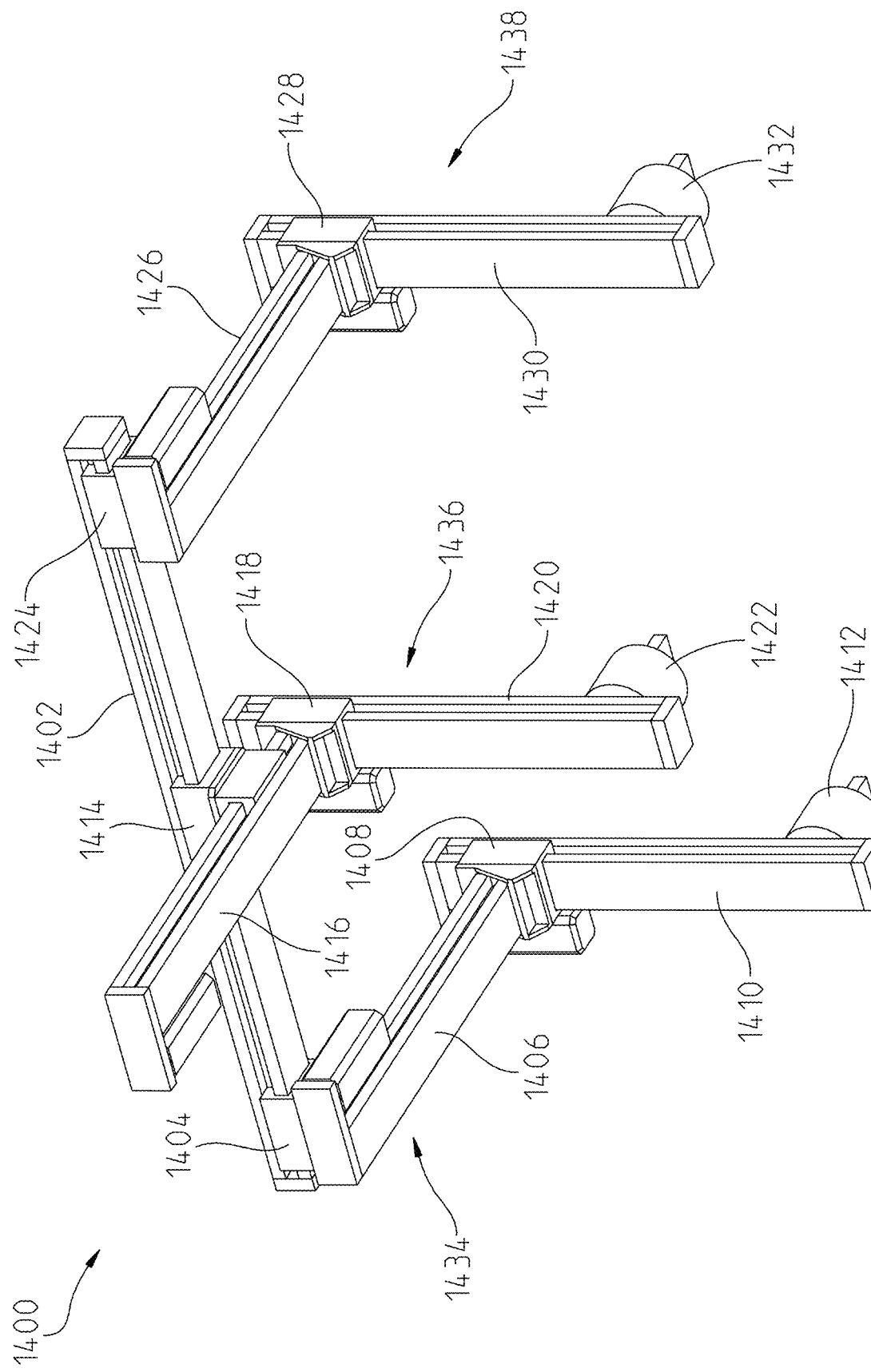
FIG. 29B illustrates a bottom perspective view of an adjustable end-of-arm tool having multiple adjustable assemblies according to aspects of the present disclosure.
Figure 29C:
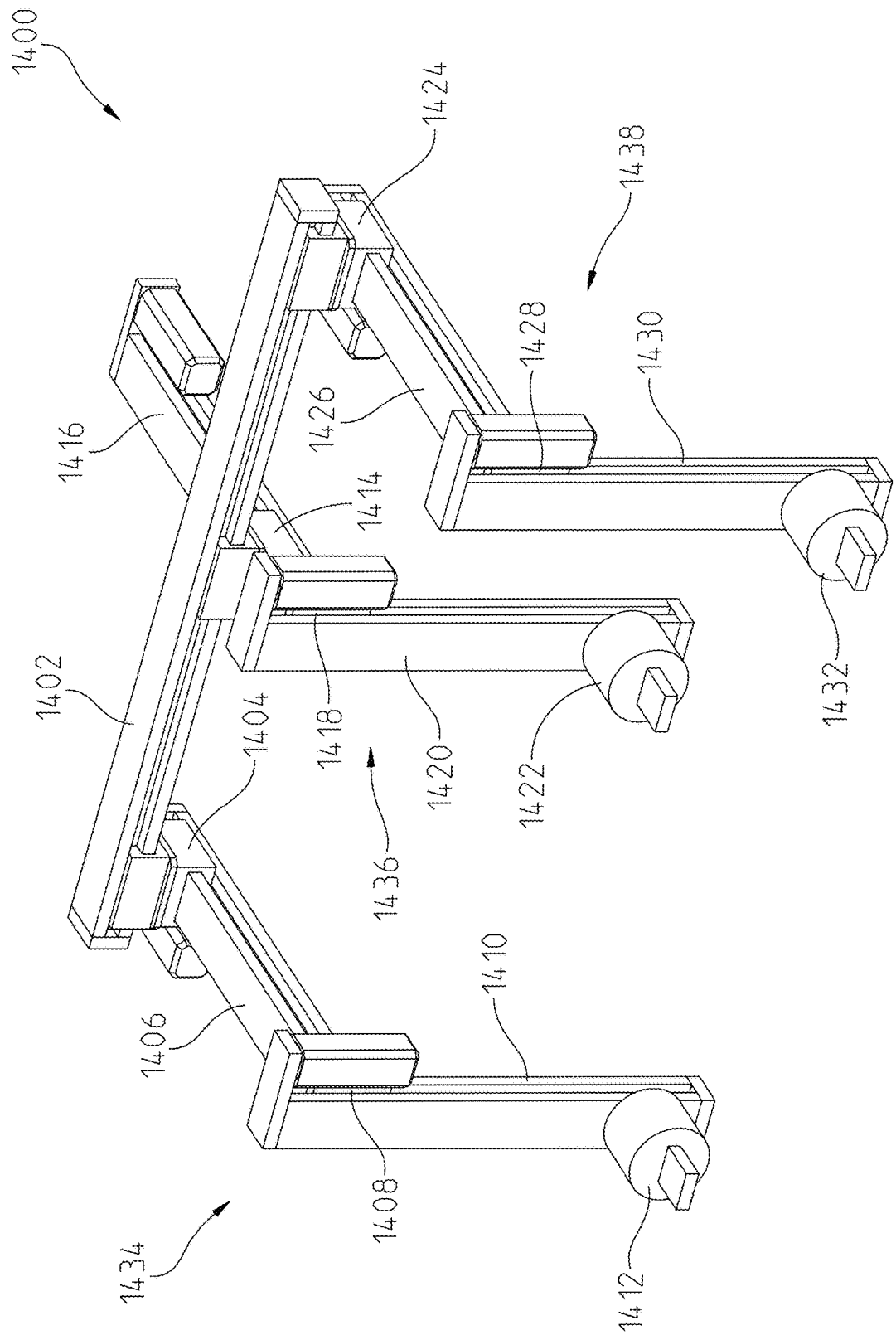
FIG. 29C illustrates another top perspective view of an adjustable end-of-arm tool having multiple adjustable assemblies according to aspects of the present disclosure.

FIG. 29A illustrates a top perspective view of an adjustable end-of-arm tool 1400 having multiple adjustable assemblies according to aspects of the present disclosure, while FIG. 29B illustrates a bottom perspective view and FIG. 29C illustrates another top perspective view. For example, EOAT 1400 may be used by a robotic device, such as robotic device 1202 discussed above with respect to FIGS. 27A-27D. In such instances, common linear rail 1402 may comprise a mechanism with which EOAT 1400 may be mechanically coupled to robotic device 1202. Aspects of EOAT 1400 may be similar to that of EOAT 1122 discussed above with respect to FIGS. 26B-26C and are therefore not necessarily re-described below in detail. Further, while FIGS. 29A-29C depict an EOAT 1400, it will be appreciated that similar aspects are applicable to an adjustable fixture, similar to adjustable fixture 1170 discussed above with respect to FIG. 26D.

As illustrated, EOAT 1400 comprises adjustable assemblies 1434, 1436, and 1438. Adjustable assembly 1434 is illustrated as comprising slidable coupler 1404, linear rail 1406, slidable coupler 1408, linear rail 1410, and rotatable adjustment subassembly 1412. Adjustable assembly 1436 is illustrated as comprising slidable coupler 1414, linear rail 1416, slidable coupler 1418, linear rail 1420, and rotatable adjustment subassembly 1422. Adjustable assembly 1438 is illustrated as comprising slidable coupler 1424, linear rail 1426, slidable coupler 1428, linear rail 1430, and rotatable adjustment subassembly 1432.

As compared to adjustable assembly 1300 discussed above with respect to FIGS. 28A-28C, adjustable assemblies 1434, 1436, and 1438 have a base including a common linear rail 1402 on which slidable couplers 1404, 1414, and 1424 move along longitudinal mid-plane 1440. Adjustable assemblies 1434, 1436, and 1438 each further comprise linear rails 1406, 1416, and 1426 that are coupled to slidable couplers 1404, 1414, or 1424, respectively, such that each adjustable assembly may position a respective tool along linear rails 1406, 1416, and 1426 accordingly. Although the base is shown as having a single linear rail, in embodiments, base includes multiple rails, each supporting one or more of the adjustable assemblies.

The illustrated example EOAT 1400 is a configuration in which all adjustable assemblies 1434, 1436, and 1438 are on the same side of longitudinal mid-plane 1440 (e.g., similar to the configuration illustrated in view 1120 discussed above with respect to FIG. 26B). In some instances, EOAT 1400 may further comprise one or more rotation mounts, such that an adjustable assembly may be rotated perpendicular to longitudinal mid-plane 1440, similar to the aspects discussed above with respect to view 1160 of FIG. 26C. As another example, an adjustable assembly may be fixably attached in another configuration (e.g., rotated 90 or 180 degrees).

Figure 30A:
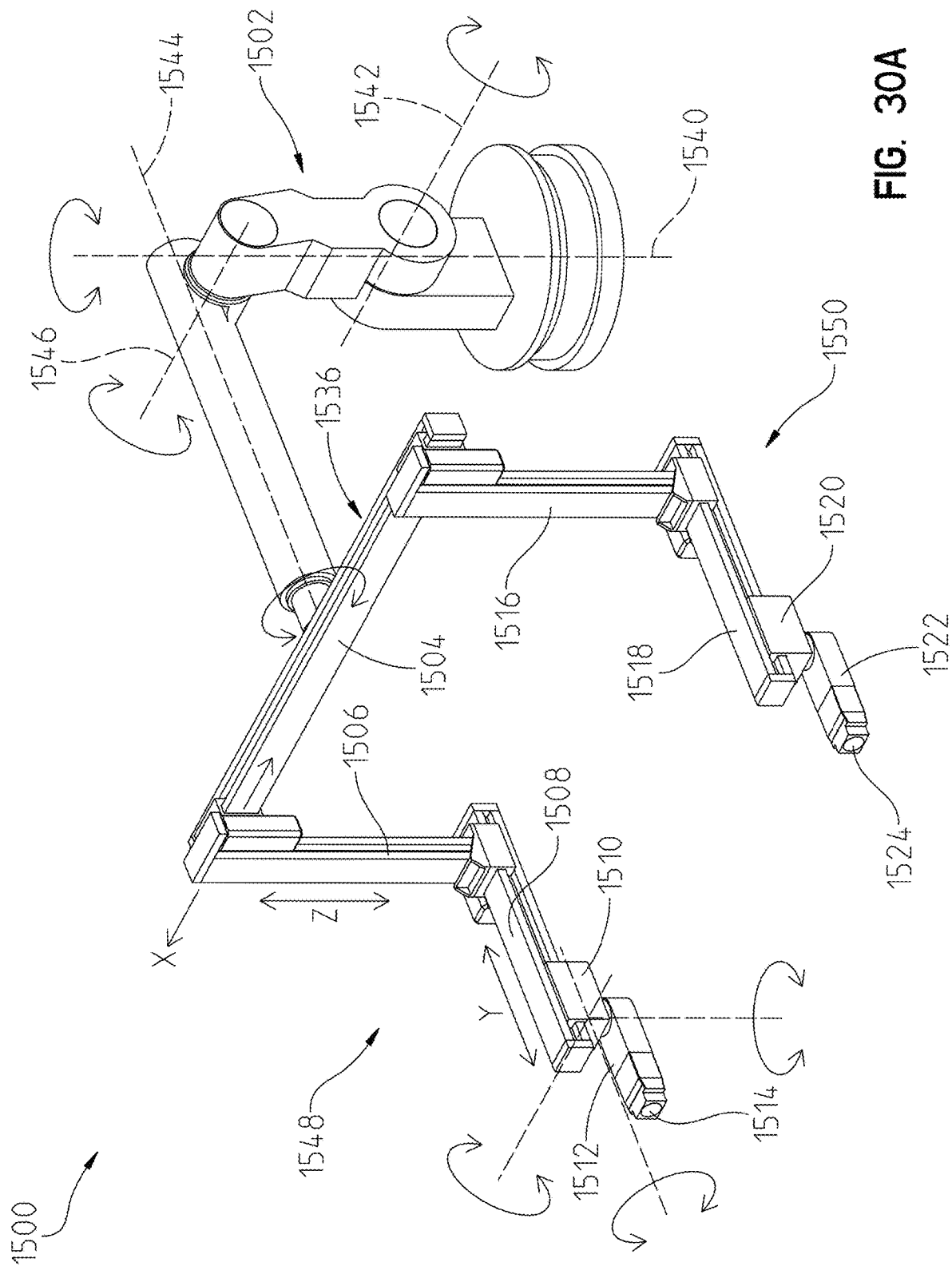
FIG. 30A illustrates a perspective view of a robotic device having an adjustable end-of-arm tool according to aspects of the present disclosure.

FIG. 30A illustrates a perspective view 1500 of a robotic device 1502 having an adjustable end-of-arm tool 1536 according to aspects of the present disclosure. Aspects of robotic device 1502 and EOAT 1536 may be similar to those discussed above and may therefore not necessarily be re-described in detail below. For example, EOAT 1536 may be similar to that of EOAT 1400 discussed above with respect to FIGS. 29A-29C.

As illustrated, robotic device 1502 is configured to move EOAT 1536 above a variety of axes 1540, 1542, 1544, and 1546. Thus, tools 1512 and 1522 may be moved about such axes in addition to or as an alternative to movement by adjustable assemblies 1548 and 1550 according to aspects described herein. As illustrated, adjustable assembly 1548 comprises linear rail 1506, linear rail 1508, rotational adjustment subassembly 1510, tool 1512, and contact point 1514. Similarly, adjustable assembly 1550 comprises linear rail 1516, linear rail 1518, rotational adjustment subassembly 1520, tool 1522, and contact point 1524. Similar to EOAT 1400 discussed above with respect to FIGS. 29A-29C, EOAT 1536 comprises common linear rail 1504 along which adjustable assemblies 1548 and/or 1550 may move. For example, common linear rail 1504 may enable movement of tools 1512 and 1522 along the x-axis, while linear rails 1506 and 1516 may enable movement along the z-axis and linear rails 1508 and 1518 may enable movement along the y-axis.

Figure 30B:
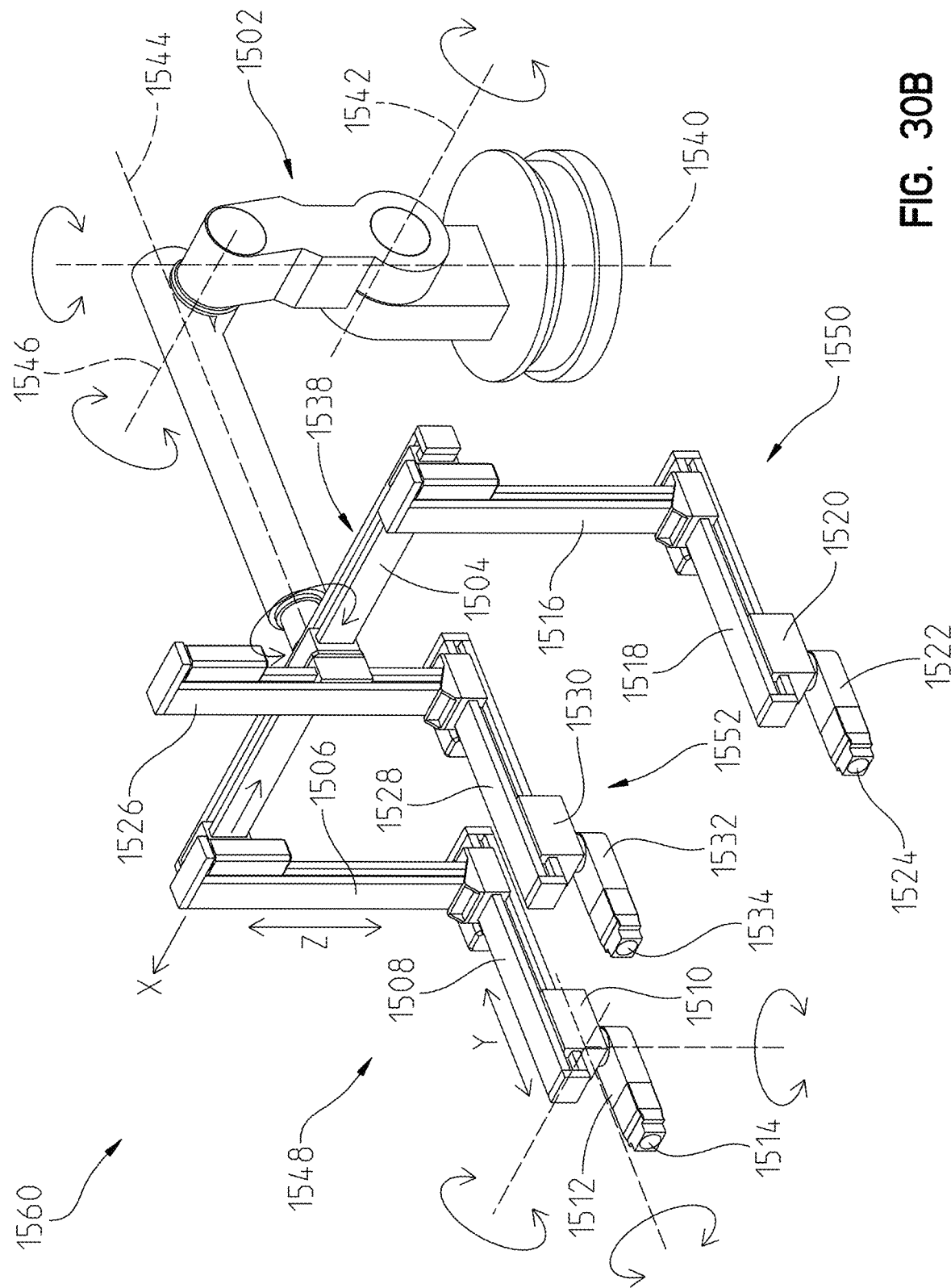
FIG. 30B illustrates a perspective view of a robotic device having another adjustable end-of-arm tool according to aspects of the present disclosure.

While examples are described herein with a configuration of linear rails offering movement in a given order of axes, it will be appreciated that a linear adjustment subassembly may have any of a variety of other arrangements. For example, FIGS. 28A-28C illustrate an instance where a first linear rail 1302 enables movement along the x-axis, a second linear rail 1304 enables movement along the y-axis, and a third linear rail 1306 enables movement along the z-axis, while FIGS. 30A-30B illustrate an instance where a first linear rail 1504 enables movement along the x-axis, a second linear rail 1506 enables movement along the z-axis, and a third linear rail 1508 enables movement along the y-axis. Further, other examples need not restrict movement axes that are perpendicular to one another.

As discussed above, adjustable assemblies 1548 and 1550 of EOAT 1536 may be configured for manipulation of any of a variety of objects. In examples, EOAT 1536 is configured independent of movement by robotic device 1502, such that EOAT 1536 is configured to manipulate an object (e.g., thereby enabling robotic device 1502 to grip the object), while robotic device 1502 moves EOAT 1536 (and, when interfaces 1514 and 1524 are engaged, an object associated therewith) about one or more of axes 1540, 1542, 1544, and 1546. Such movements need not be mutually exclusive, such that robotic device 1502 may move toward an object while EOAT 1536 is configured to manipulate the object at least partially contemporaneously with the movement of robotic device 1502.

In other instances, adjustable assemblies 1548 and 1550 may be operated in conjunction with movement of robotic device 1502, such that the object is moved as a result of a combination of movement by robotic device 1502 and EOAT 1536. In such instances, the positions of tools 1512 and 1522 may remain substantially fixed with respect to one another, even while there is movement along and/or rotation about the x, y, and/or z axes.

FIG. 30B illustrates a perspective view 1560 of a robotic device 1502 having another adjustable end-of-arm tool 1538 according to aspects of the present disclosure. As compared to EOAT 1536 discussed above with respect to FIG. 30A, EOAT 1538 has an additional adjustable assembly 1552 comprising linear rail 1526 for movement along the z-axis, linear rail 1528 for movement along the y-axis, rotational adjustment subassembly 1530 for rotation about the x, y, and z axes, tool 1532, and contact point 1534. Thus, it will be appreciated that an EOAT may include any number of adjustable assemblies, for example according to the weight to be lifted using the EOAT or the range needed to grip an object, among other examples. In some examples, an adjustable assembly may be disabled for certain objects. For example, EOAT 1538 may be used similar to EOAT 1536 in some instances, where adjustable assembly 1552 may be retracted or otherwise moved such that tool 1532 is not in contact with an object that is otherwise contacted at contact points 1514 and 1524 of tools 1512 and 1522, respectively. In instances where an EOAT includes multiple adjustable assemblies, each adjustable assembly may comprise a set of sensors used by a controller (e.g., controller 1050) to prevent or mitigate crashes that may occur among the multiple adjustable assemblies (e.g., between adjustable assemblies 1548, 1550, and/or 1552).

Figure 31A:
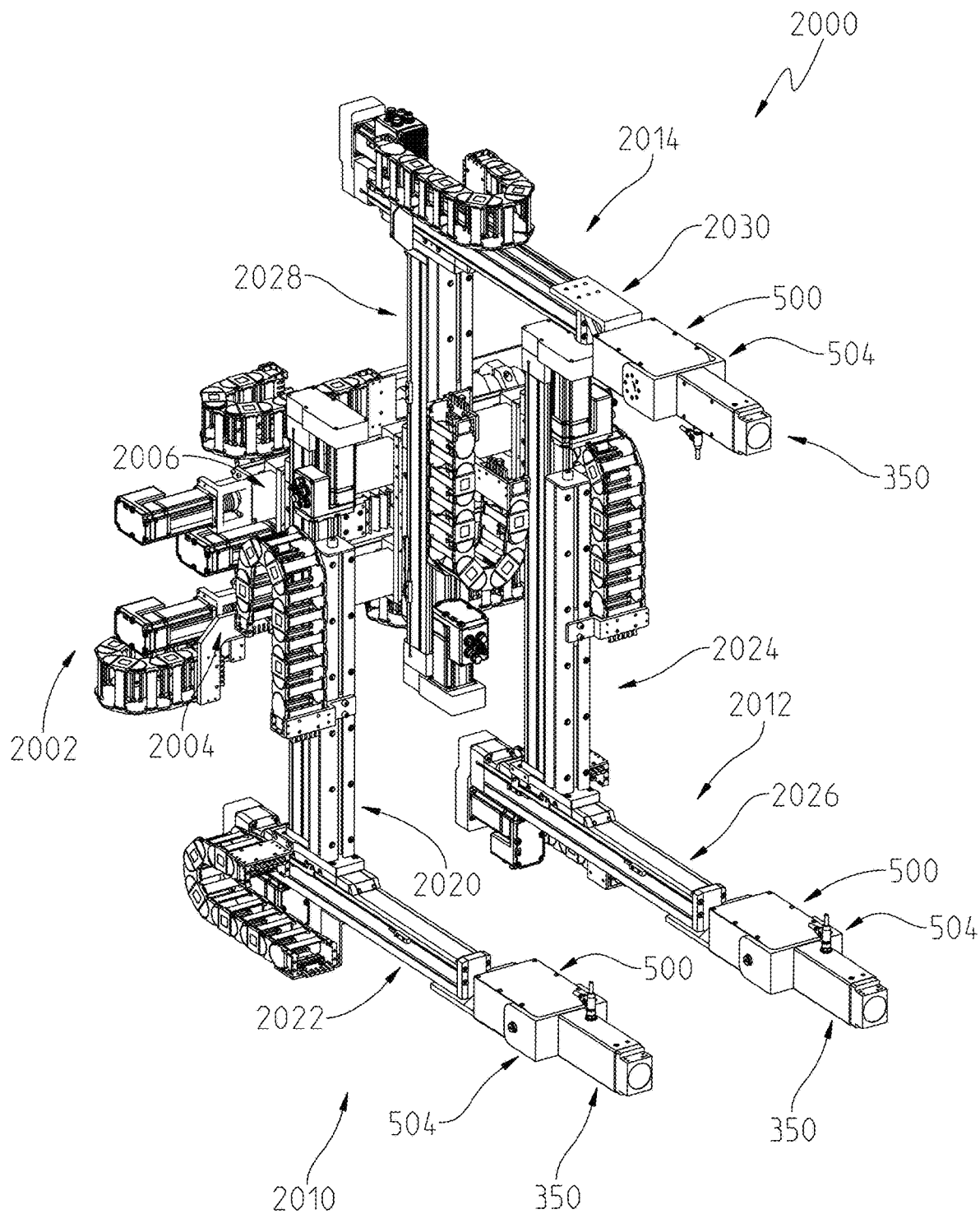
FIGS. 31A and 31B illustrate an exemplary end-of-arm-tool.
Figure 31B:
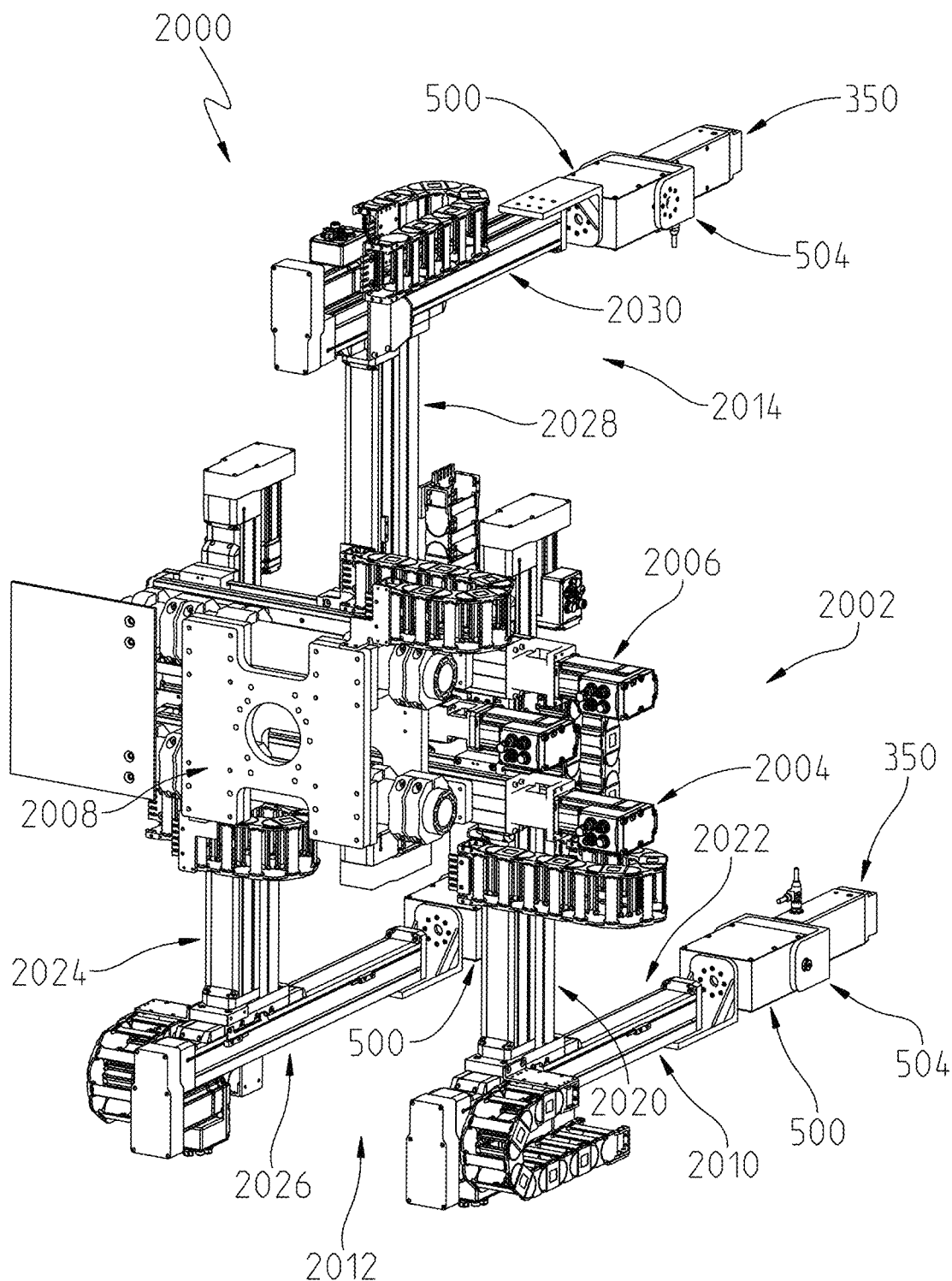

FIGS. 31A and 31B illustrate an exemplary EOAT 2000. EOAT 2000 includes a base 2002 to which adjustable assemblies 2010, 2012, and 2014 are attached. Base 2002 includes a first linear rail 2004 and a second linear rail 2004. A rear side of base 2002, shown in FIG. 31B, includes a robot arm interface 2008 whereat EOAT 2000 may be coupled to a robot, such as robot 1502. A first subset of adjustable assemblies are coupled to first linear rail 2004, such as adjustable assembly 2010 and adjustable assembly 2012, and a second subset of adjustable assemblies are coupled to second linear rail 2006, such as adjustable assembly 2014. Similar to EOAT 1538, each of adjustable assemblies 2010, 2012, and 2014 includes a pair of linear rails (2020, 2022 for adjustable assembly 2010; 2024, 2026 for adjustable assembly 2012; and 2028, 2030 for adjustable assembly 2014). At the end of the respective sets of linear rails, an instance of rotational drive 500 is coupled to provide rotational adjustment. A tool 350, illustratively a magnetic gripper, is coupled to the output mount 504 of each rotational drive 500.

Figure 32:
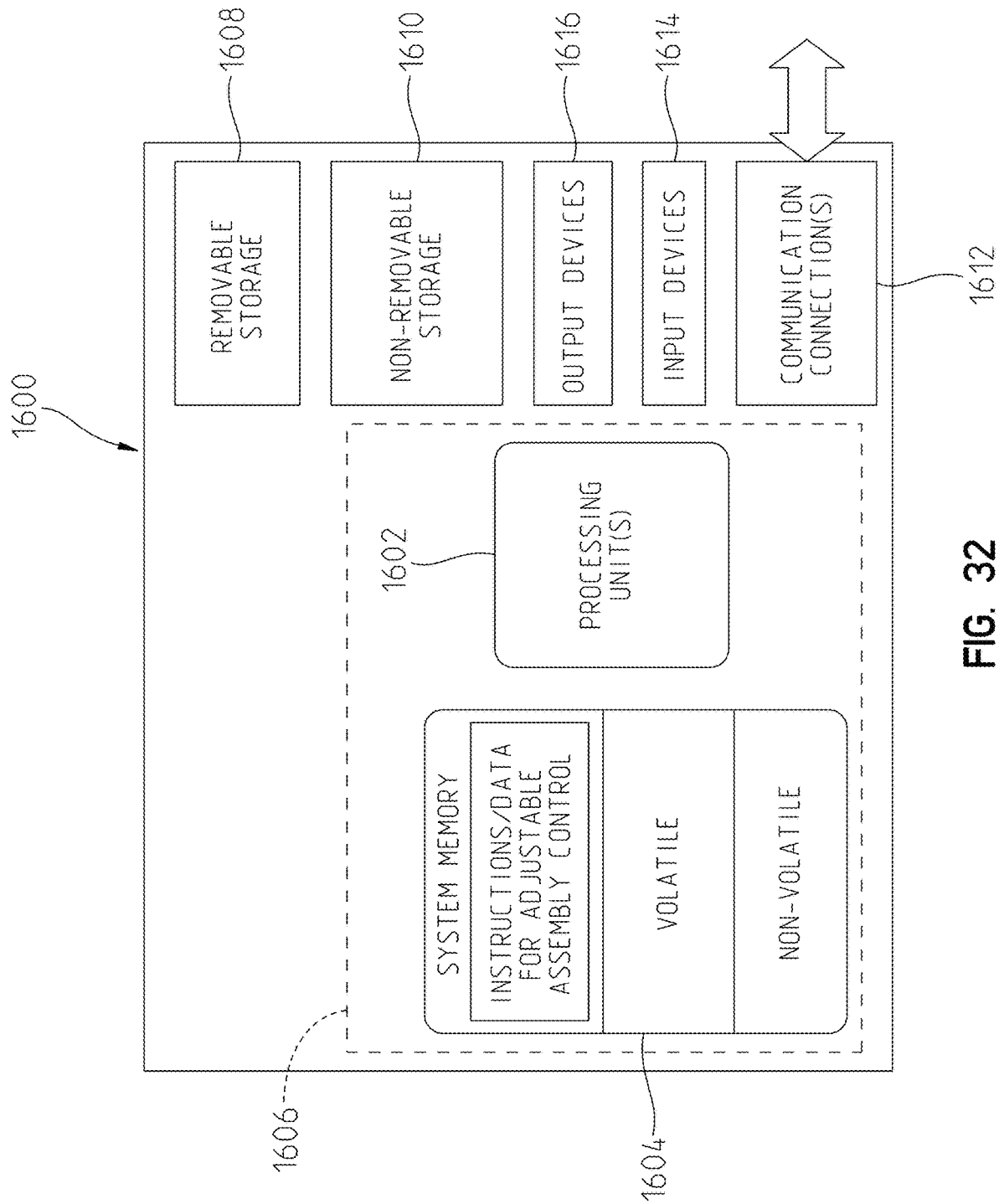
FIG. 32 illustrates an example of a suitable operating environment in which one or more of the present embodiments may be implemented.

FIG. 32 illustrates an example of a suitable operating environment 1600 of electronic controller 1050 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In examples, operating environment 1600 may be part of a robotic device, an adjustable EOAT, an adjustable fixture, or an adjustable assembly, or any combination thereof according to the aspects described herein. In other examples, operating environment 1600 may be a separate computing device, for example that is in communication with one or more robotic devices, adjustable EOATs, adjustable fixtures, and/or associated adjustable assemblies.

In its most basic configuration, operating environment 1600 typically may include at least one processing unit 1602 and memory 1604. Depending on the exact configuration and type of computing device, memory 1604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 1606. Further, environment 1600 may also include storage devices (removable, 1608, and/or non-removable, 1610) including, but not limited to, magnetic or optical disks or tape. Similarly, environment 1600 may also have input device(s) 1614 such as a keyboard, mouse, pen, voice input, etc. and/or output device(s) 1616 such as a display, speakers, printer, etc. Also included in the environment may be one or more communication connections, 1612, such as LAN, WAN, point to point, etc.

Operating environment 1600 may include at least some form of computer readable media. The computer readable media may be any available media that can be accessed by processing unit 1602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 1600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet. In aspects, networking environments may include industrial ethernet networks and/or discrete I/O communications.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 1604. While executing on the processing unit 1602, program modules (e.g., applications, Input/Output (I/O) management, and other utilities) may perform processes including, but not limited to, control of an adjustable EOAT, an adjustable fixture, and/or robotic device in accordance with the aspects described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 32 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 1600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Non-limiting exemplary embodiments are provided in the following clauses.

Clause 1. A rotational drive is provided. The rotational drive comprising: a base; an output mount rotatable relative to the base; an intermediate base positioned between the base and the output mount. The output mount being movably coupled to the intermediate base and movably coupled to the base through the intermediate base. The rotational drive further comprising a first drive system coupled to the base and the intermediate base to rotate the intermediate base relative to the base about a first axis; and a second drive system coupled to the intermediate base and the output mount to rotate the output mount relative to the base about a second axis, the second axis being angled relative to the first axis. The first drive system and the second drive system are supported by the intermediate base.

Clause 2. The rotational drive of Clause 1, wherein a face of the output mount is rotatable about the first axis through at least 360 degrees and is rotatable about the second axis through at least 190 degrees.

Clause 3. The rotational drive of any one of Clauses 1-2, wherein a rotational position of the intermediate base relative to the base is maintained while the second drive system rotates the output mount relative to the base.

Clause 4. The rotational drive of any one of Clauses 1-3, wherein the first axis intersects the second axis at an intersection point.

The rotational drive of Clause 4, wherein the intermediate base has an interior and the intersection point is positioned in the interior of the intermediate base.

The rotational drive of Clause 4, wherein the intersection point remains stationary relative to the base as the output mount is moved by each of the first drive system and the second drive system.

The rotational drive of Clause 4, wherein the intersection point moves relative to the base as the output mount is moved by each of the first drive system and the second drive system.

Clause 8. The rotational drive of any one of Clauses 1-7, wherein the second axis is perpendicular to the first axis.

Clause 9. The rotational drive of any one of Clauses 1-8, further comprising a first tool coupled to the output mount.

Clause 10. The rotational drive of Clause 9, wherein the first tool is a single-sided tool.

Clause 11. The rotational drive of Clause 10, wherein the single-sided tool is one of: a magnetic gripper; a suction gripper; a pin clamp; a locator; electro-static gripper; or a gecko gripper.

Clause 12. The rotational drive of any one of Clauses 1-11, wherein the first drive system includes a first motor having a stator coupled to the intermediate base and a rotor rotatable relative to the stator, the rotor coupled to the base.

Clause 13. The rotational drive of any one of Clauses 1-12, wherein the second drive system includes a second motor having a stator coupled to the intermediate base and a rotor rotatable relative to the stator, the rotor coupled to the output mount.

Clause 14. The rotational drive of any one of Clauses 1-11, wherein the first drive system includes a first rotational motor and the second drive system includes a second rotational motor.

Clause 15. The rotational drive of any one of Clauses 9-11, further comprising a controller, the controller communicating with the first tool wirelessly.

Clause 16. The rotational drive of any one of Clauses 9-11, further comprising a controller and a wire harness, the wire harness passing through a first opening in base and a second opening in the intermediate base, the wire harness coupling the first tool to the controller.

Clause 17. The rotational drive of Clause 16, wherein the first drive system includes a first motor having a stator coupled to the intermediate base and a rotor rotatable relative to the stator, the rotor coupled to the base.

Clause 18. The rotational drive any one of Clauses 16 and 17, wherein the second drive system includes a second motor having a stator coupled to the intermediate base and a rotor rotatable relative to the stator, the rotor coupled to the output mount.

Clause 19. The rotational drive of Clause 18, wherein the rotor of the first motor includes a central opening, the wire harness passing through the central opening of the rotor of the first motor.

Clause 20. The rotational drive of any one of Clauses 18 and 19, wherein the rotor of the second motor includes a central opening, the wire harness passing through the central opening of the rotor of the second motor.

Clause 21. A rotational drive is provided. The rotational drive comprising: a base; an output mount rotatable relative to the base; an intermediate base positioned between the base and the output mount. The output mount being movably coupled to the intermediate base and movably coupled to the base independent of the intermediate base. The rotational drive further comprising a first drive system coupled to the base and the intermediate base to rotate the intermediate base relative to the base about a first axis; and a second drive system coupled to the base and the output mount to rotate the output mount relative to the base about a second axis, the second axis being angled relative to the first axis.

Clause 22. The rotational drive of Clause 21, wherein the second axis is perpendicular to the first axis.

Clause 23. The rotational drive of Clause 21, wherein a rotational position of the intermediate base relative to the base is maintained while the second drive member rotates the output mount relative to the base.

Clause 24. The rotational drive of any one of Clauses 21 and 23, wherein the first axis intersects the second axis at an intersection point.

Clause 25. The rotational drive of Clause 24, wherein the intersection point remains stationary relative to the base as the output mount is moved by each of the first drive system and the second drive system.

Clause 26. The rotational drive of any one of Clauses 24 and 25, wherein the intersection point is on a first side of the base and a drive input of the first drive system is on a second side of the base, the second side being opposite the first side.

Clause 27. The rotational drive of Clause 26, wherein a drive input of the second drive system is on the second side of the base.

Clause 28. The rotational drive of any one of Clauses 26 and 27, wherein the first drive system spans the base with the drive output of the first drive system being on the first side of the base.

Clause 29. The rotational drive of Clause 28, wherein the second drive system spans the base with the drive output of the second drive system being on the first side of the base.

Clause 30. The rotational drive of Clause 29, wherein the drive output of the first drive system has a first rotational axis and the drive output of the second drive system has a second rotational axis parallel to the first rotational axis of the drive output of the first drive system.

Clause 31. The rotational drive of Clause 30, wherein the second rotational axis of the drive output of the second drive system is colinear with the first rotational axis of the drive output of the first drive system.

Clause 32. The rotational drive of any one of Clauses 28-31, wherein the intermediate base is fixed to the drive output of the first drive system.

Clause 33. The rotational drive of any one of Clauses 28-32, wherein the output mount is coupled to the drive output of the second drive system through a gearset.

Clause 34. The rotational drive of Clause 33, wherein the gearset is coupled to the drive output of the second drive system through an axle which carries a first gear of the gearset.

Clause 35. The rotational drive of Clause 34, wherein the axle is fixed to the drive output of the second drive system.

Clause 36. The rotational drive of any one of Clauses 34 and 35, wherein the axle passes through an opening in the drive output of the first drive system.

Clause 37. The rotational drive system of any one of Clauses 33-36, wherein a clutch is positioned between the drive output of the second drive system and the output mount, the clutch having an engaged state wherein the intermediate base is fixed relative to the drive output of the second drive system and a second state wherein the intermediate base is rotatable relative to the drive output of the second drive system.

Clause 38. The rotational drive of any one of Clauses 21-37, wherein the output mount is rotatable about the first axis through more than one complete revolution about the first axis and the output mount is rotatable about the second axis up to about 45 degrees in each direction.

Clause 39. A method of operating the rotational drive of any one of Clauses 1-38 is provided. The method comprising the steps: coupling a tool to the output mount; rotating the output mount about the first axis with the first drive system to place the tool in a first pose; and rotating the output mount about the second axis with the second drive system to place the tool in a second pose different from the first pose.

Clause 40. A method of operating the rotational drive of any one of Clauses 21-38 is provided. The method comprising the steps: coupling a tool to the output mount; rotating the output mount about the first axis with the first drive system to place the tool in a first pose; rotating the output mount about the second axis with the second drive system to place the tool in a second pose different from the first pose; and during the step of rotating the output mount about the first axis with the first drive system to place the tool in the first pose operating the second drive system to prevent rotation of the output mount about the second axis.

Clause 41. A method of operating the rotational drive of any one of Clauses 37 and 38 is provided. The method comprising the steps: coupling a tool to the output mount; placing the clutch in the engaged state; rotating the output mount about the first axis with the first drive system to place the tool in a first pose; placing the clutch in the disengaged state; and rotating the output mount about the second axis with the second drive system to place the tool in a second pose different from the first pose.

Clause 42. A robotic system for lifting a ferromagnetic workpiece is provided. The robotic system comprising a robotic arm including a base and a plurality of moveable arm segments; and a rotational drive according to any one of Clauses 1-38 operatively coupled to the robotic arm at a first end opposite the base.

Clause 43. A robotic system for lifting at least one ferromagnetic workpiece is provided. The robotic system comprising: a robotic arm including a base and a plurality of moveable arm segments; and an end-of-arm tool coupled to an end of the robotic arm. The end-of-arm-tool including a rotational drive according to any one of Clauses 1-38 operatively coupled to the robotic arm at a first end opposite the base of the robotic arm, the rotational drive having a plurality of tools coupled to the output mount, the rotational drive being in a first pose to couple a first ferromagnetic workpiece to a first tool of the plurality of tools and being in a second pose to couple a second ferromagnetic workpiece to a second tool of the plurality of tools.

Clause 44. The robotic system of Clause 43, wherein the end-of-arm-tool includes a linear adjustment assembly, the rotational drive coupled to the linear adjustment assembly to move the rotational drive relative to the end of the robotic arm along a first linear axis.

Clause 45. The robotic system of any one of Clauses 43 and 44, wherein an end portion of the robotic arm has a first envelope and the end-of-arm tool has a second envelope, the second envelope being smaller than the first envelope.

Clause 46. A robotic system for lifting at least one ferromagnetic workpiece is provided. The robotic system comprising a robotic arm including a base and a plurality of moveable arm segments; and an end-of-arm tool coupled to an end of the robotic arm. The end-of-arm tool including a rotational drive according to any one of Clauses 1-38 operatively coupled to the robotic arm at a first end opposite the base of the robotic arm. The rotational drive having at least one tool coupled to the output mount. The rotational drive being in a first pose to couple a first ferromagnetic workpiece to a first interface of a first tool of the at least one tool and being in a second pose to couple a second ferromagnetic workpiece to a second interface of the tool of the first tool of the at least one tool, the second interface being spaced apart from the first interface.

Clause 47. The robotic system of Clause 46, wherein the end-of-arm-tool includes a linear adjustment assembly, the rotational drive coupled to the linear adjustment assembly to move the rotational drive relative to the end of the robotic arm along a first linear axis.

Clause 48. The robotic system of any one of Clauses 46 and 47, wherein an end portion of the robotic arm has a first envelope and the end-of-arm tool has a second envelope, the second envelope being smaller than the first envelope.

Clause 49. The robotic system of any one of Clauses 46-48, wherein the first tool is a magnetic gripper having a first pole shoe and a second pole shoe, the first interface being a first portion of the first pole shoe and a first portion of the second pole shoe and the second interface being a second portion of the first pole shoe and a first portion of the second pole shoe.

Clause 50. The robotic system of Clause 49, wherein the magnetic gripper has a magnetic flux source, the magnetic flux source being in a first partial on state to couple the first ferromagnetic workpiece to the first interface and in a second partial on state to further couple the second ferromagnetic workpiece to the second interface, the second partial on state having a higher magnetic flux than the first partial on state.

Clause 51. An adjustable end-of-arm tool for a robot is provided. The adjustable end-of-arm tool comprising: a base adapted to be coupled to the robot; a first adjustable assembly coupled to the base and a second adjustable assembly coupled to the base adapted to be coupled to the robot. The first adjustable assembly comprising: a first plurality of links; a first plurality of couplers coupling the plurality of links and the base, the first plurality of couplers providing at least two degrees of the freedom, wherein a first subset of the first plurality of links and the first plurality of couplers is a first rotational drive including a base and an output mount, the output mount being rotatable relative to the base about two rotational degrees of freedom which intersect at a point; and a first tool coupled to the base adapted to be coupled to the robot through the first plurality of links and the first plurality of couplers, the first tool including a first interface which is positionable relative to the base adapted to be coupled to the robot in multiple positions based on the first plurality of links and the first plurality of couplers. The second adjustable assembly comprising a second plurality of links; a second plurality of couplers coupling the plurality of links and the base, the first plurality of couplers providing at least two degrees of the freedom; and a second tool coupled to base adapted to be coupled to the robot through the second plurality of links and the second plurality of couplers, the second tool including a second interface which is positionable relative to the base adapted to be coupled to the robot in multiple positions based on the second plurality of links and the second plurality of couplers.

Clause 52. The adjustable end-of-arm tool of Clause 51, wherein the first rotational drive is configured in accordance with any one of Clauses 1-38.

Clause 53. The adjustable end-of-arm tool of Clause 51, at least one of the first tool and the second tool is a magnetic gripper.

Clause 54. The adjustable end-of-arm tool of Clause 51, wherein the base adapted to be coupled to the robot has a longitudinal mid-plane. The first adjustable assembly being positioned on a first side of the longitudinal mid-plane and the second adjustable assembly being positioned on a second side of the longitudinal mid-plane. The second side being opposite the first side.

Clause 55. The adjustable end-of-arm tool of any of Clauses 51-54, wherein the base adapted to be coupled to the robot includes a linear rail defining a first axis.

Clause 56. The adjustable end-of-arm tool of Clause 55, wherein the first plurality of couplers enables linear movement along the first axis, enables linear movement along a second axis perpendicular to the first axis, and enables linear movement along a third axis perpendicular to both the first axis and the second axis.

Clause 57. The adjustable end-of-arm tool of Clause 56, the first plurality of links includes a first linear rail parallel to the second axis and slidably coupled to the linear rail; and a second linear rail parallel to the third axis and slidably coupled to the first linear rail.

Clause 58. The adjustable end-of-arm tool of any one of Clauses 51-57, wherein the first tool and the second tool are each a single-sided tool.

Clause 59. The adjustable end-of-arm tool of Clause 58, wherein the single-sided tool is one of: a magnetic gripper; a suction gripper; a pin clamp; a locator; electro-static gripper; or a gecko gripper.

Clause 60. The adjustable end-of-arm tool of Clause 51, wherein at least one of first tool and the second tool are each a double-sided tool.

Clause 61. The adjustable end-of-arm tool of Clause 51, further comprising: a third adjustable assembly coupled to the base adapted to be coupled to the robot. The third adjustable assembly comprising: a third plurality of links; a third plurality of couplers coupling the third plurality of links and the base, the third plurality of couplers providing at least two degrees of the freedom; and a third tool coupled to the base adapted to be coupled to the robot through the third plurality of links and the third plurality of couplers.

Clause 62. The adjustable end-of-arm tool of Clause 61, wherein the base adapted to be coupled to the robot has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side.

Clause 63. The adjustable end-of-arm tool of any one of Clauses 61 and 62, wherein the first plurality of links and the first plurality of couplers provide at least five degrees of freedom for the positioning the first tool relative to the base adapted to be coupled to the robot. The second plurality of links and the second plurality of couplers provides at least five degrees of freedom for the positioning the second tool relative to the base adapted to be coupled to the robot. The third plurality of links and the third plurality of couplers provides at least five degrees of freedom for the positioning the third tool relative to the base adapted to be coupled to the robot.

Clause 64. The adjustable end-of-arm tool of Clause 63, wherein each of the first adjustable assembly, the second adjustable assembly, and the third adjustable assembly are independently coupled to the base adapted to be coupled to the robot.

Clause 65. The adjustable end-of-arm tool of Clause 51, wherein the first plurality of links and the first plurality of couplers provides at least five degrees of freedom for the positioning the first tool relative to the base adapted to be coupled to the robot and the second plurality of links and the second plurality of couplers provides at least five degrees of freedom for the positioning the second tool relative to the base adapted to be coupled to the robot.

Clause 66. The adjustable end-of-arm tool of Clause 65, wherein each of the first adjustable assembly and the second adjustable assembly are independently coupled to the base.

Clause 67. The adjustable end-of-arm tool any of Clauses 51-66, further comprising: a controller configured to: identify a first configuration associated with a first object; and configure the first adjustable assembly and the second adjustable assembly according to the first configuration to position the first interface of first tool in a first position relative to the base adapted to be coupled to the robot and to position the second interface of the second tool in a second position relative to the base adapted to be coupled to the robot.

Clause 68. The adjustable end-of-arm tool of Clause 67, wherein the first adjustable assembly and the second adjustable assembly are in the first configuration prior to contacting the first object with the first interface and the second interface.

Clause 69. The adjustable end-of-arm tool of Clause 68, wherein the controller is further configured to: identify a second configuration associated with a second object, wherein the second configuration is different than the first configuration; and configure the first adjustable assembly and the second adjustable assembly according to the second configuration to position the first interface of first tool in a third position relative to the base adapted to be coupled to the robot and to position the second interface of the second tool in a fourth position relative to the base adapted to be coupled to the robot.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis; and
a second drive system coupled to the intermediate base and the output mount to rotate the output mount relative to the base about a second axis, the second axis being angled relative to the first axis, wherein the first drive system and the second drive system are supported by the intermediate base, and
wherein a rotational position of the intermediate base relative to the base is maintained while the second drive system rotates the output mount relative to the base.

2. The rotational drive of claim 1, wherein a face of the output mount is rotatable about the first axis through at least 360 degrees and is rotatable about the second axis through at least 190 degrees.

3. The rotational drive of claim 1, wherein the first axis intersects the second axis at an intersection point.

4. The rotational drive of claim 3, wherein the intermediate base has an interior and the intersection point is positioned in the interior of the intermediate base.

5. The rotational drive of claim 3, wherein the intersection point remains stationary relative to the base as the output mount is moved by each of the first drive system and the second drive system.

6. The rotational drive of claim 3, wherein the intersection point moves relative to the base as the output mount is moved by each of the first drive system and the second drive system.

7. The rotational drive of claim 1, wherein the second axis is perpendicular to the first axis.

8. The rotational drive of claim 1, further comprising a first tool coupled to the output mount.

9. The rotational drive of claim 8, wherein the first tool is a single-sided tool.

10. The rotational drive of claim 9, wherein the single-sided tool is one of:
a magnetic gripper;
a suction gripper;
a pin clamp;
a locator;
electro-static gripper; or
a gecko gripper.

11. The rotational drive of claim 8, further comprising a controller, the controller communicating with the first tool wirelessly.

12. The rotational drive of claim 8, further comprising a controller and a wire harness, the wire harness passing through a first opening in the base and a second opening in the intermediate base, the wire harness coupling the first tool to the controller.

13. The rotational drive of claim 12, wherein the first drive system includes a first motor having a stator coupled to the intermediate base and a rotor rotatable relative to the stator, the rotor coupled to the base.

14. The rotational drive of claim 13, wherein the second drive system includes a second motor having a stator coupled to the intermediate base and a rotor rotatable relative to the stator, the rotor coupled to the output mount.

15. The rotational drive of claim 14, wherein the rotor of the first motor includes a central opening, the wire harness passing through the central opening of the rotor of the first motor.

16. The rotational drive of claim 14, wherein the rotor of the second motor includes a central opening, the wire harness passing through the central opening of the rotor of the second motor.

17. The rotational drive of claim 1, wherein the first drive system includes a first motor having a stator coupled to the intermediate base and a rotor rotatable relative to the stator, the rotor coupled to the base.

18. The rotational drive of claim 1, wherein the second drive system includes a second motor having a stator coupled to the intermediate base and a rotor rotatable relative to the stator, the rotor coupled to the output mount.

19. The rotational drive of claim 1, wherein the first drive system includes a first rotational motor and the second drive system includes a second rotational motor.

20. A robotic system for lifting a ferromagnetic workpiece, the robotic system comprising:
a robotic arm including a base and a plurality of moveable arm segments; and
a rotational drive according to claim 1 operatively coupled to the robotic arm at a first end opposite the base.

21. A robotic system for lifting at least one ferromagnetic workpiece, the robotic system comprising:
a robotic arm including a base and a plurality of moveable arm segments; and
an end-of-arm tool coupled to an end of the robotic arm, the end-of-arm-tool including a rotational drive according to claim 1 operatively coupled to the robotic arm at a first end opposite the base of the robotic arm, the rotational drive having a plurality of tools coupled to the output mount, the rotational drive being in a first pose to couple a first ferromagnetic workpiece to a first tool of the plurality of tools and being in a second pose to couple a second ferromagnetic workpiece to a second tool of the plurality of tools.

22. The robotic system of claim 21, wherein the end-of-arm-tool includes a linear adjustment assembly, the rotational drive coupled to the linear adjustment assembly to move the rotational drive relative to the end of the robotic arm along a first linear axis.

23. The robotic system of claim 22, wherein an end portion of the robotic arm has a first envelope and the end-of-arm tool has a second envelope, the second envelope being smaller than the first envelope.

24. A robotic system for lifting at least one ferromagnetic workpiece, the robotic system comprising:
a robotic arm including a base and a plurality of moveable arm segments; and
an end-of-arm tool coupled to an end of the robotic arm, the end-of-arm-tool including a rotational drive according to claim 1 operatively coupled to the robotic arm at a first end opposite the base of the robotic arm, the rotational drive having at least one tool coupled to the output mount, the rotational drive being in a first pose to couple a first ferromagnetic workpiece to a first interface of a first tool of the at least one tool and being in a second pose to couple a second ferromagnetic workpiece to a second interface of the tool of the first tool of the at least one tool, the second interface being spaced apart from the first interface.

25. The robotic system of claim 24, wherein the end-of-arm-tool includes a linear adjustment assembly, the rotational drive coupled to the linear adjustment assembly to move the rotational drive relative to the end of the robotic arm along a first linear axis.

26. The robotic system of claim 25, wherein an end portion of the robotic arm has a first envelope and the end-of-arm tool has a second envelope, the second envelope being smaller than the first envelope.

27. The robotic system of claim 26, wherein the first tool is a magnetic gripper having a first pole shoe and a second pole shoe, the first interface being a first portion of the first pole shoe and a first portion of the second pole shoe and the second interface being a second portion of the first pole shoe and a second portion of the second pole shoe.

28. The robotic system of claim 27, wherein the magnetic gripper has a magnetic flux source, the magnetic flux source being in a first partial on state to couple the first ferromagnetic workpiece to the first interface and in a second partial on state to further couple the second ferromagnetic workpiece to the second interface, the second partial on state having a higher magnetic flux than the first partial on state.

29. An adjustable end-of-arm tool for a robot, comprising:
a base adapted to be coupled to the robot;
a first adjustable assembly coupled to the base, comprising:
a first plurality of links;
a first plurality of couplers coupling the plurality of links and the base, the first plurality of couplers providing at least two degrees of the freedom, wherein a first subset of the first plurality of links and the first plurality of couplers is a first rotational drive including a rotational drive base and an output mount, the output mount being rotatable relative to the rotational drive base about two rotational degrees of freedom which intersect at a point; and
a first tool coupled to the base adapted to be coupled to the robot through the first plurality of links and the first plurality of couplers, the first tool including a first interface which is positionable relative to the base adapted to be coupled to the robot in multiple positions based on the first plurality of links and the first plurality of couplers; and
a second adjustable assembly coupled to the base adapted to be coupled to the robot, comprising:
a second plurality of links;
a second plurality of couplers coupling the plurality of links and the base, the first plurality of couplers providing at least two degrees of the freedom; and
a second tool coupled to base adapted to be coupled to the robot through the second plurality of links and the second plurality of couplers, the second tool including a second interface which is positionable relative to the base adapted to be coupled to the robot in multiple positions based on the second plurality of links and the second plurality of couplers.

30. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis; and a second drive system coupled to the intermediate base and the output mount to rotate the output mount relative to the base about a second axis, the second axis being angled relative to the first axis, wherein the first drive system and the second drive system are supported by the intermediate base, and wherein a face of the output mount is rotatable about the first axis through at least 360 degrees and is rotatable about the second axis through at least 190 degrees.

31. The rotational drive of claim 30, wherein the second axis is perpendicular to the first axis.

32. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis; and
a second drive system coupled to the intermediate base and the output mount to rotate the output mount relative to the base about a second axis, the second axis being angled relative to the first axis and the first axis intersects the second axis at an intersection point, wherein the first drive system and the second drive system are supported by the intermediate base.

33. The rotational drive of claim 32, wherein a face of the output mount is rotatable about the second axis through at least 120 degrees.

34. The rotational drive of claim 32, wherein a face of the output mount is rotatable about the second axis through at least 190 degrees.

35. The rotational drive of claim 32, wherein the face of the output mount is rotatable about the first axis through at least 360 degrees.

36. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis;
a second drive system coupled to the intermediate base and the output mount to rotate the output mount relative to the base about a second axis, the second axis being angled relative to the first axis, wherein the first drive system and the second drive system are supported by the intermediate base; and
a first tool coupled to the output mount, the first tool is a single-sided tool being one of:
a magnetic gripper;
a suction gripper;
a pin clamp;
a locator;
electro-static gripper; or
a gecko gripper.

37. The rotational drive of claim 36, wherein a face of the output mount is rotatable about the second axis through at least 190 degrees.

38. The rotational drive of claim 36, wherein the face of the output mount is rotatable about the first axis through at least 360 degrees.

39. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis, the first drive system includes a first motor having a stator coupled to the intermediate base and a rotor rotatable relative to the stator, the rotor coupled to the base; and
a second drive system coupled to the intermediate base and the output mount to rotate the output mount relative to the base about a second axis, the second axis being angled relative to the first axis, wherein the first drive system and the second drive system are supported by the intermediate base.

40. The rotational drive of claim 39, wherein a face of the output mount is rotatable about the second axis through at least 190 degrees.

41. The rotational drive of claim 39, wherein the face of the output mount is rotatable about the first axis through at least 360 degrees.

42. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis; and
a second drive system coupled to the intermediate base and the output mount to rotate the output mount relative to the base about a second axis, the second drive system including a second motor having a stator coupled to the intermediate base and a rotor rotatable relative to the stator, the rotor coupled to the output mount, and the second axis being angled relative to the first axis, wherein the first drive system and the second drive system are supported by the intermediate base.

43. The rotational drive of claim 42, wherein a face of the output mount is rotatable about the second axis through at least 190 degrees.

44. The rotational drive of claim 42, wherein the face of the output mount is rotatable about the first axis through at least 360 degrees.

45. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis;
a second drive system coupled to the intermediate base and the output mount to rotate the output mount relative to the base about a second axis, the second axis being angled relative to the first axis, wherein the first drive system and the second drive system are supported by the intermediate base;
a first tool coupled to the output mount; and
a controller communicating with the first tool wirelessly.

46. The rotational drive of claim 45, wherein a face of the output mount is rotatable about the second axis through at least 190 degrees.

47. The rotational drive of claim 45, wherein the face of the output mount is rotatable about the first axis through at least 360 degrees.

48. A rotational drive comprising:
a base;
an output mount rotatable relative to the base;
an intermediate base positioned between the base and the output mount, the output mount being movably coupled to the intermediate base and movably coupled to the base through the intermediate base;
a first drive system coupled to the base and the intermediate base to rotate the intermediate base relative to the base about a first axis;
a second drive system coupled to the intermediate base and the output mount to rotate the output mount relative to the base about a second axis, the second axis being angled relative to the first axis, wherein the first drive system and the second drive system are supported by the intermediate base;
a first tool coupled to the output mount;
a controller; and
a wire harness, the wire harness passing through a first opening in the base and a second opening in the intermediate base, the wire harness coupling the first tool to the controller.

49. The rotational drive of claim 48, wherein a face of the output mount is rotatable about the second axis through at least 190 degrees.

50. The rotational drive of claim 48, wherein the face of the output mount is rotatable about the first axis through at least 360 degrees.

51. The rotational drive of claim 48, wherein the first drive system includes a first motor having a stator coupled to the intermediate base and a rotor rotatable relative to the stator, the rotor coupled to the base.

52. The rotational drive of claim 51, wherein the second drive system includes a second motor having a stator coupled to the intermediate base and a rotor rotatable relative to the stator, the rotor coupled to the output mount.

53. The rotational drive of claim 52, wherein the rotor of the first motor includes a central opening, the wire harness passing through the central opening of the rotor of the first motor.

54. The rotational drive of claim 52, wherein the rotor of the second motor includes a central opening, the wire harness passing through the central opening of the rotor of the second motor.

55. A robotic system for lifting a ferromagnetic workpiece, the robotic system comprising:
a robotic arm including a base and a plurality of moveable arm segments; and
a rotational drive operatively coupled to the robotic arm at a first end opposite the base, the rotational drive comprising:
a rotational drive base;
an output mount rotatable relative to the rotational drive base;
an intermediate base positioned between the rotational drive base and the output mount, the output mount being movably coupled to the intermediate base and movably coupled to the rotational drive base through the intermediate base;
a first drive system coupled to the rotational drive base and the intermediate base to rotate the intermediate base relative to the rotational drive base about a first axis; and
a second drive system coupled to the intermediate base and the output mount to rotate the output mount relative to the rotational drive base about a second axis, the second axis being angled relative to the first axis, wherein the first drive system and the second drive system are supported by the intermediate base.

56. The rotational drive of claim 55, wherein a face of the output mount is rotatable about the second axis through at least 190 degrees.

57. The rotational drive of claim 55, wherein the face of the output mount is rotatable about the first axis through at least 360 degrees.

58. A robotic system for lifting at least one ferromagnetic workpiece, the robotic system comprising:
a robotic arm including a base and a plurality of moveable arm segments; and
an end-of-arm tool coupled to an end of the robotic arm, the end-of-arm-tool including a rotational drive operatively coupled to the robotic arm at a first end opposite the base, the rotational drive comprising:
a rotational drive base;
an output mount rotatable relative to the rotational drive base;
an intermediate base positioned between the rotational drive base and the output mount, the output mount being movably coupled to the intermediate base and movably coupled to the rotational drive base through the intermediate base;
a first drive system coupled to the rotational drive base and the intermediate base to rotate the intermediate base relative to the rotational drive base about a first axis; and
a second drive system coupled to the intermediate base and the output mount to rotate the output mount relative to the rotational drive base about a second axis, the second axis being angled relative to the first axis, wherein the first drive system and the second drive system are supported by the intermediate base; and
a plurality of tools coupled to the output mount, the rotational drive being in a first pose to couple a first ferromagnetic workpiece to a first tool of the plurality of tools and being in a second pose to couple a second ferromagnetic workpiece to a second tool of the plurality of tools.

59. The rotational drive of claim 58, wherein a face of the output mount is rotatable about the second axis through at least 190 degrees.

60. The rotational drive of claim 58, wherein the face of the output mount is rotatable about the first axis through at least 360 degrees.

61. A robotic system for lifting at least one ferromagnetic workpiece, the robotic system comprising:
a robotic arm including a base and a plurality of moveable arm segments; and
an end-of-arm tool coupled to an end of the robotic arm, the end-of-arm-tool including a rotational drive operatively coupled to the robotic arm at a first end opposite the base, the rotational drive comprising:
a rotational drive base;
an output mount rotatable relative to the rotational drive base;

an intermediate base positioned between the rotational drive base and the output mount, the output mount being movably coupled to the intermediate base and movably coupled to the rotational drive base through the intermediate base;

a first drive system coupled to the rotational drive base and the intermediate base to rotate the intermediate base relative to the rotational drive base about a first axis; and a second drive system coupled to the intermediate base and the output mount to rotate the output mount relative to the rotational drive base about a second axis, the second axis being angled relative to the first axis, wherein the first drive system and the second drive system are supported by the intermediate base; and at least one tool coupled to the output mount, the rotational drive being in a first pose to couple a first ferromagnetic workpiece to a first interface of a first tool of the at least one tool and being in a second pose to couple a second ferromagnetic workpiece to a second interface of the tool of the first tool of the at least one tool, the second interface being spaced apart from the first interface.

62. The rotational drive of claim 61, wherein a face of the output mount is rotatable about the second axis through at least 190 degrees.

63. The rotational drive of claim 61, wherein the face of the output mount is rotatable about the first axis through at least 360 degrees.

* * * * *